US011407922B2

(12) United States Patent
Khandelwal et al.

(10) Patent No.: US 11,407,922 B2
(45) Date of Patent: Aug. 9, 2022

(54) SI-CONTAINING FILM FORMING COMPOSITIONS AND METHODS OF MAKING AND USING THE SAME

(71) Applicants: American Air Liquide, Inc., Fremont, CA (US); L'Air Liquide, Société Anonyme pour l'Etude et l'Exploitation des Procédés Georges Claude, Paris (FR); Manish Khandelwal, Somerset, NJ (US); Sean Kerrigan, Princeton, NJ (US); Jean-Marc Girard, Versailles (FR); Antonio Sanchez, Tsukuba (JP); Peng Zhang, Montvale, NJ (US); Yang Wang, Garnet Valley, PA (US)

(72) Inventors: Manish Khandelwal, Somerset, NJ (US); Sean Kerrigan, Princeton, NJ (US); Jean-Marc Girard, Versailles (FR); Antonio Sanchez, Tsukuba (JP); Peng Zhang, Montvale, NJ (US); Yang Wang, Garnet Valley, PA (US)

(73) Assignees: L'Air Liquide, Société Anonyme pour l'Etude et l'Exploitation des Procédés Georges Claude, Paris (FR); American Air Liquide, Inc., Fremont, CA (US)

( * ) Notice: Subject to any disclaimer, the term of this patent is extended or adjusted under 35 U.S.C. 154(b) by 108 days.

(21) Appl. No.: 16/087,464

(22) PCT Filed: Mar. 23, 2017

(86) PCT No.: PCT/US2017/023779
§ 371 (c)(1),
(2) Date: Sep. 21, 2018

(87) PCT Pub. No.: WO2017/165626
PCT Pub. Date: Sep. 28, 2017

(65) Prior Publication Data
US 2019/0040279 A1     Feb. 7, 2019

Related U.S. Application Data

(60) Provisional application No. 62/312,352, filed on Mar. 23, 2016.

(51) Int. Cl.
C09D 183/16    (2006.01)
C08G 77/60     (2006.01)
(Continued)

(52) U.S. Cl.
CPC .............. C09D 183/16 (2013.01); C07F 7/10 (2013.01); C08G 77/60 (2013.01); C08G 77/62 (2013.01); C08G 77/70 (2013.01)

(58) Field of Classification Search
CPC ......... C09D 183/16; C07F 7/10; C08G 77/60; C08G 77/62; C08G 77/70
See application file for complete search history.

(56) References Cited

U.S. PATENT DOCUMENTS

| | | |
|---|---|---|
| 4,833,107 A | 5/1989 | Kaya et al. |
| 5,656,076 A | 8/1997 | Kikkawa |

(Continued)

FOREIGN PATENT DOCUMENTS

| | | |
|---|---|---|
| CN | 103881101 | 6/2014 |
| DE | 02 772 548 | 11/2004 |

(Continued)

OTHER PUBLICATIONS

Aylett, B.J. et al., "The preparation and some properties of disilylamine," Inorg. Chem. 1966 5(1) 167.

(Continued)

*Primary Examiner* — Robert S Walters, Jr.
(74) *Attorney, Agent, or Firm* — Allen E. White; Patricia E. McQueeney

(57) ABSTRACT

Si-containing film forming compositions are disclosed comprising a precursor having the formula [—NR—R$^4$R$^5$Si—(CH$_2$)$_t$—SiR$^2$R$^3$—]$_n$ wherein n=2 to 400; R, R$^2$, R$^3$, R$^4$, and R$^5$ are independently H, a hydrocarbon group, or an alkylamino group, and provided that at least one of R$^2$, R$^3$, R$^4$, and R$^5$ is H; and R is independently H, a hydrocarbon group, or a silyl group. Exemplary pre-cursors include, but are not limited to, [—NH—SiH$_2$—CH$_2$—SiH$_2$—]$_n$, and [—N(SiH$_2$—CH$_2$—SiH$_3$)—SiH$_2$—CH$_2$—SiH$_2$—]$_n$.

24 Claims, 8 Drawing Sheets

(51) Int. Cl.
*C07F 7/10* (2006.01)
*C08G 77/62* (2006.01)
*C08G 77/00* (2006.01)

(56) References Cited

U.S. PATENT DOCUMENTS

| | | | |
|---|---|---|---|
| 5,874,368 | A | 2/1999 | Laxman et al. |
| 6,489,030 | B1 | 12/2002 | Wu et al. |
| 6,940,173 | B2 | 9/2005 | Cohen et al. |
| 7,019,159 | B2 | 3/2006 | Dussarrat et al. |
| 7,064,083 | B2 | 6/2006 | Dussarrat et al. |
| 8,377,511 | B2 | 2/2013 | Dussarrat et al. |
| 8,497,391 | B2 | 7/2013 | Ohno et al. |
| 8,853,856 | B2 | 10/2014 | Darnon et al. |
| 9,969,756 | B2 * | 5/2018 | Fafard .................. C23C 16/345 |
| 10,453,675 | B2 | 10/2019 | O'Neill et al. |
| 2003/0017635 | A1 | 1/2003 | Apen et al. |
| 2004/0096582 | A1 | 5/2004 | Wang et al. |
| 2004/0121085 | A1 | 6/2004 | Wang et al. |
| 2004/0203255 | A1 | 10/2004 | Itsuki |
| 2005/0008781 | A1 | 1/2005 | Jones |
| 2005/0080285 | A1 | 4/2005 | Wang et al. |
| 2006/0012014 | A1 | 1/2006 | Chen et al. |
| 2006/0165891 | A1 | 7/2006 | Edelstein et al. |
| 2006/0286819 | A1 | 12/2006 | Seutter et al. |
| 2007/0160774 | A1 | 7/2007 | Tsukada et al. |
| 2007/0275166 | A1 | 11/2007 | Thridandam et al. |
| 2008/0058541 | A1 | 3/2008 | Bowen et al. |
| 2008/0124815 | A1 | 5/2008 | Malone et al. |
| 2008/0199977 | A1 | 8/2008 | Weigel et al. |
| 2009/0061199 | A1 | 3/2009 | Egami et al. |
| 2009/0107713 | A1 | 4/2009 | Chinn et al. |
| 2010/0016620 | A1 | 1/2010 | Dussarrat et al. |
| 2010/0034789 | A1 | 2/2010 | De La Mata De La Mata et al. |
| 2010/0140807 | A1 | 6/2010 | Kobayashi et al. |
| 2010/0252917 | A1 | 10/2010 | Karkkainen |
| 2011/0309507 | A1 | 12/2011 | Darnon et al. |
| 2011/0309597 | A1 | 12/2011 | Darnon et al. |
| 2013/0078392 | A1 | 3/2013 | Xiao et al. |
| 2013/0206039 | A1 | 8/2013 | Ohhashi et al. |
| 2013/0224964 | A1 | 8/2013 | Fukazawa et al. |
| 2013/0319290 | A1 | 12/2013 | Xiao et al. |
| 2014/0030448 | A1 | 1/2014 | Bowen et al. |
| 2014/0051264 | A1 | 2/2014 | Mallick et al. |
| 2014/0158580 | A1 | 6/2014 | Xiao et al. |
| 2014/0287596 | A1 | 9/2014 | Hirose et al. |
| 2015/0024608 | A1 | 1/2015 | Mayorga et al. |
| 2015/0087139 | A1 | 3/2015 | O'Neill et al. |
| 2015/0147484 | A1 | 5/2015 | Nguyen et al. |
| 2015/0246937 | A1 | 9/2015 | Xiao et al. |
| 2017/0190720 | A1 | 7/2017 | Fafard et al. |

FOREIGN PATENT DOCUMENTS

| | | |
|---|---|---|
| EP | 1 640 404 | 3/2006 |
| EP | 1 661 934 | 5/2006 |
| EP | 2 048 700 | 4/2009 |
| EP | 2 818 474 | 12/2014 |
| JP | 2002 069641 | 3/2002 |
| JP | 2002 167438 | 6/2002 |
| JP | 2003 151972 | 5/2003 |
| JP | 2006 096675 | 4/2006 |
| JP | 4196246 | 12/2008 |
| JP | 2013 100262 | 5/2013 |
| KR | 10 2008 0776847 | 8/2008 |
| KR | 10 2010 0012092 | 2/2010 |
| KR | 2014 0087908 | 7/2014 |
| WO | WO 03 045959 | 6/2003 |
| WO | WO 03 046253 | 6/2003 |
| WO | WO 2004 017383 | 2/2004 |
| WO | WO 2004 030071 | 4/2004 |
| WO | WO 2004 044958 | 5/2004 |
| WO | WO 2004 057653 | 7/2004 |
| WO | WO 2005 045899 | 5/2005 |
| WO | WO 2005 066386 | 7/2005 |
| WO | WO 2005 093126 | 10/2005 |
| WO | WO 2009 087609 | 7/2009 |
| WO | WO 2011 103282 | 8/2011 |
| WO | WO 2011 123792 | 10/2011 |
| WO | WO 2006 059187 | 9/2014 |
| WO | WO 2014 143410 | 9/2014 |
| WO | WO 2016 007708 | 1/2016 |
| WO | WO 2016 049154 | 3/2016 |
| WO | WO 2016 160991 | 10/2016 |

OTHER PUBLICATIONS

Blandez, J.F. et al., "Palladium nanoparticles supported on graphene as catalysts for the dehydrogenative coupling of hydrosilanes and amines," Catal. Sci. Technol. 2015 (5) 1969, 2167-2173.

Elsässer, R. et al., "Nematic dendrimers based on carbosilazane cores" Angewandte Chemie Int. Ed., vol. 40, issue 14, Jul. 16, 2001, 2688-2690.

Guruvenket, S. et al., "Atmospheric-pressure plasma-enhanced chemical vapor deposition of a—SiCN—H films: role of precursors on the film growth and properties," ACS Applied Materials and Interfaces 2012, 4, 5293-5299.

Hizawa et al., "Synthesis of alkyl and alkoxy derivatives of hexachlorodisihnethylene and their hydrolysis," The Journal of the Society of Chemical Industry, Japan, vol. 59 (1956) No. 11 p. 1359-1363.

Hvolbaek, B. et al., "Catalytic activity of Au nanoparticles," Nanotoday, Aug. 2007, vol. 2, No. 4, 14-156.

Jansen, M. et al., "Preparation and characterization of the carbosilazanes bis[tris)methylamino)silyl]methane and bis[tris(phenylamino)silyl]methane," Z. Naturforsch. 52 b, 707-710 (1997).

Lin, C. et al., "Size effect of gold nanoparticles in catalytic reduction of *p*-nitrophenol with NaBH4," Molecules 2013, 18, 12609-12620.

Liu, H.Q. et al., "Dehydrocoupling of ammonia and silanes catalyzed by dimethyltitanocene," Organometallics 1992, 11, 822-827.

Mitzel, N.W. et al., "Synthesis of volatile cyclic silylamines and the molecular structures of two 1-aza-2,5-disilacyclopenane derivatives," Inorg. Chem. 1997, 36, 4360-4368.

Morrison, J.A. et al., "Synthesis and characterization of the (halosilyl)methylsilanes," Journal of Organometallic Chemistry, 91 (1975) 163-168.

Passarelli, V. et al., "Aminolysis of the Si—Cl bond and ligand exchange reaction between silicon amido derivatives and SiCl4: synthetic applications and kinetic investigations," Dalton Transl 2003, 413-419.

Ringleb, F. et al., "Preparation of Pd—MgO model catalysts by deposition of Pd from aqueous precursor solutions onto Ag(001)-supported MgO(001) thin films," Applied Catalysis A: General 474 (2014) 186-193.

Schuh, H. et al., "Disilanyl-amines—compounds comprising the structural unit Si—Si—N, as single-source precursors for plasma-enhanced chemical vapour deposition (PE-CVD) of silicon nitride," Z. Anorg. Allg. Chem. 619 (1993) 1347-1352.

Shatnawi, M. et al., "Formation of Si—C—N ceramics from melamine-carbosilazane single source precursors," Journal of Solid State Chemistry, vol. 181, issue 1, Jan. 2008, 150-157.

Schmidbauer, H. et al., "Differences in reactivity of 1,4-disilabutane and *n*-tetrasilane towards secondary amines," Z. Naturforsch. 45b, 1990, 1679-1863.

Topchiev, A.B. et al., "Synthesis of compounds with silazine links," Doklady Akademii Nauk SSSR, 1956, 109, 787-90.

Topchiev, A.B. et al., Issled. v Obi. Kremniiorgan. Soedin., Sintez i Fiz.-Khim. Svoistva, Akad. Nauk SSSR, Inst. Neftekhim. Sinteza, Sb. Statei, 1962, 130-45.

Warren, T.K et al., "Protection Against Filovirus Diseases by a Novel Broad-Spectrum Nucleoside Analogue BCX4430," Nature, vol. 508, Apr. 17, 2014, 402-411.

Xie, W. et al., "[(NHC)Yb{N(SiMe$_3$)$_2$}$_2$]-catalyzed cross-dehydrogenative coupling of silanes with amines," Angew. Chem. Int. Ed. 2012 51 11141-11144 and Angew. Chem. 2012 124 11303-11306, DOI: 10.1002/ange.201205317.

(56) References Cited

OTHER PUBLICATIONS

International Search Report and Written Opinion for corresponding PCT/US2017/023779, dated Jun. 6, 2017.
International Search Report and Written Opinion for related PCT/US2015/051678, dated Jan. 7, 2016.
International Search Report and Written Opinion for related PCT/US2016/025011, dated Jul. 7, 2016.
University of Louisville Micro/Nano Technology Center, Spin coating theory, Oct. 2013, 4 pages.
Wan, Y. et al., "Synthesis of (dialkylamino)disilanes," Inorg. Chem. 1993, 32, 341-344.
Yang, J. et al., "Synthesis of 1,4-disilacyclohexa-2,5-dienes," Journal of Organometallic Chemistry 649 (2002) 276-288.
International Search Report and Written Opinion for related PCT/US2015/039681, dated Sep. 14, 2015.
International Search Report and Written Opinion for related PCT/EP2006/041435, dated Oct. 18, 2016.
International Search Report and Written Opinion for related PCT/EP2006/061283, dated Jan. 31, 2017.
International Search Report and Written Opinion for related PCT/EP2006/061284, dated Jan. 22, 2017.

* cited by examiner

SI-CONTAINING FILM FORMING COMPOSITIONS AND METHODS OF MAKING AND USING THE SAME

CROSS REFERENCE TO RELATED APPLICATIONS

The present application is a 371 of International PCT Application PCT/US2017/023779, filed Mar. 23, 2017, which claims priority to U.S. provisional patent application number 62/312,352 filed Mar. 23, 2016, herein incorporated by reference in its entirety for all purposes.

TECHNICAL FIELD

Si-containing film forming compositions are disclosed comprising precursors containing a unit having the following formula:

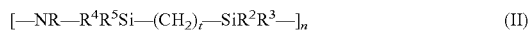

$$[-NR-R^4R^5Si-(CH_2)_t-SiR^2R^3-]_n \quad (II)$$

wherein m=1 to 4; t=1 to 4; n=2 to 400; $R^2$, $R^3$, $R^4$, and $R^5$ are independently H, a $C_1$ to $C_6$ hydrocarbon, or an alkylamino group having the formula $NR''_2$ and each R" is independently H, a $C_1$-$C_6$ hydrocarbon, a $C_6$-$C_{12}$ aryl, or $NR''_2$ forms a cyclic amine group, and provided that at least one of $R^2$, $R^3$, $R^4$, and $R^5$ is H; and R is H; a $C_1$-$C_6$ hydrocarbon; a silyl group having the formula $Si_xR'_{2x+1}$, with x=1 to 4 and each R' independently=H, a $C_1$-$C_6$ hydrocarbon group, or an alkylamino group having the formula $NR''_2$ and each R" independently H, a $C_1$-$C_6$ group, a $C_6$-$C_{12}$ aryl, or $NR''_2$ forms a cyclic amine group; or a $R^{1'}R^{2'}R^{3'}Si(CH_2)_bSiR^{4'}R^{5'}$ group, with b=1 to 2 and $R^{2'}$, $R^{3'}$, $R^{4'}$, and $R^{5'}$ are independently a H, a $C_1$-$C_6$ hydrocarbon, a $C_6$-$C_{12}$ aryl, or an alkylamino group having the formula $NR''_2$ and each R" is independently H, a $C_1$-$C_6$ group, a $C_6$-$C_{12}$ aryl, or $NR''_2$ forms a cyclic amine group; and provided that at least one of $R^{1'}$, $R^{2'}$, $R^{3'}$, $R^{4'}$, and $R^{5'}$ is H.

BACKGROUND

Si-containing films are used widely in the semiconductor, photovoltaic, LCD-TFT, flat panel-type device, refractory material, or aeronautic industries. Si-containing films may be used, for example, as dielectric materials having electrical properties which may be insulating ($SiO_2$, SiN, SiC, SiCN, SiCOH, $MSiO_x$, wherein M is Hf, Zr, Ti, Nb, Ta, or Ge and x is 0-4). Si-containing films may also be used as conducting fil7ms, such as metal silicides or metal silicon nitrides. Due to the strict requirements imposed by downscaling of electrical device architectures towards the nanoscale (especially below 28 nm node), increasingly finetuned molecular precursors are required which meet the requirements of volatility (for vapor deposition processes), lower process temperatures, reactivity with various oxidants and low film contamination, in addition to high deposition rates, conformality and consistency of films produced.

Hizawa and Nojimoto (Kogyo Kagaku Zasshi, 1956, 59,1359-63) describe the synthesis of $(Me_3SiCH_2SiMe_2)_2NH$ from the reaction of $Me_3SiCH_2SiMe_2Cl$ and $NH_3$.

O'Neill et al. (U.S. Pat. App. Pub. No. 2015/0087139) disclose five classes of organoaminosilane precursors, including $H_3Si-R^3-SiH_2-NR^1-SiH_2-R^3-SiH_3$, wherein $R^1$ is a linear or branched $C_1$ to $C_{12}$ hydrocarbon group, a linear or branched $C_3$ to $C_{12}$ alkenyl group, a linear or branched $C_3$ to $C_{12}$ alkynyl group, a $C_3$ to $C_{12}$ cyclic alkyl group, or a $C_5$ to $C_{12}$ aryl group and $R^3$ is a linear or branched $C_1$ to $C_{12}$ alkylene group, a linear or branched $C_3$ to $C_6$ alkynylene group, a $C_3$ to $C_{12}$ cyclic alkylene group, a $C_3$ to $C_{12}$ hetero-cyclic alkylene group, a $C_5$ to $C_{12}$ arylene group, or a $C_5$ to $C_{12}$ hetero arylene group.

WO2016/049154 to Fafard et al, discloses carbosilane substituted amine precursors for deposition of Si-containing films. The carbosilane substituted amine precursors have the formula $(R^1)_aN(-SiHR^2-CH_2-SiH_2-R^3)_{3-a}$, wherein a=0 or 1; $R^1$ is H a $C_1$ to $C_6$ alkyl group, or a halogen; $R^2$ and $R^3$ is each independently H, a halogen, an alkoxy, or an alkylamino group.

WO2016/160991 to Kerrigan et al. discloses catalytic dehydrogenative coupling of carbosilanes with ammonia, amines, and amidines.

A need remains to design and produce Si-depositing precursors, especially to design and produce precursors with halogen-free and/or more selective routes, to provide device engineers the ability to tune manufacturing process requirements and achieve films with desirable electrical and physical properties.

SUMMARY

Disclosed are Si-containing film forming compositions comprising precursors having the following formula:

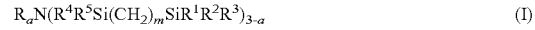

$$R_aN(R^4R^5Si(CH_2)_mSiR^1R^2R^3)_{3-a} \quad (I)$$

or containing a unit having the following formula:

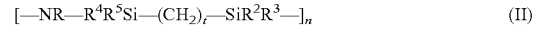

$$[-NR-R^4R^5Si-(CH_2)_t-SiR^2R^3-]_n \quad (II)$$

wherein
a=0 to 1;
m=1 to 4;
t=1 to 4;
n=2 to 400;
$R^1$, $R^2$, $R^3$, $R^4$, and $R^5$ are independently H, a hydrocarbon group ($C_1$ to $C_6$), or an alkylamino group having the formula $NR''_2$ and each R" is independently H, a $C_1$-$C_6$ hydrocarbon group, a $C_6$-$C_{12}$ aryl, or $NR''_2$ forms a cyclic amine group, and provided that at least one of $R^1$, $R^2$, $R^3$, $R^4$, and $R^5$ is H; and
R is H; a $C_1$-$C_6$ hydrocarbon group; a silyl group having the formula $Si_xR'_{2x+1}$ with x=1 to 4 and each R' independently=H, a $C_1$-$C_6$ hydrocarbon group, or an alkylamino group having the formula $NR''_2$ and each R" is independently H, a $C_1$-$C_6$ group, a $C_6$-$C_{12}$ aryl, or $NR''_2$ forms a cyclic amine group; or a $R^{1'}R^{2'}R^{3'}Si(CH_2)_bSiR^{4'}R^{5'}$ group, wherein b=1 to 2 and $R^{1'}$, $R^{2'}$, $R^{3'}$, $R^{4'}$, and $R^{5'}$ are independently H, a $C_1$-$C_6$ hydrocarbon group, a $C_6$-$C_{12}$ aryl, or an alkylamino group having the formula $NR''_2$ and each R" is independently H, a $C_1$-$C_6$ group, a $C_6$-$C_{12}$ aryl, or $NR''_2$ forms a cyclic amine group; and provided that at least one of $R^{1'}$, $R^{2'}$, $R^{3'}$, $R^{4'}$, and $R^{5'}$ is H. The disclosed Si-containing film forming compositions may include one or more of the following aspects:
  m=1 to 2;
  t=1 to 2;
  a=0 and m=1;
  the precursor being $N(SiR^4R^5(CH_2)SiR^1R^2R^3)_3$;
  $R^1=R^2=R^3=R^4=R^5$=H;
  the precursor being $N(-SiH_2-CH_2-SiH_3)_3$;
  at least one of $R^1$, $R^2$, or $R^3$=H;
  at least one of $R^4$ or $R^5$=H
  at least one of $R^1$, $R^2$, or $R^3$ and at least one of $R^4$ or $R^5$=H;
  $R^1$, $R^2$, $R^3$ and $R^4$=H;
  at least one of $R^1$, $R^2$, $R^3$, $R^4$, or $R^5$ being vinyl;

at least one of $R^1$, $R^2$, $R^3$, $R^4$, or $R^5$ being allyl;
at least one of $R^1$, $R^2$, $R^3$, $R^4$, or $R^5$ being phenyl;
$R^2$, $R^3$, $R^4$ and $R^5$=H;
the precursor being $N(SiH_2—CH_2—SiH_2(CH_2=CH))_3$;
the precursor being $N(SiH_2—CH_2—SiH_2(CH_2=CH—CH_2))_3$;
the precursor being $N(SiH_2—CH_2—SiH_2(NH_2))_3$;
the precursor being $N(SiH_2—CH_2—SiH_2(NMe_2))_3$;
the precursor being $N(SiH_2—CH_2—SiH_2(NMeEt))_3$;
the precursor being $N(SiH_2—CH_2—SiH_2(NEt_2))_3$;
the precursor being $N(SiH_2—CH_2—SiH_2(NnPr_2))_3$;
the precursor being $N(SiH_2—CH_2—SiH_2(NiPr_2))_3$;
the precursor being $N(SiH_2—CH_2—SiH_2(NBu_2))_3$;
the precursor being $N(SiH_2—CH_2—SiH_2(NiBu_2))_3$;
the precursor being $N(SiH_2—CH_2—SiH_2(NtBu_2))_3$;
the precursor being $N(SiH_2—CH_2—SiH_2(NAm_2))_3$;
the precursor being $N(SiH_2—CH_2—SiH_2(NCyPentyl_2))_3$;
the precursor being $N(SiH_2—CH_2—SiH_2(Nhexyl_2))_3$;
the precursor being $N(SiH_2—CH_2—SiH_2(NCyHex_2))_3$;
the precursor being $N(SiH_2—CH_2—SiH_2(NMeH))_3$;
the precursor being $N(SiH_2—CH_2—SiH_2(NEtH))_3$;
the precursor being $N(SiH_2—CH_2—SiH_2(NnPrH))_3$;
the precursor being $N(SiH_2—CH_2—SiH_2(NiPrH))_3$;
the precursor being $N(SiH_2—CH_2—SiH_2(NBuH))_3$;
the precursor being $N(SiH_2—CH_2—SiH_2(NiBuH))_3$;
the precursor being $N(SiH_2—CH_2—SiH_2(NtBuH))_3$;
the precursor being $N(SiH_2—CH_2—SiH_2(NAmH))_3$;
the precursor being $N(SiH_2—CH_2—SiH_2(pyridine))_3$;
the precursor being $N(SiH_2—CH_2—SiH_2(pyrrole))_3$;
the precursor being $N(SiH_2—CH_2—SiH_2(pyrrolidine))_3$;
the precursor being $N(SiH_2—CH_2—SiH_2(imidazole))_3$;
the precursor being $N(SiH_2—CH_2—SiH_2(pyrimidine))_3$;
the precursor being $N(SiH_2—CH_2—SiH_2(piperidine))_3$;
$R^1$, $R^2$ and $R^3$=H;
$R^2$, $R^3$ and $R^4$=H;
the precursor being $N(SiH(CH_2=CH)—CH_2—SiH_2(CH_2=CH))_3$;
the precursor being $N(SiH(CH_2=CH—CH_2)—CH_2—SiH_2(CH_2=CH—CH_2))_3$;
the precursor being $N(SiH(NH_2)—CH_2—SiH_2(NH_2))_3$;
the precursor being $N(SiH(NMe_2)-CH_2—SiH_2(NMe_2))_3$;
the precursor being $N(SiH(NMeEt)-CH_2—SiH_2(NMeEt))_3$;
the precursor being $N(SiH(NEt_2)-CH_2—SiH_2(NEt_2))_3$;
the precursor being $N(SiH(NnPr_2)-CH_2—SiH_2(NnPr_2))_3$;
the precursor being $N(SiH(NiPr_2)-CH_2—SiH_2(NiPr_2))_3$;
the precursor being $N(SiH(NBu_2)-CH_2—SiH_2(NBu_2))_3$;
the precursor being $N(SiH(NiBu_2)-CH_2—SiH_2(NiBu_2))_3$;
the precursor being $N(SiH(NtBu_2)-CH_2—SiH_2(NtBu_2))_3$;
the precursor being $N(SiH(NAm_2)-CH_2—SiH_2(NAm_2))_3$;
the precursor being $N(SiH(NCyPentyl_2)-CH_2—SiH_2(NCyPentyl_2))_3$;
the precursor being $N(SiH(Nhexyl_2)-CH_2—SiH_2(Nhexyl_2))_3$;
the precursor being $N(SiH(NCyHex_2)-CH_2—SiH_2(NCyHex_2))_3$;
the precursor being $N(SiH(NMeH)—CH_2—SiH_2(NMeH))_3$;
the precursor being $N(SiH(NEtH)—CH_2—SiH_2(NEtH))_3$;
the precursor being $N(SiH(NnPrH)—CH_2—SiH_2(NnPrH))_3$;
the precursor being $N(SiH(NiPrH)—CH_2—SiH_2(NiPrH))_3$;
the precursor being $N(SiH(NBuH)—CH_2—SiH_2(NBuH))_3$;
the precursor being $N(SiH(NiBuH)—CH_2—SiH_2(NiBuH))_3$;
the precursor being $N(SiH(NtBuH)—CH_2—SiH_2(NtBuH))_3$;
the precursor being $N(SiH(NAmH)—CH_2—SiH_2(NAmH))_3$;
the precursor being $N(SiH(pyridine)-CH_2—SiH_2(pyridine))_3$;
the precursor being $N(SiH(pyrrole)-CH_2—SiH_2(pyrrole))_3$;
the precursor being $N(SiH(pyrrolidine)-CH_2—SiH_2(pyrrolidine))_3$;
the precursor being $N(SiH(imidazole)-CH_2—SiH_2(imidazole))_3$;
the precursor being $N(SiH(piperidine)-CH_2—SiH_2(imidazole))_3$;
the precursor being $N(SiH(pyrimidine)-CH_2—SiH_2(imidazole))_3$;
$R^3$, $R^4$ and $R^5$=H;
the precursor being $N(SiH_2—CH_2—SiH(CH_2=CH)_2)_3$;
the precursor being $N(SiH_2—CH_2—SiH(CH_2=CH—CH_2)_2)_3$;
the precursor being $N(SiH_2—CH_2—SiH(NH_2)_2)_3$;
the precursor being $N(SiH_2—CH_2—SiH(NMe_2)_2)_3$;
the precursor being $N(SiH_2—CH_2—SiH(NMeEt)_2)_3$;
the precursor being $N(SiH_2—CH_2—SiH(NEt_2)_2)_3$;
the precursor being $N(SiH_2—CH_2—SiH(NnPr_2)_2)_3$;
the precursor being $N(SiH_2—CH_2—SiH(NiPr_2)_2)_3$;
the precursor being $N(SiH_2—CH_2—SiH(NBu_2)_2)_3$;
the precursor being $N(SiH_2—CH_2—SiH(NiBu_2)_2)_3$;
the precursor being $N(SiH_2—CH_2—SiH(NtBu_2)_2)_3$;
the precursor being $N(SiH_2—CH_2—SiH(NAm_2)_2)_3$;
the precursor being $N(SiH_2—CH_2—SiH(NCyPentyl_2)_2)_3$;
the precursor being $N(SiH_2—CH_2—SiH(Nhexyl_2)_2)_3$;
the precursor being $N(SiH_2—CH_2—SiH(NCyHex_2)_2)_3$;
the precursor being $N(SiH_2—CH_2—SiH(NMeH)_2)_3$;
the precursor being $N(SiH_2—CH_2—SiH(NEtH)_2)_3$;
the precursor being $N(SiH_2—CH_2—SiH(NnPrH)_2)_3$;
the precursor being $N(SiH_2—CH_2—SiH(NiPrH)_2)_3$;
the precursor being $N(SiH_2—CH_2—SiH(NBuH)_2)_3$;
the precursor being $N(SiH_2—CH_2—SiH(NiBuH)_2)_3$;
the precursor being $N(SiH_2—CH_2—SiH(NtBuH)_2)_3$;
the precursor being $N(SiH_2—CH_2—SiH(NAmH)_2)_3$;
the precursor being $N(SiH_2—CH_2—SiH(pyridine)_2)_3$;
the precursor being $N(SiH_2—CH_2—SiH(pyrrole)_2)_3$;
the precursor being $N(SiH_2—CH_2—SiH(pyrrolidine)_2)_3$;
the precursor being $N(SiH_2—CH_2—SiH(imidazole)_2)_3$;
the precursor being $N(SiH_2—CH_2—SiH(piperidine)_2)_3$;
the precursor being $N(SiH_2—CH_2—SiH(pyrimidine)_2)_3$;
$R^4$ and $R^5$=H;
the precursor being $N(SiH_2—CH_2—Si(CH_2=CH)_3)_3$;
the precursor being $N(SiH_2—CH_2—Si(CH_2=CH—CH_2)_3)_3$;
the precursor being $N(SiH_2—CH_2—Si(NH_2)_3)_3$;
the precursor being $N(SiH_2—CH_2—Si(NMe_2)_3)_3$;
the precursor being $N(SiH_2—CH_2—Si(NMeEt)_3)_3$;
the precursor being $N(SiH_2—CH_2—Si(NEt_2)_3)_3$;
the precursor being $N(SiH_2—CH_2—Si(NnPr_2)_3)_3$;
the precursor being $N(SiH_2—CH_2—Si(NiPr_2)_3)_3$;
the precursor being $N(SiH_2—CH_2—Si(NBu_2)_3)_3$;
the precursor being $N(SiH_2—CH_2—Si(NiBu_2)_3)_3$;
the precursor being $N(SiH_2—CH_2—Si(NtBu_2)_3)_3$;
the precursor being $N(SiH_2—CH_2—Si(NAm_2)_3)_3$;
the precursor being $N(SiH_2—CH_2—Si(NCyPentyl_2)_3)_3$;

the precursor being N(SiH$_2$—CH$_2$—Si(Nhexyl$_2$)$_3$)$_3$;
the precursor being N(SiH$_2$—CH$_2$—Si(NCyHex$_2$)$_3$)$_3$;
the precursor being N(SiH$_2$—CH$_2$—Si(NMeH)$_3$)$_3$;
the precursor being N(SiH$_2$—CH$_2$—Si(NEtH)$_3$)$_3$;
the precursor being N(SiH$_2$—CH$_2$—Si(NnPrH)$_3$)$_3$;
the precursor being N(SiH$_2$—CH$_2$—Si(NiPrH)$_3$)$_3$;
the precursor being N(SiH$_2$—CH$_2$—Si(NBuH)$_3$)$_3$;
the precursor being N(SiH$_2$—CH$_2$—Si(NiBuH)$_3$)$_3$;
the precursor being N(SiH$_2$—CH$_2$—Si(NtBuH)$_3$)$_3$;
the precursor being N(SiH$_2$—CH$_2$—Si(NAmH)$_3$)$_3$;
the precursor being N(SiH$_2$—CH$_2$—Si(pyridine)$_3$)$_3$;
the precursor being N(SiH$_2$—CH$_2$—Si(pyrrole)$_3$)$_3$;
the precursor being N(SiH$_2$—CH$_2$—Si(pyrrolidine)$_3$)$_3$;
the precursor being N(SiH$_2$—CH$_2$—Si(imidazole)$_3$)$_3$;
the precursor being N(SiH$_2$—CH$_2$—Si(piperidine)$_3$)$_3$;
the precursor being N(SiH$_2$—CH$_2$—Si(pyrimidine)$_3$)$_3$;
a=0 and m=2;
the precursor being N(SiR$^4$R$^5$(CH$_2$CH$_2$)SiR$^1$R$^2$R$^3$)$_3$;
R$^1$, R$^2$, R$^3$, R$^4$ and R$^5$=H;
the precursor being N(SiH$_2$—CH$_2$—CH$_2$—SiH$_3$)$_3$;
R$^1$, R$^2$, R$^3$ and R$^4$=H;
R$^2$, R$^3$, R$^4$ and R$^5$=H;
the precursor being N(SiH$_2$—CH$_2$—CH$_2$—SiH$_2$(CH$_2$=CH))$_3$;
the precursor being N(SiH$_2$—CH$_2$—CH$_2$—SiH$_2$(CH$_2$=CH—CH$_2$))$_3$;
the precursor being N(SiH$_2$—CH$_2$—CH$_2$—SiH$_2$(NH$_2$))$_3$;
the precursor being N(SiH$_2$—CH$_2$—CH$_2$—SiH$_2$(NMe$_2$))$_3$;
the precursor being N(SiH$_2$—CH$_2$—CH$_2$—SiH$_2$(NMeEt))$_3$;
the precursor being N(SiH$_2$—CH$_2$—CH$_2$—SiH$_2$(NEt$_2$))$_3$;
the precursor being N(SiH$_2$—CH$_2$—CH$_2$—SiH$_2$(NnPr$_2$))$_3$;
the precursor being N(SiH$_2$—CH$_2$—CH$_2$—SiH$_2$(NiPr$_2$))$_3$;
the precursor being N(SiH$_2$—CH$_2$—CH$_2$—SiH$_2$(NBu$_2$))$_3$;
the precursor being N(SiH$_2$—CH$_2$—CH$_2$—SiH$_2$(NiBu$_2$))$_3$;
the precursor being N(SiH$_2$—CH$_2$—CH$_2$—SiH$_2$(NtBu$_2$))$_3$;
the precursor being N(SiH$_2$—CH$_2$—CH$_2$—SiH$_2$(NAm$_2$))$_3$;
the precursor being N(SiH$_2$—CH$_2$—CH$_2$—SiH$_2$(NCyPentyl$_2$))$_3$;
the precursor being N(SiH$_2$—CH$_2$—CH$_2$—SiH$_2$(Nhexyl$_2$))$_3$;
the precursor being N(SiH$_2$—CH$_2$—CH$_2$—SiH$_2$(NCyHex$_2$))$_3$;
the precursor being N(SiH$_2$—CH$_2$—CH$_2$—SiH$_2$(NMeH))$_3$;
the precursor being N(SiH$_2$—CH$_2$—CH$_2$—SiH$_2$(NEtH))$_3$;
the precursor being N(SiH$_2$—CH$_2$—CH$_2$—SiH$_2$(NnPrH))$_3$;
the precursor being N(SiH$_2$—CH$_2$—CH$_2$—SiH$_2$(NiPrH))$_3$;
the precursor being N(SiH$_2$—CH$_2$—CH$_2$—SiH$_2$(NBuH))$_3$;
the precursor being N(SiH$_2$—CH$_2$—CH$_2$—SiH$_2$(NiBuH))$_3$;
the precursor being N(SiH$_2$—CH$_2$—CH$_2$—SiH$_2$(NtBuH))$_3$;
the precursor being N(SiH$_2$—CH$_2$—CH$_2$—SiH$_2$(NAmH))$_3$;
the precursor being N(SiH$_2$—CH$_2$—CH$_2$—SiH$_2$(pyridine))$_3$;
the precursor being N(SiH$_2$—CH$_2$—CH$_2$—SiH$_2$(pyrrole))$_3$;
the precursor being N(SiH$_2$—CH$_2$—CH$_2$—SiH$_2$(pyrrolidine))$_3$;
the precursor being N(SiH$_2$—CH$_2$—CH$_2$—SiH$_2$(imidazole))$_3$;
the precursor being N(SiH$_2$—CH$_2$—CH$_2$—SiH$_2$(piperidine))$_3$;
the precursor being N(SiH$_2$—CH$_2$—CH$_2$—SiH$_2$(pyrimidine))$_3$;
R$^2$ and R$^3$=H;
R$^2$, R$^3$ and R$^4$=H;
the precursor being N(SiH(CH$_2$=CH)—CH$_2$—CH$_2$—SiH$_2$(CH$_2$=CH))$_3$;
the precursor being N(SiH(CH$_2$=CH—CH$_2$)—CH$_2$—CH$_2$—SiH$_2$(CH$_2$=CH—CH$_2$))$_3$;
the precursor being N(SiH(NH$_2$)—CH$_2$—CH$_2$—SiH$_2$(NH$_2$))$_3$;
the precursor being N(SiH(NMe$_2$)-CH$_2$—CH$_2$—SiH$_2$(NMe$_2$))$_3$;
the precursor being N(SiH(NMeEt)-CH$_2$—CH$_2$—SiH$_2$(NMeEt))$_3$;
the precursor being N(SiH(NEt$_2$)-CH$_2$—CH$_2$—SiH$_2$(NEt$_2$))$_3$;
the precursor being N(SiH(NnPr$_2$)-CH$_2$—CH$_2$—SiH$_2$(NnPr$_2$))$_3$;
the precursor being N(SiH(NiPr$_2$)-CH$_2$—CH$_2$—SiH$_2$(NiPr$_2$))$_3$;
the precursor being N(SiH(NBu$_2$)-CH$_2$—CH$_2$—SiH$_2$(NBu$_2$))$_3$;
the precursor being N(SiH(NiBu$_2$)-CH$_2$—CH$_2$—SiH$_2$(NiBu$_2$))$_3$;
the precursor being N(SiH(NtBu$_2$)-CH$_2$—CH$_2$—SiH$_2$(NtBu$_2$))$_3$;
the precursor being N(SiH(NAm$_2$)-CH$_2$—CH$_2$—SiH$_2$(NAm$_2$))$_3$;
the precursor being N(SiH(NCyPentyl$_2$)-CH$_2$—CH$_2$—SiH$_2$(NCyPentyl$_2$))$_3$;
the precursor being N(SiH(Nhexyl$_2$)-CH$_2$—CH$_2$—SiH$_2$(Nhexyl$_2$))$_3$;
the precursor being N(SiH(NCyHex$_2$)-CH$_2$—CH$_2$—SiH$_2$(NCyHex$_2$))$_3$;
the precursor being N(SiH(NMeH)—CH$_2$—CH$_2$—SiH$_2$(NMeH))$_3$;
the precursor being N(SiH(NEtH)—CH$_2$—CH$_2$—SiH$_2$(NEtH))$_3$;
the precursor being N(SiH(NnPrH)—CH$_2$—CH$_2$—SiH$_2$(NnPrH))$_3$;
the precursor being N(SiH(NniPrH)—CH$_2$—CH$_2$—SiH$_2$(NiPrH))$_3$;
the precursor being N(SiH(NBuH)—CH$_2$—CH$_2$—SiH$_2$(NBuH))$_3$;
the precursor being N(SiH(NiBuH)—CH$_2$—CH$_2$—SiH$_2$(NtBuH))$_3$;
the precursor being N(SiH(NtBuH)—CH$_2$—CH$_2$—SiH$_2$(NtBuH))$_3$;
the precursor being N(SiH(NAmH)—CH$_2$—CH$_2$—SiH$_2$(NAmH))$_3$;
the precursor being N(SiH(pyridine)-CH$_2$—CH$_2$—SiH$_2$(pyridine))$_3$;
the precursor being N(SiH(pyrrole)-CH$_2$—CH$_2$—SiH$_2$(pyrrole))$_3$;
the precursor being N(SiH(pyrrolidine)-CH$_2$—CH$_2$—SiH$_2$(pyrrolidine))$_3$;

the precursor being N(SiH(imidazole)-CH$_2$—CH$_2$—SiH$_2$(imidazole))$_3$;
the precursor being N(SiH(piperidine)-CH$_2$—CH$_2$—SiH$_2$(piperidine))$_3$;
the precursor being N(SiH(pyrimidine)-CH$_2$—CH$_2$—SiH$_2$(pyrimidine))$_3$;
R$^3$, R$^4$ and R$^5$=H;
the precursor being N(SiH$_2$—CH$_2$—CH$_2$—SiH(CH$_2$=CH)$_2$)$_3$;
the precursor being N(SiH$_2$—CH$_2$—CH$_2$—SiH(CH$_2$=CH—CH$_2$)$_2$)$_3$;
the precursor being N(SiH$_2$—CH$_2$—CH$_2$—SiH(NH$_2$)$_2$)$_3$;
the precursor being N(SiH$_2$—CH$_2$—CH$_2$—SiH(NMe$_2$)$_2$)$_3$;
the precursor being N(SiH$_2$—CH$_2$—CH$_2$—SiH(NMeEt)$_2$)$_3$;
the precursor being N(SiH$_2$—CH$_2$—CH$_2$—SiH(NEt$_2$)$_2$)$_3$;
the precursor being N(SiH$_2$—CH$_2$—CH$_2$—SiH(NnPr$_2$)$_2$)$_3$;
the precursor being N(SiH$_2$—CH$_2$—CH$_2$—SiH(NiPr$_2$)$_2$)$_3$;
the precursor being N(SiH$_2$—CH$_2$—CH$_2$—SiH(NBu$_2$)$_2$)$_3$;
the precursor being N(SiH$_2$—CH$_2$—CH$_2$—SiH(NiBu$_2$)$_2$)$_3$;
the precursor being N(SiH$_2$—CH$_2$—CH$_2$—SiH(NtBu$_2$)$_2$)$_3$;
the precursor being N(SiH$_2$—CH$_2$—CH$_2$—SiH(NAm$_2$)$_2$)$_3$;
the precursor being N(SiH$_2$—CH$_2$—CH$_2$—SiH(NCyPentyl$_2$)$_2$)$_3$;
the precursor being N(SiH$_2$—CH$_2$—CH$_2$—SiH(Nhexyl$_2$)$_2$)$_3$;
the precursor being N(SiH$_2$—CH$_2$—CH$_2$—SiH(NCyHex$_2$)$_2$)$_3$;
the precursor being N(SiH$_2$—CH$_2$—CH$_2$—SiH(NMeH)$_2$)$_3$;
the precursor being N(SiH$_2$—CH$_2$—CH$_2$—SiH(NEtH)$_2$)$_3$;
the precursor being N(SiH$_2$—CH$_2$—CH$_2$—iH(NnPrH)$_2$)$_3$;
the precursor being N(SiH$_2$—CH$_2$—CH$_2$—SiH(NiPrH)$_2$)$_3$;
the precursor being N(SiH$_2$—CH$_2$—CH$_2$—SiH(NBuH)$_2$)$_3$;
the precursor being N(SiH$_2$—CH$_2$—CH$_2$—SiH(NiBuH)$_2$)$_3$;
the precursor being N(SiH$_2$—CH$_2$—CH$_2$—SiH(NtBuH)$_2$)$_3$;
the precursor being N(SiH$_2$—CH$_2$—CH$_2$—SiH(NAmH)$_2$)$_3$;
the precursor being N(SiH$_2$—CH$_2$—CH$_2$—SiH(pyridine)$_2$)$_3$;
the precursor being N(SiH$_2$—CH$_2$—CH$_2$—SiH(pyrrole)$_2$)$_3$;
the precursor being N(SiH$_2$—CH$_2$—CH$_2$—SiH(pyrrolidine)$_2$)$_3$;
the precursor being N(SiH$_2$—CH$_2$—CH$_2$—SiH(imidazole)$_2$)$_3$;
the precursor being N(SiH$_2$—CH$_2$—CH$_2$—SiH(piperidine)$_2$)$_3$;
the precursor being N(SiH$_2$—CH$_2$—CH$_2$—SiH(pyrimidine)$_2$)$_3$;
R$^4$ and R$^5$=H;
the precursor being N(SiH$_2$—CH$_2$—CH$_2$—Si(CH$_2$=CH)$_3$)$_3$;
the precursor being N(SiH$_2$—CH$_2$—CH$_2$—Si(CH$_2$=CH—CH$_2$)$_3$)$_3$;
the precursor being N(SiH$_2$—CH$_2$—CH$_2$—Si(NH$_2$)$_3$)$_3$;
the precursor being N(SiH$_2$—CH$_2$—CH$_2$—Si(NMe$_2$)$_3$)$_3$;
the precursor being N(SiH$_2$—CH$_2$—CH$_2$—Si(NMeEt)$_3$)$_3$;
the precursor being N(SiH$_2$—CH$_2$—CH$_2$—Si(NEt$_2$)$_3$)$_3$;
the precursor being N(SiH$_2$—CH$_2$—CH$_2$—Si(NnPr$_2$)$_3$)$_3$;
the precursor being N(SiH$_2$—CH$_2$—CH$_2$—Si(NiPr$_2$)$_3$)$_3$;
the precursor being N(SiH$_2$—CH$_2$—CH$_2$—Si(NBu$_2$)$_3$)$_3$;
the precursor being N(SiH$_2$—CH$_2$—CH$_2$—Si(NiBu$_2$)$_3$)$_3$;
the precursor being N(SiH$_2$—CH$_2$—CH$_2$—Si(NtBu$_2$)$_3$)$_3$;
the precursor being N(SiH$_2$—CH$_2$—CH$_2$—Si(NAm$_2$)$_3$)$_3$;
the precursor being N(SiH$_2$—CH$_2$—CH$_2$—Si(NCyPentyl$_2$)$_3$)$_3$;
the precursor being N(SiH$_2$—CH$_2$—CH$_2$—Si(Nhexyl$_2$)$_3$)$_3$;
the precursor being N(SiH$_2$—CH$_2$—CH$_2$—Si(NCyHex$_2$)$_3$)$_3$;
the precursor being N(SiH$_2$—CH$_2$—CH$_2$—Si(NMeH)$_3$)$_3$;
the precursor being N(SiH$_2$—CH$_2$—CH$_2$—Si(NEtH)$_3$)$_3$;
the precursor being N(SiH$_2$—CH$_2$—CH$_2$—Si(NnPrH)$_3$)$_3$;
the precursor being N(SiH$_2$—CH$_2$—CH$_2$—Si(NiPrH)$_3$)$_3$;
the precursor being N(SiH$_2$—CH$_2$—CH$_2$—Si(NBuH)$_3$)$_3$;
the precursor being N(SiH$_2$—CH$_2$—CH$_2$—Si(NiBuH)$_3$)$_3$;
the precursor being N(SiH$_2$—CH$_2$—CH$_2$—Si(NtBuH)$_3$)$_3$;
the precursor being N(SiH$_2$—CH$_2$—CH$_2$—Si(NAmH)$_3$)$_3$;
the precursor being N(SiH$_2$—CH$_2$—CH$_2$—Si(pyridine)$_3$)$_3$;
the precursor being N(SiH$_2$—CH$_2$—CH$_2$—Si(pyrrole)$_3$)$_3$;
the precursor being N(SiH$_2$—CH$_2$—CH$_2$—Si(pyrrolidine)$_3$)$_3$;
the precursor being N(SiH$_2$—CH$_2$—CH$_2$—Si(imidazole)$_3$)$_3$;
the precursor being N(SiH$_2$—CH$_2$—CH$_2$—Si(piperidine)$_3$)$_3$;
the precursor being N(SiH$_2$—CH$_2$—CH$_2$—Si(pyrimidine)$_3$)$_3$;
a=1 and m=1;
the precursor being RN(SiR$^4$R$^5$(CH$_2$)SiR$^1$R$^2$R$^3$)$_2$;
R, R$^1$, R$^2$, R$^3$, R$^4$ and R$^5$=H;
the precursor being HN(SiH$_2$—CH$_2$—SiH$_3$)$_2$;
at least one of R, R$^1$, R$^2$, R$^3$, R$^4$, or R$^5$ being vinyl;
at least one of R, R$^1$, R$^2$, R$^3$, R$^4$, or R$^5$ being allyl;
at least one of R, R$^1$, R$^2$, R$^3$, R$^4$, or R$^5$ being phenyl;
R$^1$, R$^2$, R$^3$, R$^4$ and R$^5$=H and R=Si$_x$H$_{2x+1}$ (x=1 to 4);
the precursor being SiH$_3$N(SiH$_2$—CH$_2$—SiH$_3$)$_2$;
the precursor being Si$_2$H$_5$N(SiH$_2$—CH$_2$—SiH$_3$)$_2$;
the precursor being Si$_3$H$_7$N(SiH$_2$—CH$_2$—SiH$_3$)$_2$;
the precursor being Si$_4$H$_9$N(SiH$_2$—CH$_2$—SiH$_3$)$_2$;
R$^1$, R$^2$, R$^3$, R$^4$ and R$^5$=H and R=C$_y$H$_{2y+1}$ (y=1 to 6);
the precursor being (Me)N(SiH$_2$—CH$_2$—SiH$_3$)$_2$;
the precursor being (Et)N(SiH$_2$—CH$_2$—SiH$_3$)$_2$
the precursor being (nPr)N(SiH$_2$—CH$_2$—SiH$_3$)$_2$;
the precursor being (iPr)N(SiH$_2$—CH$_2$—SiH$_3$)$_2$;
the precursor being (Bu)N(SiH$_2$—CH$_2$—SiH$_3$)$_2$;
the precursor being (iBu)N(SiH$_2$—CH$_2$—SiH$_3$)$_2$;
the precursor being (tBu)N(SiH$_2$—CH$_2$—SiH$_3$)$_2$;
the precursor being (amyl)N(SiH$_2$—CH$_2$—SiH$_3$)$_2$;
the precursor being (hexyl)N(SiH$_2$—CH$_2$—SiH$_3$)$_2$;
the precursor being (SiMe$_3$)N(SiH$_2$—CH$_2$—SiH$_3$)$_2$;

the precursor being (SiEt$_3$)N(SiH$_2$—CH$_2$—SiH$_3$)$_2$;
the precursor being Si(iPr)$_3$N(SiH$_2$—CH$_2$—SiH$_3$)$_2$;
the precursor being Si(nPr)$_3$N(SiH$_2$—CH$_2$—SiH$_3$)$_2$;
the precursor being Si(Bu)$_3$N(SiH$_2$—CH$_2$—SiH$_3$)$_2$;
the precursor being Si(iBu)$_3$N(SiH$_2$—CH$_2$—SiH$_3$)$_2$;
the precursor being Si(tBu)$_3$N(SiH$_2$—CH$_2$—SiH$_3$)$_2$;
the precursor being Si(amyl)$_3$N(SiH$_2$—CH$_2$—SiH$_3$)$_2$;
the precursor being Si(hexyl)$_3$N(SiH$_2$—CH$_2$—SiH$_3$)$_2$;
the precursor being SiHMe$_2$N(SiH$_2$—CH$_2$—SiH$_3$)$_2$;
the precursor being SiHEt$_2$N(SiH$_2$—CH$_2$—SiH$_3$)$_2$;
the precursor being SiH(iPr)$_2$N(SiH$_2$—CH$_2$—SiH$_3$)$_2$;
the precursor being SiH(nPr)$_2$N(SiH$_2$—CH$_2$—SiH$_3$)$_2$;
the precursor being SiH(Bu)$_2$N(SiH$_2$—CH$_2$—SiH$_3$)$_2$;
the precursor being SiH(iBu)$_2$N(SiH$_2$—CH$_2$—SiH$_3$)$_2$;
the precursor being SiH(tBu)$_2$N(SiH$_2$—CH$_2$—SiH$_3$)$_2$;
the precursor being SiH(amyl)$_2$N(SiH$_2$—CH$_2$—SiH$_3$)$_2$;
the precursor being SiH(hexyl)$_2$N(SiH$_2$—CH$_2$—SiH$_3$)$_2$;
the precursor being SiH$_2$MeN(SiH$_2$—CH$_2$—SiH$_3$)$_2$;
the precursor being SiH$_2$EtN(SiH$_2$—CH$_2$—SiH$_3$)$_2$;
the precursor being SiH$_2$(iPr)N(SiH$_2$—CH$_2$—SiH$_3$)$_2$;
the precursor being SiH$_2$(nPr)N(SiH$_2$—CH$_2$—SiH$_3$)$_2$;
the precursor being SiH$_2$(Bu)N(SiH$_2$—CH$_2$—SiH$_3$)$_2$;
the precursor being SiH$_2$(iBu)N(SiH$_2$—CH$_2$—SiH$_3$)$_2$;
the precursor being SiH$_2$(tBu)N(SiH$_2$—CH$_2$—SiH$_3$)$_2$;
the precursor being SiH$_2$(amyl)N(SiH$_2$—CH$_2$—SiH$_3$)$_2$;
the precursor being SiH$_2$(hexyl)N(SiH$_2$—CH$_2$—SiH$_3$)$_2$;
the precursor being (SiH$_3$—CH$_2$—CH$_2$—SiH$_2$)N(SiH$_2$—CH$_2$—SiH$_3$)$_2$;
the precursor being (SiMe$_3$-CH$_2$—SiMe$_2$)N(SiH$_2$—CH$_2$—SiH$_3$)$_2$;
the precursor being (SiMe$_3$-CH$_2$—CH$_2$—SiMe$_2$)N(SiH$_2$—CH$_2$—SiH$_3$)$_2$;
the precursor being (SiEt$_3$-CH$_2$—SiEt$_2$)N(SiH$_2$—CH$_2$—SiH$_3$)$_2$
the precursor being (SiEt$_3$-CH$_2$—CH$_2$—SiEt$_2$)N(SiH$_2$—CH$_2$—SiH$_3$)$_2$;
the precursor being (SiH$_2$NMe$_2$)N(SiH$_2$—CH$_2$—SiH$_3$)$_2$;
the precursor being (SiH$_2$NEt$_2$)N(SiH$_2$—CH$_2$—SiH$_3$)$_2$;
the precursor being (SiH$_2$NMeEt)N(SiH$_2$—CH$_2$—SiH$_3$)$_2$;
the precursor being (SiH(NMe$_2$)$_2$)N(SiH$_2$—CH$_2$—SiH$_3$)$_2$;
the precursor being (SiH(NEt$_2$)$_2$)N(SiH$_2$—CH$_2$—SiH$_3$)$_2$;
R$^1$, R$^2$, R$^3$ and R$^4$=H and R=H, C$_u$H$_{2u+1}$, or Si$_v$H$_{2v-1}$, wherein u=1-6 and v=1-4;
R$^2$, R$^3$, R$^4$ and R$^5$=H and R=H, C$_u$H$_{2u+1}$, or SivH$_{2v-1}$, wherein u=1-6 and v=1-4;
the precursor being RN(SiH$_2$—CH$_2$—SiH$_2$(CH$_2$=CH))$_2$;
the precursor being RN(SiH$_2$—CH$_2$—SiH$_2$(CH$_2$=CH—CH$_2$))$_2$;
the precursor being RN(SiH$_2$—CH$_2$—SiH$_2$(NH$_2$))$_2$;
the precursor being RN(SiH$_2$—CH$_2$—SiH$_2$(NMe$_2$))$_2$;
the precursor being RN(SiH$_2$—CH$_2$—SiH$_2$(NMeEt))$_2$;
the precursor being RN(SiH$_2$—CH$_2$—SiH$_2$(NEt$_2$))$_2$;
the precursor being RN(SiH$_2$—CH$_2$—SiH$_2$(NnPr$_2$))$_2$;
the precursor being RN(SiH$_2$—CH$_2$—SiH$_2$(NiPr$_2$))$_2$;
the precursor being RN(SiH$_2$—CH$_2$—SiH$_2$(NBu$_2$))$_2$;
the precursor being RN(SiH$_2$—CH$_2$—SiH$_2$(NiBu$_2$))$_2$;
the precursor being RN(SiH$_2$—CH$_2$—SiH$_2$(NtBu$_2$))$_2$;
the precursor being RN(SiH$_2$—CH$_2$—SiH$_2$(NAm$_2$))$_2$;
the precursor being RN(SiH$_2$—CH$_2$—SiH$_2$(NCyPentyl$_2$))$_2$;
the precursor being RN(SiH$_2$—CH$_2$—SiH$_2$(Nhexyl$_2$))$_2$;
the precursor being RN(SiH$_2$—CH$_2$—SiH$_2$(NCyHex$_2$))$_2$;
the precursor being RN(SiH$_2$—CH$_2$—SiH$_2$(NMeH))$_2$;
the precursor being RN(SiH$_2$—CH$_2$—SiH$_2$(NEtH))$_2$;
the precursor being RN(SiH$_2$—CH$_2$—SiH$_2$(NnPrH))$_2$;
the precursor being RN(SiH$_2$—CH$_2$—SiH$_2$(NiPrH))$_2$;
the precursor being RN(SiH$_2$—CH$_2$—SiH$_2$(NBuH))$_2$;
the precursor being RN(SiH$_2$—CH$_2$—SiH$_2$(NiBuH))$_2$;
the precursor being RN(SiH$_2$—CH$_2$—SiH$_2$(NtBuH))$_2$;
the precursor being RN(SiH$_2$—CH$_2$—SiH$_2$(NAmH))$_2$;
the precursor being RN(SiH$_2$—CH$_2$—SiH$_2$(pyridine))$_2$;
the precursor being RN(SiH$_2$—CH$_2$—SiH$_2$(pyrrole))$_2$;
the precursor being RN(SiH$_2$—CH$_2$—SiH$_2$(pyrrolidine))$_2$;
the precursor being RN(SiH$_2$—CH$_2$—SiH$_2$(imidazole))$_2$;
the precursor being RN(SiH$_2$—CH$_2$—SiH$_2$(piperidine))$_2$;
the precursor being RN(SiH$_2$—CH$_2$—SiH$_2$(pyrimidine))$_2$;
R$^1$, R$^2$ and R$^3$=H and R=H, C$_u$H$_{2u+1}$, SivH$_{2v-1}$, wherein u=1-6 and v=1-4;
R$^2$, R$^3$ and R$^4$=H and R=H, C$_u$H$_{2u+1}$, or SivH$_{2v-1}$, wherein u=1-6 and v=1-4;
the precursor being RN(SiH(CH$_2$=CH)—CH$_2$—SiH$_2$(CH$_2$=CH))$_2$;
the precursor being RN(SiH(CH$_2$=CH—CH$_2$)—CH$_2$—SiH$_2$(CH$_2$=CH—CH$_2$))$_2$;
the precursor being RN(SiH(NH$_2$)—CH$_2$—SiH$_2$(NH$_2$))$_2$;
the precursor being RN(SiH(NMe$_2$)-CH$_2$—SiH$_2$(NMe$_2$))$_2$;
the precursor being RN(SiH(NMeEt)-CH$_2$—SiH$_2$(NMeEt))$_2$;
the precursor being RN(SiH(NEt$_2$)-CH$_2$—SiH$_2$(NEt$_2$))$_2$;
the precursor being RN(SiH(NnPr$_2$)-CH$_2$—SiH$_2$(NnPr$_2$))$_2$;
the precursor being RN(SiH(NiPr$_2$)-CH$_2$—SiH$_2$(NiPr$_2$))$_2$;
the precursor being RN(SiH(NBu$_2$)-CH$_2$—SiH$_2$(NBu$_2$))$_2$;
the precursor being RN(SiH(NiBu$_2$)-CH$_2$—SiH$_2$(NiBu$_2$))$_2$;
the precursor being RN(SiH(NtBu$_2$)-CH$_2$—SiH$_2$(NtBu$_2$))$_2$;
the precursor being RN(SiH(NAm$_2$)-CH$_2$—SiH$_2$(NAm$_2$))$_2$;
the precursor being RN(SiH(NCyPentyl$_2$)-CH$_2$—SiH$_2$(NCyPentyl$_2$))$_2$;
the precursor being RN(SiH(Nhexyl$_2$)-CH$_2$—SiH$_2$(Nhexyl$_2$))$_2$;
the precursor being RN(SiH(NCyHex$_2$)-CH$_2$—SiH$_2$(NCyHex$_2$))$_2$;
the precursor being RN(SiH(NMeH)—CH$_2$—SiH$_2$(NMeH))$_2$;
the precursor being RN(SiH(NEtH)—CH$_2$—SiH$_2$(NEtH))$_2$;
the precursor being RN(SiH(NnPrH)—CH$_2$—SiH$_2$(Nn-PrH))$_2$;
the precursor being RN(SiH(NiPrH)—CH$_2$—SiH$_2$(Ni-PrH))$_2$;
the precursor being RN(SiH(NBuH)—CH$_2$—SiH$_2$(NBuH))$_2$;
the precursor being RN(SiH(NiBuH)—CH$_2$—SiH$_2$(NiBuH))$_2$;
the precursor being RN(SiH(NtBuH)—CH$_2$—SiH$_2$(Nt-BuH))$_2$;
the precursor being RN(SiH(NAmH)—CH$_2$—SiH$_2$(NAmH))$_2$;
the precursor being RN(SiH(pyridine)-CH$_2$—SiH$_2$(pyridine))$_2$;
the precursor being RN(SiH(pyrrole)-CH$_2$—SiH$_2$(pyrrole))$_2$;

the precursor being RN(SiH(pyrrolidiHNe)-CH$_2$—SiH$_2$(pyrrolidiHNe))$_2$;
the precursor being RN(SiH(imidazole)-CH$_2$—SiH$_2$(imidazole))$_2$;
the precursor being RN(SiH(piperidine)-CH$_2$—SiH$_2$(piperidine))$_2$;
the precursor being RN(SiH(pyrimidine)-CH$_2$—SiH$_2$(pyrimidine))$_2$;
R$^3$, R$^4$ and R$^5$=H and R=H, C$_u$H$_{2u+1}$, or Si$_v$H$_{2v-1}$, wherein u=1-6 and v=1-4;
the precursor being RN(SiH$_2$—CH$_2$—SiH(CH$_2$=CH)$_2$)$_2$;
the precursor being RN(SiH$_2$—CH$_2$—SiH(CH$_2$=CH—CH$_2$)$_2$)$_2$;
the precursor being RN(SiH$_2$—CH$_2$—SiH(NH$_2$)$_2$)$_2$;
the precursor being RN(SiH$_2$—CH$_2$—SiH(NMe$_2$)$_2$)$_2$;
the precursor being RN(SiH$_2$—CH$_2$—SiH(NMeEt)$_2$)$_2$;
the precursor being RN(SiH$_2$—CH$_2$—SiH(NEt$_2$)$_2$)$_2$;
the precursor being RN(SiH$_2$—CH$_2$—SiH(NnPr$_2$)$_2$)$_2$;
the precursor being RN(SiH$_2$—CH$_2$—SiH(NiPr$_2$)$_2$)$_2$;
the precursor being RN(SiH$_2$—CH$_2$—SiH(NBu$_2$)$_2$)$_2$;
the precursor being RN(SiH$_2$—CH$_2$—SiH(NiBu$_2$)$_2$)$_2$;
the precursor being RN(SiH$_2$—CH$_2$—SiH(NtBu$_2$)$_2$)$_2$;
the precursor being RN(SiH$_2$—CH$_2$—SiH(NAm$_2$)$_2$)$_2$;
the precursor being RN(SiH$_2$—CH$_2$—SiH(NCypentyl$_2$)$_2$)$_2$;
the precursor being RN(SiH$_2$—CH$_2$—SiH(Nhexyl$_2$)$_2$)$_2$;
the precursor being RN(SiH$_2$—CH$_2$—SiH(NCyHex$_2$)$_2$)$_2$;
the precursor being RN(SiH$_2$—CH$_2$—SiH(NMeH)$_2$)$_2$;
the precursor being RN(SiH$_2$—CH$_2$—SiH(NEtH)$_2$)$_2$;
the precursor being RN(SiH$_2$—CH$_2$—SiH(NnPrH)$_2$)$_2$;
the precursor being RN(SiH$_2$—CH$_2$—SiH(NiPrH)$_2$)$_2$;
the precursor being RN(SiH$_2$—CH$_2$—SiH(NBuH)$_2$)$_2$;
the precursor being RN(SiH$_2$—CH$_2$—SiH(NiBuH)$_2$)$_2$;
the precursor being RN(SiH$_2$—CH$_2$—SiH(NtBuH)$_2$)$_2$;
the precursor being RN(SiH$_2$—CH$_2$—SiH(NAmH)$_2$)$_2$;
the precursor being RN(SiH$_2$—CH$_2$—SiH(pyridine)$_2$)$_2$;
the precursor being RN(SiH$_2$—CH$_2$—SiH(pyrrole)$_2$)$_2$;
the precursor being RN(SiH$_2$—CH$_2$—SiH(pyrrolidine $_2$)$_2$;
the precursor being RN(SiH$_2$—CH$_2$—SiH(imidazole)$_2$)$_2$;
the precursor being RN(SiH$_2$—CH$_2$—SiH(piperidine)$_2$)$_2$;
the precursor being RN(SiH$_2$—CH$_2$—SiH(pyrimidine)$_2$)$_2$;
R$^4$ and R$^5$=H and R=H, C$_u$H$_{2u+1}$, or Si$_v$H$_{2v-1}$, wherein u=1-6 and v=1-4;
the precursor being RN(SiH$_2$—CH$_2$—Si(CH$_2$=CH)$_3$)$_2$;
the precursor being RN(SiH$_2$—CH$_2$—Si(CH$_2$=CH—CH$_2$)$_3$)$_2$;
the precursor being RN(SiH$_2$—CH$_2$—Si(NH$_2$)$_3$)$_2$;
the precursor being RN(SiH$_2$—CH$_2$—Si(NMe$_2$)$_3$)$_2$;
the precursor being RN(SiH$_2$—CH$_2$—Si(NMeEt)$_3$)$_2$;
the precursor being RN(SiH$_2$—CH$_2$—Si(NEt$_2$)$_3$)$_2$;
the precursor being RN(SiH$_2$—CH$_2$—Si(NnPr$_2$)$_3$)$_2$;
the precursor being RN(SiH$_2$—CH$_2$—Si(NiPr$_2$)$_3$)$_2$;
the precursor being RN(SiH$_2$—CH$_2$—Si(NBu$_2$)$_3$)$_2$;
the precursor being RN(SiH$_2$—CH$_2$—Si(NiBu$_2$)$_3$)$_2$;
the precursor being RN(SiH$_2$—CH$_2$—Si(NtBu$_2$)$_3$)$_2$;
the precursor being RN(SiH$_2$—CH$_2$—Si(NAm$_2$)$_3$)$_2$;
the precursor being RN(SiH$_2$—CH$_2$—Si(NCypentyl$_2$)$_3$)$_2$;
the precursor being RN(SiH$_2$—CH$_2$—Si(Nhexyl$_2$)$_3$)$_2$;
the precursor being RN(SiH$_2$—CH$_2$—Si(NCyHex$_2$)$_3$)$_2$;
the precursor being RN(SiH$_2$—CH$_2$—Si(NMeH)$_3$)$_2$;
the precursor being RN(SiH$_2$—CH$_2$—Si(NEtH)$_3$)$_2$;
the precursor being RN(SiH$_2$—CH$_2$—Si(NnPrH)$_3$)$_2$;
the precursor being RN(SiH$_2$—CH$_2$—Si(NiPrH)$_3$)$_2$;
the precursor being RN(SiH$_2$—CH$_2$—Si(NBuH)$_3$)$_2$;
the precursor being RN(SiH$_2$—CH$_2$—Si(NiBuH)$_3$)$_2$;
the precursor being RN(SiH$_2$—CH$_2$—Si(NtBuH)$_3$)$_2$;
the precursor being RN(SiH$_2$—CH$_2$—Si(NAmH)$_3$)$_2$;
the precursor being RN(SiH$_2$—CH$_2$—Si(pyridine)$_3$)$_2$;
the precursor being RN(SiH$_2$—CH$_2$—Si(pyrrole)$_3$)$_2$;
the precursor being RN(SiH$_2$—CH$_2$—Si(pyrrolidine)$_3$)$_2$;
the precursor being RN(SiH$_2$—CH$_2$—Si(imidazole)$_3$)$_2$;
the precursor being RN(SiH$_2$—CH$_2$—Si(piperidine)$_3$)$_2$;
the precursor being RN(SiH$_2$—CH$_2$—Si(pyrimidine)$_3$)$_2$;
a=1 and m=2;
the formula (I) being RN(SiR$^4$R$^5$(CH$_2$)$_2$SiR$^1$R$^2$R$^3$)$_2$;
R, R$^1$, R$^2$, R$^3$, R$^4$ and R$^5$=H;
the precursor being HN(SiH$_2$—CH$_2$—CH$_2$—SiH$_3$)$_2$;
R$^1$, R$^2$, R$^3$,R$^4$ and R$^5$=H and R=Si$_x$H$_{2x+1}$ (x=1 to 4);
the precursor being SiH$_3$N(SiH$_2$—CH$_2$—CH$_2$—SiH$_3$)$_2$;
the precursor being Si$_2$H$_5$N(SiH$_2$—CH$_2$—CH$_2$—SiH$_3$)$_2$;
the precursor being Si$_3$H$_7$N(SiH$_2$—CH$_2$—CH$_2$—SiH$_3$)$_2$;
the precursor being Si$_4$H$_9$N(SiH$_2$—CH$_2$—CH$_2$—SiH$_3$)$_2$;
R$^1$, R$^2$, R$^3$,R$^4$ and R$^5$=H and R=C$_y$H$_{2y+1}$ (y=1 to 6);
the precursor being (Me)N(SiH$_2$—CH$_2$—CH$_2$—SiH$_3$)$_2$;
the precursor being (Et)N(SiH$_2$—CH$_2$—CH$_2$—SiH$_3$)$_2$;
the precursor being (nPR)N(SiH$_2$—CH$_2$—CH$_2$—SiH$_3$)$_2$;
the precursor being (iPr)N(SiH$_2$—CH$_2$—CH$_2$—SiH$_3$)$_2$;
the precursor being (Bu)N(SiH$_2$—CH$_2$—CH$_2$—SiH$_3$)$_2$;
the precursor being (iBu)N(SiH$_2$—CH$_2$—CH$_2$—SiH$_3$)$_2$;
the precursor being (tBu)N(SiH$_2$—CH$_2$—CH$_2$—SiH$_3$)$_2$;
the precursor being (amyl)N(SiH$_2$—CH$_2$—CH$_2$—SiH$_3$)$_2$;
the precursor being (hexyl)N(SiH$_2$—CH$_2$—CH$_2$—SiH$_3$)$_2$;
the precursor being (SiMe$_3$)N(SiH$_2$—CH$_2$—CH$_2$—SiH$_3$)$_2$;
the precursor being (SiEt$_3$)N(SiH$_2$—CH$_2$—CH$_2$—SiH$_3$)$_2$;
the precursor being Si(iPr)$_3$N(SiH$_2$—CH$_2$—CH$_2$—SiH$_3$)$_2$;
the precursor being Si(nPr)$_3$N(SiH$_2$—CH$_2$—CH$_2$—SiH$_3$)$_2$;
the precursor being Si(Bu)$_3$N(SiH$_2$—CH$_2$—CH$_2$—SiH$_3$)$_2$;
the precursor being Si(iBu)$_3$N(SiH$_2$—CH$_2$—CH$_2$—SiH$_3$)$_2$;
the precursor being Si(tBu)$_3$N(SiH$_2$—CH$_2$—CH$_2$—SiH$_3$)$_2$;
the precursor being Si(amyl)$_3$N(SiH$_2$—CH$_2$—CH$_2$—SiH$_3$)$_2$;
the precursor being Si(hexyl)$_3$N(SiH$_2$—CH$_2$—CH$_2$—SiH$_3$)$_2$;
the precursor being (SiHMe$_2$)N(SiH$_2$—CH$_2$—CH$_2$—SiH$_3$)$_2$;
the precursor being (SiHEt$_2$)N(SiH$_2$—CH$_2$—CH$_2$—SiH$_3$)$_2$;
the precursor being SiH(iPr)$_2$N(SiH$_2$—CH$_2$—CH$_2$—SiH$_3$)$_2$;
the precursor being SiH(nPr)$_2$N(SiH$_2$—CH$_2$—CH$_2$—SiH$_3$)$_2$;
the precursor being SiH(Bu)$_2$N(SiH$_2$—CH$_2$—CH$_2$—SiH$_3$)$_2$;
the precursor being SiH(iBu)$_2$N(SiH$_2$—CH$_2$—CH$_2$—SiH$_3$)$_2$;
the precursor being SiH(tBu)$_2$N(SiH$_2$—CH$_2$—CH$_2$—SiH$_3$)$_2$;
the precursor being SiH(amyl)$_2$N(SiH$_2$—CH$_2$—CH$_2$—SiH$_3$)$_2$;
the precursor being SiH(hexyl)$_2$N(SiH$_2$—CH$_2$—CH$_2$—SiH$_3$)$_2$;
the precursor being (SiH$_2$Me$_2$)N(SiH$_2$—CH$_2$—CH$_2$—SiH$_3$)$_2$;

the precursor being (SiH$_2$Et$_2$)N(SiH$_2$—CH$_2$—CH$_2$—SiH$_3$)$_2$;
the precursor being SiH$_2$(iPR)N(SiH$_2$—CH$_2$—CH$_2$—SiH$_3$)$_2$;
the precursor being SiH$_2$(nPR)N(SiH$_2$—CH$_2$—CH$_2$—SiH$_3$)$_2$;
the precursor being SiH$_2$(Bu)N(SiH$_2$—CH$_2$—CH$_2$—SiH$_3$)$_2$;
the precursor being SiH$_2$(iBu)N(SiH$_2$—CH$_2$—CH$_2$—SiH$_3$)$_2$;
the precursor being SiH$_2$(tBu)N(SiH$_2$—CH$_2$—CH$_2$—SiH$_3$)$_2$;
the precursor being SiH$_2$(amyl)N(SiH$_2$—CH$_2$—CH$_2$—SiH$_3$)$_2$;
the precursor being SiH$_2$(hexyl)N(SiH$_2$—CH$_2$—CH$_2$—SiH$_3$)$_2$;
the precursor being (SiH$_3$—CH$_2$—SiH$_2$)N(SiH$_2$—CH$_2$—CH$_2$—SiH$_3$)$_2$;
the precursor being (SiMe$_3$-CH$_2$—SiMe$_2$)N(SiH$_2$—CH$_2$—CH$_2$—SiH$_3$)$_2$;
the precursor being (SiMe$_3$-CH$_2$—CH$_2$—SiMe$_2$)N(SiH$_2$—CH$_2$—CH$_2$—SiH$_3$)$_2$;
the precursor being (SiEt$_3$-CH$_2$—SiEt$_2$)N(SiH$_2$—CH$_2$—CH$_2$—SiH$_3$)$_2$;
the precursor being (SiEt$_3$-CH$_2$—CH$_2$—SiEt$_2$)N(SiH$_2$—CH$_2$—CH$_2$—SiH$_3$)$_2$;
the precursor being (SiH$_2$NMe$_2$)N(SiH$_2$—CH$_2$—CH$_2$—SiH$_3$)$_2$;
the precursor being (SiH$_2$NEt$_2$)N(SiH$_2$—CH$_2$—CH$_2$—SiH$_3$)$_2$;
the precursor being (SiH$_2$NiPr$_2$)N(SiH$_2$—CH$_2$—CH$_2$—SiH$_3$)$_2$;
the precursor being (SiH$_2$NnPr$_2$))N(SiH$_2$—CH$_2$—CH$_2$—SiH$_3$)$_2$;
the precursor being (SiH$_2$NMeEt)N(SiH$_2$—CH$_2$—CH$_2$—SiH$_3$)$_2$;
the precursor being (SiH$_2$Piperidine)N(SiH$_2$—CH$_2$—CH$_2$—SiH$_3$)$_2$;
the precursor being (SiH$_2$Pyrolidine)N(SiH$_2$—CH$_2$—CH$_2$—SiH$_3$)$_2$;
the precursor being (SiH$_2$Pyrolle)N(SiH$_2$—CH$_2$—CH$_2$—SiH$_3$)$_2$;
the precursor being (SiH$_2$Imidazole)N(SiH$_2$—CH$_2$—CH$_2$—SiH$_3$)$_2$;
the precursor being (SiH$_2$Pyrimidine)N(SiH$_2$—CH$_2$—CH$_2$—SiH$_3$)$_2$;
the precursor being (SiH(NMe$_2$)$_2$)N(SiH$_2$—CH$_2$—CH$_2$—SiH$_3$)$_2$;
the precursor being SiH(NEt$_2$)$_2$)N(SiH$_2$—CH$_2$—CH$_2$—SiH$_3$)$_2$;
$R^1$, $R^2$, $R^3$ and $R^4$=H and R=H, $C_uH_{2u+1}$, or $SivH_{2v-1}$, wherein u=1-6 and v=1-4;
$R^2$, $R^3$, $R^4$ and $R^5$=H and R=H, $C_uH_{2u+1}$, or $SivH_{2v-1}$, wherein u=1-6 and v=1-4;
the precursor being RN(SiH$_2$—CH$_2$—CH$_2$—SiH$_2$(CH$_2$=CH))$_2$;
the precursor being RN(SiH$_2$—CH$_2$—CH$_2$—SiH$_2$(CH$_2$=CH—CH$_2$))$_2$;
the precursor being RN(SiH$_2$—CH$_2$—CH$_2$—SiH$_2$(NH$_2$))$_2$;
the precursor being RN(SiH$_2$—CH$_2$—CH$_2$—SiH$_2$(NMe$_2$))$_2$;
the precursor being RN(SiH$_2$—CH$_2$—CH$_2$—SiH$_2$(NMeEt))$_2$;
the precursor being RN(SiH$_2$—CH$_2$—CH$_2$—SiH$_2$(NEt$_2$))$_2$;
the precursor being RN(SiH$_2$—CH$_2$—CH$_2$—SiH$_2$(NnPr$_2$))$_2$;
the precursor being RN(SiH$_2$—CH$_2$—CH$_2$—SiH$_2$(NiPr$_2$))$_2$;
the precursor being RN(SiH$_2$—CH$_2$—CH$_2$—SiH$_2$(NBu$_2$))$_2$;
the precursor being RN(SiH$_2$—CH$_2$—CH$_2$—SiH$_2$(NiBu$_2$))$_2$;
the precursor being RN(SiH$_2$—CH$_2$—CH$_2$—SiH$_2$(NtBu$_2$))$_2$;
the precursor being RN(SiH$_2$—CH$_2$—CH$_2$—SiH$_2$(NAm$_2$))$_2$;
the precursor being RN(SiH$_2$—CH$_2$—CH$_2$—SiH$_2$(NCy-Pentyl$_2$))$_2$;
the precursor being RN(SiH$_2$—CH$_2$—CH$_2$—SiH$_2$(Nhexyl$_2$))$_2$;
the precursor being RN(SiH$_2$—CH$_2$—CH$_2$—SiH$_2$(NCy-Hex$_2$))$_2$;
the precursor being RN(SiH$_2$—CH$_2$—CH$_2$—SiH$_2$(NMeH))$_2$;
the precursor being RN(SiH$_2$—CH$_2$—CH$_2$—SiH$_2$(NEtH))$_2$;
the precursor being RN(SiH$_2$—CH$_2$—CH$_2$—SiH$_2$(Nn-PrH))$_2$;
the precursor being RN(SiH$_2$—CH$_2$—CH$_2$—SiH$_2$(Ni-PrH))$_2$;
the precursor being RN(SiH$_2$—CH$_2$—CH$_2$—SiH$_2$(NBuH))$_2$;
the precursor being RN(SiH$_2$—CH$_2$—CH$_2$—SiH$_2$(NiBuH))$_2$;
the precursor being RN(SiH$_2$—CH$_2$—CH$_2$—SiH$_2$(Nt-BuH))$_2$;
the precursor being RN(SiH$_2$—CH$_2$—CH$_2$—SiH$_2$(NAmH))$_2$;
the precursor being RN(SiH$_2$—CH$_2$—CH$_2$—SiH$_2$(pyridine))$_2$;
the precursor being RN(SiH$_2$—CH$_2$—CH$_2$—SiH$_2$(pyrrole))$_2$;
the precursor being RN(SiH$_2$—CH$_2$—CH$_2$—SiH$_2$(pyrrolidine))$_2$;
the precursor being RN(SiH$_2$—CH$_2$—CH$_2$—SiH$_2$(imidazole))$_2$;
the precursor being RN(SiH$_2$—CH$_2$—CH$_2$—SiH$_2$(piperidine))$_2$;
the precursor being RN(SiH$_2$—CH$_2$—CH$_2$—SiH$_2$(pyrimidine))$_2$;
$R^1$, $R^2$ and $R^3$=H and R=H, $C_uH_{2u+1}$, or $SivH_{2v-1}$, wherein u=1-6 and v=1-4;
$R^2$, $R^3$ and $R^4$=H and R=H, $C_uH_{2u+1}$, or $SivH_{2v-1}$, wherein u=1-6 and v=1-4;
the precursor being RN(SiH(CH$_2$=CH)—CH$_2$—CH$_2$—SiH$_2$(CH$_2$=CH))$_2$;
the precursor being RN(SiH(CH$_2$=CH—CH$_2$)—CH$_2$—CH$_2$—SiH$_2$(CH$_2$=CH—CH$_2$))$_2$;
the precursor being RN(SiH(NH$_2$)—CH$_2$—CH$_2$—SiH$_2$(NH$_2$))$_2$;
the precursor being RN(SiH(NMe$_2$)-CH$_2$—CH$_2$—SiH$_2$(NMe$_2$))$_2$;
the precursor being RN(SiH(NMeEt)-CH$_2$—CH$_2$—SiH$_2$(NMeEt))$_2$;
the precursor being RN(SiH(NEt$_2$)-CH$_2$—CH$_2$—SiH$_2$(NEt$_2$))$_2$;
the precursor being RN(SiH(NnPr$_2$)-CH$_2$—CH$_2$—SiH$_2$(NnPr$_2$))$_2$;
the precursor being RN(SiH(NiPr$_2$)-CH$_2$—CH$_2$—SiH$_2$(NiPr$_2$))$_2$;

the precursor being RN(SiH(NBu$_2$)-CH$_2$—CH$_2$—SiH$_2$(NBu$_2$))$_2$;
the precursor being RN(SiH(NiBu$_2$)-CH$_2$—CH$_2$—SiH$_2$(NiBu$_2$))$_2$;
the precursor being RN(SiH(NtBu$_2$)-CH$_2$—CH$_2$—SiH$_2$(NtBu$_2$))$_2$;
the precursor being RN(SiH(NAm$_2$)-CH$_2$—CH$_2$—SiH$_2$(NAm$_2$))$_2$;
the precursor being RN(SiH(NCyPentyl$_2$)-CH$_2$—CH$_2$—SiH$_2$(NCyPentyl$_2$))$_2$;
the precursor being RN(SiH(Nhexyl$_2$)-CH$_2$—CH$_2$—SiH$_2$(Nhexyl$_2$))$_2$;
the precursor being RN(SiH(NCyHex$_2$)-CH$_2$—CH$_2$—SiH$_2$(NCyHex$_2$))$_2$;
the precursor being RN(SiH(NMeH)—CH$_2$—CH$_2$—SiH$_2$(NMeH))$_2$;
the precursor being RN(SiH(NEtH)—CH$_2$—CH$_2$—SiH$_2$(NEtH))$_2$;
the precursor being RN(SiH(NnPrH)—CH$_2$—CH$_2$—SiH$_2$(NnPrH))$_2$;
the precursor being RN(SiH(NiPrH)—CH$_2$—CH$_2$—SiH$_2$(NiPrH))$_2$;
the precursor being RN(SiH(NBuH)—CH$_2$—CH$_2$—SiH$_2$(NBuH))$_2$;
the precursor being RN(SiH(NiBuH)—CH$_2$—CH$_2$—SiH$_2$(NiBuH))$_2$;
the precursor being RN(SiH(NtBuH)—CH$_2$—CH$_2$—SiH$_2$(NtBuH))$_2$;
the precursor being RN(SiH(NAmH)—CH$_2$—CH$_2$—SiH$_2$(NAmH))$_2$;
the precursor being RN(SiH(pyridine)-CH$_2$—CH$_2$—SiH$_2$(pyridine))$_2$;
the precursor being RN(SiH(pyrrole)-CH$_2$—CH$_2$—SiH$_2$(pyrrole))$_2$;
the precursor being RN(SiH(pyrrolidine)-CH$_2$—CH$_2$—SiH$_2$(pyrrolidine))$_2$;
the precursor being RN(SiH(imidazole)-CH$_2$—CH$_2$—SiH$_2$(imidazole))$_2$;
the precursor being RN(SiH(piperidine)-CH$_2$—CH$_2$—SiH$_2$(piperidine))$_2$;
the precursor being RN(SiH(pyrimidine)-CH$_2$—CH$_2$—SiH$_2$(pyrimidine))$_2$;
R$^3$, R$^4$ and R$^5$=H and R=H, C$_u$H$_{2u+1}$, or SivH$_{2v-1}$, wherein u=1-6 and v=1-4;
the precursor being RN(SiH$_2$—CH$_2$—CH$_2$—SiH(CH$_2$=CH)$_2$)$_2$;
the precursor being RN(SiH$_2$—CH$_2$—CH$_2$—SiH(CH$_2$=CH—CH$_2$)$_2$)$_2$;
the precursor being RN(SiH$_2$—CH$_2$—CH$_2$—SiH(NH$_2$)$_2$)$_2$;
the precursor being RN(SiH$_2$—CH$_2$—CH$_2$—SiH(NMe$_2$)$_2$)$_2$;
the precursor being RN(SiH$_2$—CH$_2$—CH$_2$—SiH(NMeEt)$_2$)$_2$;
the precursor being RN(SiH$_2$—CH$_2$—CH$_2$—SiH(NEt$_2$)$_2$)$_2$;
the precursor being RN(SiH$_2$—CH$_2$—CH$_2$—SiH(NnPr$_2$)$_2$)$_2$;
the precursor being RN(SiH$_2$—CH$_2$—CH$_2$—SiH(NiPr$_2$)$_2$)$_2$;
the precursor being RN(SiH$_2$—CH$_2$—CH$_2$—SiH(NBu$_2$)$_2$)$_2$;
the precursor being RN(SiH$_2$—CH$_2$—CH$_2$—SiH(NiBu$_2$)$_2$)$_2$;
the precursor being RN(SiH$_2$—CH$_2$—CH$_2$—SiH(NtBu$_2$)$_2$)$_2$;
the precursor being RN(SiH$_2$—CH$_2$—CH$_2$—SiH(NAm$_2$)$_2$)$_2$;
the precursor being RN(SiH$_2$—CH$_2$—CH$_2$—SiH(NCyPentyl$_2$)$_2$)$_2$;
the precursor being RN(SiH$_2$—CH$_2$—CH$_2$—SiH(Nhexyl$_2$)$_2$)$_2$;
the precursor being RN(SiH$_2$—CH$_2$—CH$_2$—SiH(NCyHex$_2$)$_2$)$_2$;
the precursor being RN(SiH$_2$—CH$_2$—CH$_2$—SiH(NMeH)$_2$)$_2$;
the precursor being RN(SiH$_2$—CH$_2$—CH$_2$—SiH(NEtH)$_2$)$_2$;
the precursor being RN(SiH$_2$—CH$_2$—CH$_2$—SiH(NnPrH)$_2$)$_2$;
the precursor being RN(SiH$_2$—CH$_2$—CH$_2$—SiH(NiPrH)$_2$)$_2$;
the precursor being RN(SiH$_2$—CH$_2$—CH$_2$—SiH(NBuH)$_2$)$_2$;
the precursor being RN(SiH$_2$—CH$_2$—CH$_2$—SiH(NiBuH)$_2$)$_2$;
the precursor being RN(SiH$_2$—CH$_2$—CH$_2$—SiH(NtBuH)$_2$)$_2$;
the precursor being RN(SiH$_2$—CH$_2$—CH$_2$—SiH(NAmH)$_2$)$_2$;
the precursor being RN(SiH$_2$—CH$_2$—CH$_2$—SiH(pyridine)$_2$)$_2$;
the precursor being RN(SiH$_2$—CH$_2$—CH$_2$—SiH(pyrrole)$_2$)$_2$;
the precursor being RN(SiH$_2$—CH$_2$—CH$_2$—SiH(pyrrolidine)$_2$)$_2$;
the precursor being RN(SiH$_2$—CH$_2$—CH$_2$—SiH(imidazole)$_2$)$_2$;
the precursor being RN(SiH$_2$—CH$_2$—CH$_2$—SiH(piperidine)$_2$)$_2$;
the precursor being RN(SiH$_2$—CH$_2$—CH$_2$—SiH(pyrimidine)$_2$)$_2$;
R$^4$ and R$^5$=H and R=H, C$_u$H$_{2u+1}$, or SivH$_{2v-1}$, wherein u=1-6 and v=1-4;
the precursor being RN(SiH$_2$—CH$_2$—CH$_2$—Si(CH$_2$=CH)$_3$)$_2$;
the precursor being RN(SiH$_2$—CH$_2$—CH$_2$—Si(CH$_2$=CH—CH$_2$)$_3$)$_2$;
the precursor being RN(SiH$_2$—CH$_2$—CH$_2$—Si(NH$_2$)$_3$)$_2$;
the precursor being RN(SiH$_2$—CH$_2$—CH$_2$—Si(NMe$_2$)$_3$)$_2$;
the precursor being RN(SiH$_2$—CH$_2$—CH$_2$—Si(NMeEt)$_3$)$_2$;
the precursor being RN(SiH$_2$—CH$_2$—CH$_2$—Si(NEt$_2$)$_3$)$_2$;
the precursor being RN(SiH$_2$—CH$_2$—CH$_2$—Si(NnPr$_2$)$_3$)$_2$;
the precursor being RN(SiH$_2$—CH$_2$—CH$_2$—Si(NiPr$_2$)$_3$)$_2$;
the precursor being RN(SiH$_2$—CH$_2$—CH$_2$—Si(NBu$_2$)$_3$)$_2$;
the precursor being RN(SiH$_2$—CH$_2$—CH$_2$—Si(NiBu$_2$)$_3$)$_2$;
the precursor being RN(SiH$_2$—CH$_2$—CH$_2$—Si(NtBu$_2$)$_3$)$_2$;
the precursor being RN(SiH$_2$—CH$_2$—CH$_2$—Si(NAm$_2$)$_3$)$_2$;
the precursor being RN(SiH$_2$—CH$_2$—CH$_2$—Si(NCyPentyl$_2$)$_3$)$_2$;
the precursor being RN(SiH$_2$—CH$_2$—CH$_2$—Si(Nhexyl$_2$)$_3$)$_2$;
the precursor being RN(SiH$_2$—CH$_2$—CH$_2$—Si(NCyHex$_2$)$_3$)$_2$;

the precursor being RN(SiH₂—CH₂—CH₂—Si(NMeH)₃)₂;
the precursor being RN(SiH₂—CH₂—CH₂—Si(NEtH)₃)₂;
the precursor being RN(SiH₂—CH₂—CH₂—Si(NnPrH)₃)₂;
the precursor being RN(SiH₂—CH₂—CH₂—Si(NiPrH)₃)₂;
the precursor being RN(SiH₂—CH₂—CH₂—Si(NBuH)₃)₂;
the precursor being RN(SiH₂—CH₂—CH₂—Si(NiBuH)₃)₂;
the precursor being RN(SiH₂—CH₂—CH₂—Si(NtBuH)₃)₂;
the precursor being RN(SiH₂—CH₂—CH₂—Si(NAmH)₃)₂;
the precursor being RN(SiH₂—CH₂—CH₂—Si(pyridine)₃)₂;
the precursor being RN(SiH₂—CH₂—CH₂—Si(pyrrole)₃)₂;
the precursor being RN(SiH₂—CH₂—CH₂—Si(pyrrolidine)₃)₂;
the precursor being RN(SiH₂—CH₂—CH₂—Si(imidazole)₃)₂;
the precursor being RN(SiH₂—CH₂—CH₂—Si(piperidine)₃)₂;
the precursor being RN(SiH₂—CH₂—CH₂—Si(pyrimidine)₃)₂;
at least one of $R^2$, $R^3$, $R^4$, and $R^5$ being H;
$R^2$, $R^3$, $R^4$, and $R^5$ all being H;
at least one of $R^2$, $R^3$, $R^4$, and $R^5$ being a vinyl group;
R being H;
t=1;
the precursor being [—NR—$R^4R^5$Si—CH₂—Si$R^2R^3$—]$_n$;
at least one of R, $R^2$, $R^3$, $R^4$, or $R^5$ being vinyl;
at least one of R, $R^2$, $R^3$, $R^4$, or $R^5$ being allyl;
at least one of R, $R^2$, $R^3$, $R^4$, or $R^5$ being phenyl;
the precursor comprising [—NR—$R^4R^5$Si—(CH₂)—Si$R^2R^3$—]$_n$ units and a [—NR—$R^4R^5$Si—(CH₂)—Si$R^1R^2R^3$] end-cap;
the precursor comprising [—NR—$R^4R^5$Si—(CH₂)—Si$R^2R^3$—]$_n$ units and a [—NR—$R^4R^5$Si—(CH₂)—Si$R^2R^3$—N$R^1R^2$] end-cap;
R, $R^2$, $R^3$, $R^4$ and $R^5$=H;
the precursor being [—NH—SiH₂—CH₂—SiH₂—]$_n$;
R=Si$_x$H$_{2x+1}$ (x=1 to 4) and $R^2$, $R^3$, $R^4$ and $R^5$=H;
the precursor being [—N(SiH₃)—SiH₂—CH₂—SiH₂—]$_n$;
the precursor being [—N(Si₂H₅)—SiH₂—CH₂—SiH₂—]$_n$;
the precursor being [—N(Si₃H₇)—SiH₂—CH₂—SiH₂—]$_n$;
the precursor being [—N(Si₄H₉)—SiH₂—CH₂—SiH₂—]$_n$;
R=C$_y$H$_{2y+1}$ (y=1 to 6) and $R^2$, $R^3$, $R^4$ and $R^5$=H;
the precursor being [—N(CH₃)—SiH₂—CH₂—SiH₂—]$_n$;
the precursor being [—N(C₂H₅)—SiH₂—CH₂—SiH₂—]$_n$;
the precursor being [—N(C₃H₇)—SiH₂—CH₂—SiH₂—]$_n$;
the precursor being [—N(C₄H₉)—SiH₂—CH₂—SiH₂—]$_n$;
the precursor being [—N(C₅H₁₁)—SiH₂—CH₂—SiH₂—]$_n$;
the precursor being [—N(C₆H₁₃)—SiH₂—CH₂—SiH₂—]$_n$;

$R^2$, $R^3$, $R^4$ and $R^5$=H and R=$R^{1'}R^{2'}R^{3'}$Si(CH₂)$_b$Si$R^{4'}R^{5'}$ wherein b=to 2 and $R^{1'}$, $R^{2'}$, $R^{3'}$, $R^{4'}$ and $R^{5'}$=H or a $C_1$-$C_6$ hydrocarbon;
the precursor being [—N(SiH₃—CH₂—SiH₂)—SiH₂—CH₂—SiH₂—]$_n$;
the precursor being [—N(SiH₃—CH₂—CH₂—SiH₂)—SiH₂—CH₂—SiH₂—]$_n$;
the precursor being [—N(SiMe₃-CH₂—SiMe₂)-SiH₂—CH₂—SiH₂—]$_n$;
the precursor being [—N(SiMe₃-CH₂—CH₂—SiMe₂)-SiH₂—CH₂—SiH₂—]$_n$;
the precursor being [—N(SiEt₃-CH₂—SiEt₂)-SiH₂—CH₂—SiH₂—]$_n$;
the precursor being [—N(SiEt₃-CH₂—CH₂—SiEt₂)-SiH₂—CH₂—SiH₂—]$_n$;
$R^2$, $R^3$, $R^4$ and $R^5$=H;
the precursor being [—N(SiMe₃)-H₂Si—CH₂—SiH₂—]$_n$;
the precursor being [—N(SiEt₃)-H₂Si—CH₂—SiH₂—]$_n$;
the precursor being [—N(Si(iPr)₃-SiH₂—CH₂—SiH₂—]$_n$;
the precursor being [—N(Si(nPr)₃-SiH₂—CH₂—SiH₂—]$_n$;
the precursor being [—N(Si(Bu)₃-SiH₂—CH₂—SiH₂—]$_n$;
the precursor being [—N(Si(iBu)₃-SiH₂—CH₂—SiH₂—]$_n$;
the precursor being [—N(Si(tBu)₃-SiH₂—CH₂—SiH₂—]$_n$;
the precursor being [—N(Si(amyl)₃-SiH₂—CH₂—SiH₂—]$_n$;
the precursor being [—N(Si(hexyl)₃-SiH₂—CH₂—SiH₂—]$_n$;
the precursor being [—Nx(SiH(Me)-SiH₂—CH₂—SiH₂—]$_n$;
the precursor being [—N(SiH(Et)₂-SiH₂—CH₂—SiH₂—]$_n$;
the precursor being [—N(SiH(iPr)₂-SiH₂—CH₂—SiH₂—]$_n$;
the precursor being [—N(SiH(nPr)₂-SiH₂—CH₂—SiH₂—]$_n$;
the precursor being [—N(SiH(Bu)₂-SiH₂—CH₂—SiH₂—]$_n$;
the precursor being [—N(SiH(iBu)₂-SiH₂—CH₂—SiH₂—]$_n$;
the precursor being [—N(SiH(tBu)₂-SiH₂—CH₂—SiH₂—]$_n$;
the precursor being [—N(SiH(amyl)₂-SiH₂—CH₂—SiH₂—]$_n$;
the precursor being [—N(SiH(hexyl)₂-SiH₂—CH₂—SiH₂—]$_n$;
the precursor being [—N(SiH₂(Me)-SiH₂—CH₂—SiH₂—]$_n$;
the precursor being [—N(SiH₂(Et)-SiH₂—CH₂—SiH₂—]$_n$;
the precursor being [—N(SiH₂(iPr)-SiH₂—CH₂—SiH₂—]$_n$;
the precursor being [—N(SiH₂(nPr)-SiH₂—CH₂—SiH₂—]$_n$;
the precursor being [—N(SiH₂(Bu)-SiH₂—CH₂—SiH₂—]$_n$;
the precursor being [—N(SiH₂(iBu)-SiH₂—CH₂—SiH₂—]$_n$;
the precursor being [—N(SiH₂(tBu)-SiH₂—CH₂—SiH₂—]$_n$;
the precursor being [—N(SiH₂(amyl)-SiH₂—CH₂—SiH₂—]$_n$;

the precursor being [—N(SiH₂(hexyl)-SiH₂—CH₂—SiH₂—]ₙ;
the precursor being [—N(SiH₂NMe₂)-H₂Si—CH₂—SiH₂—]ₙ;
the precursor being [—N(SiH₂NEt₂)-H₂Si—CH₂—SiH₂—]ₙ;
the precursor being [—N(SiH₂NiPr₂)-SiH₂—CH₂—SiH₂—]ₙ;
the precursor being [—N(SiH₂NnPr₂)-SiH₂—CH₂—SiH₂—]ₙ;
the precursor being [—N(SiH₂NMeEt)-H₂Si—CH₂—SiH₂—]ₙ;
the precursor being [—N(SiH(NMe₂)₂)-H₂Si—CH₂—SiH₂—]ₙ;
the precursor being [—N(SiH(NEt₂)₂)-H₂Si—CH₂—SiH₂—]ₙ;
R, R³, R⁴ and R⁵=H;
the precursor being [—NH—H₂Si—CH₂—SiH(CH₂=CH₂)—]ₙ;
the precursor being [—NH—H₂Si—CH₂—SiH(CH₂—CH₂=CH₂)—]ₙ;
the precursor being [—NH—H₂Si—CH₂—SiH(NH₂)—]ₙ;
the precursor being [—NH—H₂Si—CH₂—SiH(NMe₂)-]ₙ;
the precursor being [—NH—H₂Si—CH₂—SiH(NMeEt)-]ₙ;
the precursor being [—NH—H₂Si—CH₂—SiH(NEt₂)-]ₙ;
the precursor being [—NH—H₂Si—CH₂—SiH(NnPr₂)-]ₙ;
the precursor being [—NH—H₂Si—CH₂—SiH(NiPr₂)-]ₙ;
the precursor being [—NH—H₂Si—CH₂—SiH(NBu₂)-]ₙ;
the precursor being [—NH—H₂Si—CH₂—SiH(NiBu₂)-]ₙ;
the precursor being [—NH—H₂Si—CH₂—SiH(NtBu₂)-]ₙ;
the precursor being [—NH—H₂Si—CH₂—SiH(NAm₂)-]ₙ;
the precursor being [—NH—H₂Si—CH₂—SiH(NCyPentyl₂)-]ₙ;
the precursor being [—NH—H₂Si—CH₂—SiH(Nhexyl₂)-]ₙ;
the precursor being [—NH—H₂Si—CH₂—SiH(NCyHex₂)-]ₙ;
the precursor being [—NH—H₂Si—CH₂—SiH(NMeH)—]ₙ;
the precursor being [—NH—H₂Si—CH₂—SiH(NEtH)—]ₙ;
the precursor being [—NH—H₂Si—CH₂—SiH(NnPrH)—]ₙ;
the precursor being [—NH—H₂Si—CH₂—SiH(NiPrH)—]ₙ;
the precursor being [—NH—H₂Si—CH₂—SiH(NBuH)—]ₙ;
the precursor being [—NH—H₂Si—CH₂—SiH(NiBuH)—]ₙ;
the precursor being [—NH—H₂Si—CH₂—SiH(NtBuH)—]ₙ;
the precursor being [—NH—H₂Si—CH₂—SiH(NAmH)—]ₙ;
the precursor being [—NH—H₂Si—CH₂—SiH(pyridine)-]ₙ;
the precursor being [—NH—H₂Si—CH₂—SiH(pyrrole)-]ₙ;
the precursor being [—NH—H₂Si—CH₂—SiH(pyrrolidine)-]ₙ;
the precursor being [—NH—H₂Si—CH₂—SiH(imidazole)-]ₙ;
the precursor being [—NH—H₂Si—CH₂—SiH(piperidine)-]ₙ;
the precursor being [—NH—H₂Si—CH₂—SiH(pyrimidine)-]ₙ;
R, R⁴ and R⁵=H;
the precursor being [—NH—H₂Si—CH₂—Si(CH₂=CH₂)₂—]ₙ;
the precursor being [—NH—H₂Si—CH₂—Si(CH₂—CH₂=CH₂)₂—]ₙ;
the precursor being [—NH—H₂Si—CH₂—Si(NH₂)₂—]ₙ;
the precursor being [—NH—H₂Si—CH₂—Si(NMe₂)₂-]ₙ;
the precursor being [—NH—H₂Si—CH₂—Si(NMeEt)₂—]ₙ;
the precursor being [—NH—H₂Si—CH₂—Si(NEt₂)₂-]ₙ;
the precursor being [—NH—H₂Si—CH₂—Si(NnPr₂)₂-]ₙ;
the precursor being [—NH—H₂Si—CH₂—Si(NiPr₂)₂-]ₙ;
the precursor being [—NH—H₂Si—CH₂—Si(NBu₂)₂-]ₙ;
the precursor being [—NH—H₂Si—CH₂—Si(NiBu₂)₂-]ₙ;
the precursor being [—NH—H₂Si—CH₂—Si(NtBu₂)₂-]ₙ;
the precursor being [—NH—H₂Si—CH₂—Si(NAm₂)₂-]ₙ;
the precursor being [—NH—H₂Si—CH₂—Si(NCyPentyl₂)₂-]ₙ;
the precursor being [—NH—H₂Si—CH₂—Si(Si(Nhexyl₂)₂-]ₙ;
the precursor being [—NH—H₂Si—CH₂—Si(NCyHex₂)₂-]ₙ;
the precursor being [—NH—H₂Si—CH₂—Si(NMeH)₂—]ₙ;
the precursor being [—NH—H₂Si—CH₂—Si(NEtH)₂—]ₙ;
the precursor being [—NH—H₂Si—CH₂—Si(NnPrH)₂—]ₙ;
the precursor being [—NH—H₂Si—CH₂—Si(NiPrH)₂—]ₙ;
the precursor being [—NH—H₂Si—CH₂—Si(NBuH)₂—]ₙ;
the precursor being [—NH—H₂Si—CH₂—Si(NiBuH)₂—]ₙ;
the precursor being [—NH—H₂Si—CH₂—Si(NtBuH)₂—]ₙ;
the precursor being [—NH—H₂Si—CH₂—Si(NAmH)₂—]ₙ;
the precursor being [—NH—H₂Si—CH₂—Si(pyridine)₂-]ₙ;
the precursor being [—NH—H₂Si—CH₂—Si(pyrrole)₂-]ₙ;
the precursor being [—NH—H₂Si—CH₂—Si(pyrrolidine)₂-]ₙ;
the precursor being [—NH—H₂Si—CH₂—Si(imidazole)₂-]ₙ;
the precursor being [—NH—H₂Si—CH₂—Si(piperidine)₂-]ₙ;
the precursor being [—NH—H₂Si—CH₂—Si(pyrimidine)₂-]ₙ;
R, R³ and R⁵=H;
the precursor being [—NH—SiH(CH₂=CH₂)—CH₂—SiH(CH₂=CH₂)—]ₙ;

the precursor being [—NH—SiH(CH$_2$—CH$_2$=CH$_2$)—CH$_2$—SiH(CH$_2$—CH$_2$=CH$_2$)—]$_n$;
the precursor being [—NH—SiH(NH$_2$)—CH$_2$—SiH(NH$_2$)—]$_n$;
the precursor being [—NH—SiH(NMe$_2$)-CH$_2$—SiH(NMe$_2$)$_2$-]$_n$;
the precursor being [—NH—SiH(NMeEt)-CH$_2$—SiH(NMeEt)-]$_n$;
the precursor being [—NH—SiH(NEt$_2$)-CH$_2$—SiH(NEt$_2$)-]$_n$;
the precursor being [—NH—SiH(NnPr$_2$)-CH$_2$—SiH(NnPr$_2$)-]$_n$;
the precursor being [—NH—SiH(NiPr$_2$)-CH$_2$—SiH(NiPr$_2$)-]$_n$;
the precursor being [—NH—SiH(NBu$_2$)-CH$_2$—SiH(NBu$_2$)-]$_n$;
the precursor being [—NH—SiH(NiBu$_2$)-CH$_2$—SiH(NiBu$_2$)-]$_n$;
the precursor being [—NH—SiH(NtBu$_2$)-CH$_2$—SiH(NtBu$_2$)-]$_n$;
the precursor being [—NH—SiH(NAm$_2$)-CH$_2$—SiH(NAm$_2$)-]$_n$;
the precursor being [—NH—SiH(NCyPentyl$_2$)-CH$_2$—SiH(NCyPentyl$_2$)-]$_n$;
the precursor being [—NH—SiH(Nhexyl$_2$)-CH$_2$—SiH(Nhexyl$_2$)-]$_n$;
the precursor being [—NH—SiH(NCyHex$_2$)-CH$_2$—SiH(NCyHex$_2$)-]$_n$;
the precursor being [—NH—SiH(NMeH)—CH$_2$—SiH(NMeH)—]$_n$;
the precursor being [—NH—SiH(NEtH)—CH$_2$—SiH(NEtH)—]$_n$;
the precursor being [—NH—SiH(NnPrH)—CH$_2$—SiH(NnPrH)—]$_n$;
the precursor being [—NH—SiH(NiPrH)—CH$_2$—SiH(NiPrH)—]$_n$;
the precursor being [—NH—SiH(NBuH)—CH$_2$—SiH(NBuH)—]$_n$;
the precursor being [—NH—SiH(NiBuH)—CH$_2$—SiH(NiBuH)—]$_n$;
the precursor being [—NH—SiH(NtBuH)—CH$_2$—SiH(NtBuH)—]$_n$;
the precursor being [—NH—SiH(NAmH)—CH$_2$—SiH(NAmH)—]$_n$;
the precursor being [—NH—SiH(pyridine)-CH$_2$—SiH(pyridine)-]$_n$;
the precursor being [—NH—SiH(pyrrole)-CH$_2$—SiH(pyrrole)-]$_n$;
the precursor being [—NH—SiH(pyrrolidine)-CH$_2$—SiH(pyrrolidine)-]$_n$;
the precursor being [—NH—SiH(imidazole)-CH$_2$—SiH(imidazole)-]$_n$;
the precursor being [—NH—SiH(piperidine)-CH$_2$—SiH(piperidine)-]$_n$;
the precursor being [—NH—SiH(pyrimidine)-CH$_2$—SiH(pyrimidine)-]$_n$;
t=2;
the precursor being [—NR—R$^4$R$^5$Si—(CH$_2$)$_2$—SiR$^2$R$^3$—]$_n$;
the precursor comprising [—NR—R$^4$R$^5$Si—(CH$_2$)$_2$—SiR$^2$R$^3$—]$_n$ units and a [—NR—R$^4$R$^5$Si—(CH$_2$)$_2$—SiR$^1$R$^2$R$^3$—] end-cap;
the precursor comprising [—NR—R$^4$R$^5$Si—(CH$_2$)$_2$—SiR$^2$R$^3$—]$_n$ units and a [—NR—R$^4$R$^5$Si—(CH$_2$)$_2$—SiR$^2$R$^3$—NR$^1$R$^2$] end-cap;
R, R$^2$, R$^3$, R$^4$ and R$^5$=H;
the precursor being [—NH—SiH$_2$—CH$_2$—CH$_2$—SiH$_2$—]$_n$;
R=Si$_x$H$_{2x+1}$ (x=1 to 4) and R$^2$, R$^3$, R$^4$ and R$^5$=H;
the precursor being [—N(SiH$_3$)—SiH$_2$—CH$_2$—CH$_2$—SiH$_2$—]$_n$;
the precursor being [—N(Si$_2$H$_5$)—SiH$_2$—CH$_2$—CH$_2$—SiH$_2$—]$_n$;
the precursor being [—N(Si$_3$H$_7$)—SiH$_2$—CH$_2$—CH$_2$—SiH$_2$—]$_n$;
the precursor being [—N(Si$_4$H$_9$)—SiH$_2$—CH$_2$—CH$_2$—SiH$_2$—]$_n$;
R=C$_y$H$_{2y+1}$ (y=1 to 6) and R$^2$, R$^3$, R$^4$ and R$^5$=H;
the precursor being [—N(CH$_3$)—SiH$_2$—CH$_2$—CH$_2$—SiH$_2$—]$_n$;
the precursor being [—N(C$_2$H$_5$)—SiH$_2$—CH$_2$—CH$_2$—SiH$_2$—]$_n$;
the precursor being [—N(C$_3$H$_7$)—SiH$_2$—CH$_2$—CH$_2$—SiH$_2$—]$_n$;
the precursor being [—N(C$_4$H$_9$)—SiH$_2$—CH$_2$—CH$_2$—SiH$_2$—]$_n$;
the precursor being [—N(C$_5$H$_{11}$)—SiH$_2$—CH$_2$—CH$_2$—SiH$_2$—]$_n$;
the precursor being [—N(C$_6$H$_{13}$)—SiH$_2$—CH$_2$—CH$_2$—SiH$_2$—]$_n$;
R$^2$, R$^3$, R$^4$ and R$^5$=H;
the precursor being [—N(SiMe$_3$)-H$_2$Si—CH$_2$—CH$_2$—SiH$_2$—]$_n$;
the precursor being [—N(SiEt$_3$)-H$_2$Si—CH$_2$—CH$_2$—SiH$_2$—]$_n$;
the precursor being [—N(Si(iPr)$_3$-SiH$_2$—CH$_2$—CH$_2$—SiH$_2$—]$_n$;
the precursor being [—N(Si(nPr)$_3$-SiH$_2$—CH$_2$—CH$_2$—SiH$_2$—]$_n$;
the precursor being [—N(Si(Bu)$_3$-SiH$_2$—CH$_2$—CH$_2$—SiH$_2$—]$_n$;
the precursor being [—N(Si(iBu)$_3$-SiH$_2$—CH$_2$—CH$_2$—SiH$_2$—]$_n$;
the precursor being [—N(Si(tBu)$_3$-SiH$_2$—CH$_2$—CH$_2$—SiH$_2$—]$_n$;
the precursor being [—N(Si(amyl)$_3$-SiH$_2$—CH$_2$—CH$_2$—SiH$_2$—]$_n$;
the precursor being [—N(Si(hexyl)$_3$-SiH$_2$—CH$_2$—CH$_2$—SiH$_2$—]$_n$;
the precursor being [—Nx(SiH(Me)$_2$-SiH$_2$—CH$_2$—CH$_2$—SiH$_2$—]$_n$;
the precursor being [—N(SiH(Et)$_2$-SiH$_2$—CH$_2$—CH$_2$—SiH$_2$—]$_n$;
the precursor being [—N(SiH(iPr)$_2$-SiH$_2$—CH$_2$—CH$_2$—SiH$_2$—]$_n$;
the precursor being [—N(SiH(nPr)$_2$-SiH$_2$—CH$_2$—CH$_2$—SiH$_2$—]$_n$;
the precursor being [—N(SiH(Bu)$_2$-SiH$_2$—CH$_2$—CH$_2$—SiH$_2$—]$_n$;
the precursor being [—N(SiH(iBu)$_2$-SiH$_2$—CH$_2$—CH$_2$—SiH$_2$—]$_n$;
the precursor being [—N(SiH(tBu)$_2$-SiH$_2$—CH$_2$—CH$_2$—SiH$_2$—]$_n$;
the precursor being [—N(SiH(amyl)$_2$-SiH$_2$—CH$_2$—CH$_2$—SiH$_2$—]$_n$;
the precursor being [—N(SiH(hexyl)$_2$-SiH$_2$—CH$_2$—CH$_2$—SiH$_2$—]$_n$;
the precursor being [—N(SiH$_2$(Me)-SiH$_2$—CH$_2$—CH$_2$—SiH$_2$—]$_n$;
the precursor being [—N(SiH$_2$(Et)-SiH$_2$—CH$_2$—CH$_2$—SiH$_2$—]$_n$;
the precursor being [—N(SiH$_2$(iPr)-SiH$_2$—CH$_2$—CH$_2$—SiH$_2$—]$_n$;

the precursor being [—N(SiH$_2$(nPr)-SiH$_2$—CH$_2$—CH$_2$—SiH$_2$—]$_n$;
the precursor being [—N(SiH$_2$(Bu)-SiH$_2$—CH$_2$—CH$_2$—SiH$_2$—]$_n$;
the precursor being [—N(SiH$_2$(iBu)-SiH$_2$—CH$_2$CH$_2$—SiH$_2$—]$_n$;
the precursor being [—N(SiH$_2$(tBu)-SiH$_2$—CH$_2$—CH$_2$—SiH$_2$—]$_n$;
the precursor being [—N(SiH$_2$(amyl)-SiH$_2$—CH$_2$—CH$_2$—SiH$_2$—]$_n$;
the precursor being [—N(SiH$_2$(hexyl)-SiH$_2$—CH$_2$—CH$_2$—SiH$_2$—]$_n$;
the precursor being [—N(SiH$_2$NMe$_2$)-SiH$_2$—CH$_2$—CH$_2$—SiH$_2$—]$_n$;
the precursor being [—N(SiH$_2$NEt$_2$)-SiH$_2$—CH$_2$—CH$_2$—SiH$_2$—]$_n$;
the precursor being [—N(SiH$_2$NiPr$_2$)-SiH$_2$—CH$_2$—CH$_2$—SiH$_2$—]$_n$;
the precursor being [—N(SiH$_2$NnPr$_2$)-SiH$_2$—CH$_2$—CH$_2$—SiH$_2$—]$_n$;
the precursor being [—N(SiH$_2$NMeEt)-SiH$_2$—CH$_2$—CH$_2$—SiH$_2$—]$_n$;
the precursor being [—N(SiH(NMe$_2$)$_2$)-SiH$_2$—CH$_2$—CH$_2$—SiH$_2$—]$_n$;
the precursor being [—N(SiH(NEt$_2$)$_2$)-SiH$_2$—CH$_2$—CH$_2$—SiH$_2$—]$_n$;
$R^2$, $R^3$, $R^4$ and $R^5$=H and R=$R^{1'}R^{2'}R^{3'}$Si(CH$_2$)$_b$SiR$^{4'}$R$^{5'}$ wherein b=1 to 2 and $R^{1'}$, $R^{2'}$, $R^{3'}$, $R^{4'}$ and $R^{5'}$=H or $C_1$-$C_6$ hydrocarbon;
the precursor being [—N(SiH$_3$—CH$_2$—SiH$_2$)—SiH$_2$—CH$_2$—CH$_2$—SiH$_2$—]$_n$;
the precursor being [—N(SiH$_3$—CH$_2$—CH$_2$—SiH$_2$)—SiH$_2$—CH$_2$—CH$_2$—SiH$_2$—]$_n$;
the precursor being [—N(SiMe$_3$-CH$_2$—SiMe$_2$)-SiH$_2$—CH$_2$—CH$_2$—SiH$_2$—]$_n$;
the precursor being [—N(SiMe$_3$-CH$_2$—CH$_2$—SiMe$_2$)-SiH$_2$—CH$_2$—CH$_2$—SiH$_2$—]$_n$;
the precursor being [—N(SiEt$_3$-CH$_2$—SiEt$_2$)-SiH$_2$—CH$_2$—CH$_2$—SiH$_2$—]$_n$;
the precursor being [—N(SiEt$_3$-CH$_2$—CH$_2$—SiEt$_2$)-SiH$_2$—CH$_2$—CH$_2$—SiH$_2$—]$_n$;
R, $R^3$, $R^4$ and $R^5$=H;
the precursor being [—NH—H$_2$Si—CH$_2$—CH$_2$—SiH(CH$_2$=CH$_2$)—]$_n$;
the precursor being [—NH—H$_2$Si—CH$_2$—CH$_2$—SiH(CH$_2$—CH$_2$=CH$_2$)—]$_n$;
the precursor being [—NH—H$_2$Si—CH$_2$—CH$_2$—SiH(NH$_2$)—]$_n$;
the precursor being [—NH—H$_2$Si—CH$_2$—CH$_2$—SiH(NMe$_2$)-]$_n$;
the precursor being [—NH—H$_2$Si—CH$_2$—CH$_2$—SiH(NMeEt)-]$_n$;
the precursor being [—NH—H$_2$Si—CH$_2$—CH$_2$—SiH(NEt$_2$)-]$_n$;
the precursor being [—NH—H$_2$Si—CH$_2$—CH$_2$—SiH(NnPr$_2$)-]$_n$;
the precursor being [—NH—H$_2$Si—CH$_2$—CH$_2$—SiH(NiPr$_2$)-]$_n$;
the precursor being [—NH—H$_2$Si—CH$_2$—CH$_2$—SiH(NBu$_2$)-]$_n$;
the precursor being [—NH—H$_2$Si—CH$_2$—CH$_2$—SiH(NiBu$_2$)-]$_n$;
the precursor being [—NH—H$_2$Si—CH$_2$—CH$_2$—SiH(NtBu$_2$)-]$_n$;
the precursor being [—NH—H$_2$Si—CH$_2$—CH$_2$—SiH(NAm$_2$)-]$_n$;
the precursor being [—NH—H$_2$Si—CH$_2$—CH$_2$—SiH(NCyPentyl$_2$)-]$_n$;
the precursor being [—NH—H$_2$Si—CH$_2$—CH$_2$—SiH(Nhexyl$_2$)-]$_n$;
the precursor being [—NH—H$_2$Si—CH$_2$—CH$_2$—SiH(NCyHex$_2$)-]$_n$;
the precursor being [—NH—H$_2$Si—CH$_2$—CH$_2$—SiH(NMeH)—]$_n$;
the precursor being [—NH—H$_2$Si—CH$_2$—CH$_2$—SiH(NEtH)—]$_n$;
the precursor being [—NH—H$_2$Si—CH$_2$—CH$_2$—SiH(NnPrH)—]$_n$;
the precursor being [—NH—H$_2$Si—CH$_2$—CH$_2$—SiH(NiPrH)—]$_n$;
the precursor being [—NH—H$_2$Si—CH$_2$—CH$_2$—SiH(NBuH)—]$_n$;
the precursor being [—NH—H$_2$Si—CH$_2$—CH$_2$—SiH(NiBuH)—]$_n$;
the precursor being [—NH—H$_2$Si—CH$_2$—CH$_2$—SiH(NtBuH)—]$_n$;
the precursor being [—NH—H$_2$Si—CH$_2$—CH$_2$—SiH(NAmH)—]$_n$;
the precursor being [—NH—H$_2$Si—CH$_2$—CH$_2$—SiH(pyridine)-]$_n$;
the precursor being [—NH—H$_2$Si—CH$_2$—CH$_2$—SiH(pyrrole)-]$_n$;
the precursor being [—NH—H$_2$Si—CH$_2$—CH$_2$—SiH(pyrrolidine)-]$_n$;
the precursor being [—NH—H$_2$Si—CH$_2$—CH$_2$—SiH(imidazole)-]$_n$;
the precursor being [—NH—H$_2$Si—CH$_2$—CH$_2$—SiH(piperidine)-]$_n$;
the precursor being [—NH—H$_2$Si—CH$_2$—CH$_2$—SiH(pyrimidine)$_2$-]$_n$;
R, $R^4$ and $R^5$=H;
the precursor being [—NH—H$_2$Si—CH$_2$—CH$_2$—Si(CH$_2$=CH$_2$)$_2$—]$_n$;
the precursor being [—NH—H$_2$Si—CH$_2$—CH$_2$—Si(CH$_2$—CH$_2$=CH$_2$)$_2$—]$_n$;
the precursor being [—NH—H$_2$Si—CH$_2$—CH$_2$—Si(NH$_2$)$_2$—]$_n$;
the precursor being [—NH—H$_2$Si—CH$_2$—CH$_2$—Si(NMe$_2$)$_2$-]$_n$;
the precursor being [—NH—H$_2$Si—CH$_2$—CH$_2$—Si(NMeEt)$_2$)-]$_n$;
the precursor being [—NH—H$_2$Si—CH$_2$—CH$_2$—Si(NEt$_2$)$_2$-]$_n$;
the precursor being [—NH—H$_2$Si—CH$_2$—CH$_2$—Si(NnPr$_2$)$_2$-]$_n$;
the precursor being [—NH—H$_2$Si—CH$_2$—CH$_2$—Si(NiPr$_2$)$_2$-]$_n$;
the precursor being [—NH—H$_2$Si—CH$_2$—CH$_2$—Si(NBu$_2$)$_2$-]$_n$;
the precursor being [—NH—H$_2$Si—CH$_2$—CH$_2$—Si(NiBu$_2$)$_2$-]$_n$;
the precursor being [—NH—H$_2$Si—CH$_2$—CH$_2$—Si(NtBu$_2$)$_2$-]$_n$;
the precursor being [—NH—H$_2$Si—CH$_2$—CH$_2$—Si(NAm$_2$)$_2$)—]$_n$;
the precursor being [—NH—H$_2$Si—CH$_2$—CH$_2$—Si(NCyPentyl$_2$)$_2$-]$_n$;
the precursor being [—NH—H$_2$Si—CH$_2$—CH$_2$—Si(Si(Nhexyl$_2$)$_2$-]$_n$;
the precursor being [—NH—H$_2$Si—CH$_2$—CH$_2$—Si(NCyHex$_2$)$_2$-]$_n$;
the precursor being [—NH—H$_2$Si—CH$_2$—CH$_2$—Si(NMeH)$_2$—]$_n$;

the precursor being [—NH—H$_2$Si—CH$_2$—CH$_2$—Si(NEtH)$_2$—]$_n$;
the precursor being [—NH—H$_2$Si—CH$_2$—CH$_2$—Si(Nn-PrH)$_2$—]$_n$;
the precursor being [—NH—H$_2$Si—CH$_2$—CH$_2$—Si(Ni-PrH)$_2$—]$_n$;
the precursor being [—NH—H$_2$Si—CH$_2$—CH$_2$—Si(NBuH)$_2$—]$_n$;
the precursor being [—NH—H$_2$Si—CH$_2$—CH$_2$—Si(NiBuH)$_2$—]$_n$;
the precursor being [—NH—H$_2$Si—CH$_2$—CH$_2$—Si(NtBuH)$_2$—]$_n$;
the precursor being [—NH—H$_2$Si—CH$_2$—CH$_2$—Si(NAmH)$_2$—]$_n$;
the precursor being [—NH—H$_2$Si—CH$_2$—CH$_2$—Si(pyridine)$_2$-]$_n$;
the precursor being [—NH—H$_2$Si—CH$_2$—CH$_2$—Si(pyrrole)$_2$-]$_n$;
the precursor being [—NH—H$_2$Si—CH$_2$—CH$_2$—Si(pyrrolidine)$_2$-]$_n$;
the precursor being [—NH—H$_2$Si—CH$_2$—CH$_2$—Si(imidazole)$_2$-]$_n$;
the precursor being [—NH—H$_2$Si—CH$_2$—CH$_2$—Si(piperidine)$_2$-]$_n$;
the precursor being [—NH—H$_2$Si—CH$_2$—CH$_2$—Si(pyrimidine)$_2$-]$_n$;
R, R$^3$ and R$^5$=H;
the precursor being [—NH—SiH(CH$_2$=CH$_2$)—CH$_2$—CH$_2$—SiH(CH$_2$=CH$_2$)$_2$—]$_n$;
the precursor being [—NH—SiH(CH$_2$—CH$_2$=CH$_2$)—CH$_2$—CH$_2$—SiH(CH$_2$—CH$_2$=CH$_2$)$_2$—]$_n$;
the precursor being [—NH—SiH(NH$_2$)—CH$_2$—CH$_2$—SiH(NH$_2$)—]$_n$;
the precursor being [—NH—SiH(NMe$_2$)-CH$_2$—CH$_2$—SiH(NMe$_2$)-]$_n$;
the precursor being [—NH—SiH(NMeEt)-CH$_2$—CH$_2$—SiH(NMeEt)-]$_n$;
the precursor being [—NH—SiH(NEt$_2$)-CH$_2$—CH$_2$—SiH(NEt$_2$)-]$_n$;
the precursor being [—NH—SiH(NnPr$_2$)-CH$_2$—CH$_2$—SiH(NnPr$_2$)-]$_n$;
the precursor being [—NH—SiH(NiPr$_2$)-CH$_2$—CH$_2$—SiH(NiPr$_2$)-]$_n$;
the precursor being [—NH—SiH(NBu$_2$)-CH$_2$—CH$_2$—SiH(NBu$_2$)-]$_n$;
the precursor being [—NH—SiH(NiBu$_2$)-CH$_2$—CH$_2$—SiH(NiBu$_2$)-]$_n$;
the precursor being [—NH—SiH(NtBu$_2$)-CH$_2$—CH$_2$—SiH(NtBu$_2$)-]$_n$;
the precursor being [—NH—SiH(NAm$_2$)-CH$_2$—CH$_2$—SiH(NAm$_2$)-]$_n$;
the precursor being [—NH—SiH(NCyPentyl$_2$)-CH$_2$—CH$_2$—SiH(NCyPentyl$_2$)-]$_n$;
the precursor being [—NH—SiH(Nhexyl$_2$)-CH$_2$—CH$_2$—SiH(Nhexyl$_2$)-]$_n$;
the precursor being [—NH—SiH(NCyHex$_2$)-CH$_2$—CH$_2$—SiH(NCyHex$_2$)-]$_n$;
the precursor being [—NH—SiH(NMeH)—CH$_2$—CH$_2$—SiH(NMeH)—]$_n$;
the precursor being [—NH—SiH(NEtH)—CH$_2$—CH$_2$—SiH(NEtH)—]$_n$;
the precursor being [—NH—SiH(NnPrH)—CH$_2$—CH$_2$—SiH(NnPrH)—]$_n$;
the precursor being [—NH—SiH(NiPrH)—CH$_2$—CH$_2$—SiH(NiPrH)—]$_n$;
the precursor being [—NH—SiH(NBuH)—CH$_2$—CH$_2$—SiH(NBuH)—]$_n$;
the precursor being [—NH—SiH(NiBuH)—CH$_2$—CH$_2$—SiH(NiBuH)—]$_n$;
the precursor being [—NH—SiH(NtBuH)—CH$_2$—CH$_2$—SiH(NtBuH)—]$_n$;
the precursor being [—NH—SiH(NAmH)—CH$_2$—CH$_2$—SiH(NAmH)—]$_n$;
the precursor being [—NH—SiH(pyridine)-CH$_2$—CH$_2$—SiH(pyridine)-]$_n$;
the precursor being [—NH—SiH(pyrrole)-CH$_2$—CH$_2$—SiH(pyrrole)-]$_n$;
the precursor being [—NH—SiH(pyrrolidine)-CH$_2$—CH$_2$—SiH(pyrrolidine)-]$_n$;
the precursor being [—NH—SiH(imidazole)-CH$_2$—CH$_2$—SiH(imidazole)-]$_n$;
the precursor being [—NH—SiH(piperidine)-CH$_2$—CH$_2$—SiH(piperidine)-]$_n$;
the precursor being [—NH—SiH(pyrimdine)-CH$_2$—CH$_2$—SiH(pyrimidine)-]$_n$;
the Si-containing film forming composition comprising between approximately 0.1 molar % and approximately 50 molar % of the precursor;
the Si-containing film forming composition comprising between approximately 93% w/w to approximately 100% w/w of the precursor;
the Si-containing film forming composition comprising between approximately 99% w/w to approximately 100% w/w of the precursor;
the Si-containing film forming composition comprising between approximately 0 ppmw and 200 ppmw of Cl;
the Si-containing film forming composition comprising between approximately 0 ppmw and 50 ppmw of Cl;
further comprising a solvent;
the solvent being selected from the group consisting of $C_1$-$C_{16}$ hydrocarbons, THF, DMO, ether, pyridine, ketones, esters, and combinations thereof;
the solvent being a $C_1$-$C_{16}$ saturated or unsaturated hydrocarbon;
the solvent being tetrahydrofuran (THF);
the solvent being dimethyl oxalate (DMO);
the solvent being ether;
the solvent being pyridine;
the solvent being methyl isobutyl ketone;
the solvent being cyclohexanone;
the solvent being ethanol;
the solvent being isopropanol;
further comprising a catalyst or a radical generator;
the radical generator being a photoinitiator, such as a phenone, a quinine, or a metallocene;
further comprising a thermal radical initiator, such as a peroxide or an azo compound comprising an —N=N— unit; or
the Si-containing film forming composition comprising between approximately 0 ppmw and 100 ppb of each metal selected from alkaline metals, alkaline earth metals, Al, and transition metals (as defined by the International Union of Pure and Applied Chemistry (IUPAC)).

Also disclosed are methods of depositing a Si-containing layer on a substrate, The vapor of any of the Si-containing film forming compositions disclosed above, but preferably those of Formula (I), is introduced into a reactor having a substrate disposed therein. At least part of the precursor is deposited onto the substrate to form a Si-containing layer using a vapor deposition method. The disclosed methods may include one or more of the following aspects:
introducing into the reactor a vapor comprising a second precursor;

the second precursor comprising an element selected from the group consisting of group 2, group 13, group 14, transition metal, lanthanides, and combinations thereof;
the element of the second precursor being selected from B, Zr, Hf, Ti, Nb, V, Ta, Al, Si, Ge;
introducing a co-reactant into the reactor;
the co-reactant being selected from the group consisting of $O_2$, $O_3$, $H_2O$, $H_2O_2$, NO, $NO_2$, a carboxylic acid, an alcohol, ethanolamine, radicals thereof, and combinations thereof;
the co-reactant being plasma treated oxygen;
the co-reactant being ozone;
the Si-containing layer being a silicon oxide containing layer;
the co-reactant being selected from the group consisting of $H_2$, $NH_3$, $(SiH_3)_3N$, hydridosilanes (such as $SiH_4$, $Si_2H_6$, $SiH_3H_8$, $Si_4H_{10}$, $Si_5H_{10}$, $Si_6H_{12}$), chlorosilanes and chloropolysilanes (such as $SiHCl_3$, $SiH_2Cl_2$, $SiH_3Cl$, $Si_2Cl_6$, $Si_2HCl_5$, $SiH_3Cl_8$), alkysilanes (such as $Me_2SiH_2$, $Et_2SiH_2$, $MeSiH_3$, $EtSiH_3$), hydrazines (such as $N_2H_4$, $MeHNNH_2$, MeHNNHMe), organic amines (such as $NMeH_2$, $NEtH_2$, $NMe_2H$, $NEt_2H$, $NMe_3$, $NEt_3$, $(SiMe_3)_2NH$), diamines (such as ethylene diamine, dimethylethylene diamine, tetramethylethylene diamine), pyrazoline, pyridine, B-containing molecules (such as $B_2H_6$, trimethylboron, triethylboron, borazine, substituted borazine, dialkylaminoboranes), alkyl metals (such as trimethylaluminum, triethylaluminum, dimethylzinc, diethylzinc), radical species thereof, and mixtures thereof.
the co-reactant being selected from the group consisting of $H_2$, $NH_3$, $SiH_4$, $Si_2H_6$, $SiH_3H_8$, $SiH_2Me_2$, $SiH_2Et_2$, $N(SiH_3)_3$, hydrogen radicals thereof, and mixtures thereof;
the co-reactant being HCDS or PCDS;
the co-reactant being a saturated or unsaturated, linear, branched or cyclic hydrocarbon;
the co-reactant being ethylene;
the co-reactant being acetylene;
the co-reactant being propylene;
the co-reactant being isoprene;
the co-reactant being cyclohexane;
the co-reactant being cyclohexane;
the co-reactant being cyclohexadiene;
the co-reactant being pentene;
the co-reactant being pentyne;
the co-reactant being cyclopentane;
the co-reactant being butadiene;
the co-reactant being cyclobutane;
the co-reactant being terpinene;
the co-reactant being octane;
the co-reactant being octene;
the vapor deposition process being a chemical vapor deposition process;
the vapor deposition process being an atomic layer deposition (ALD) process;
the vapor deposition process being a spatial ALD process;
the vapor deposition process being a flowable chemical vapor deposition process (F-CVD);
the silicon-containing layer being $SiO_2$;
the silicon-containing layer being SiC;
the silicon-containing layer being SiN;
the silicon-containing layer being SiON;
the silicon-containing layer being SiOC;
the silicon-containing layer being SiONC;
the silicon-containing layer being SiBN;
the silicon-containing layer being SiBCN;
the silicon-containing layer being SiCN;
the silicon-containing layer being SiMCO, in which M is selected from Zr, Hf, Ti, Nb, V, Ta, Al, Ge; or
further comprising annealing the Si-containing layer.

Methods of forming Si-containing films on substrates are also disclosed using the disclosed precursors. Any of the Si-containing film forming compositions disclosed above, but preferably those of formula (II), is contacted with the substrate and the Si-containing film formed via a spin coating, spray coating, dip coating, or slit coating technique to form the Si-containing film. The disclosed methods may include the following aspects:

the Si-containing film forming composition further comprising a solvent selected from the group consisting of $C_5$-$C_{16}$ branched, linear, saturated or unsaturated hydrocarbons; THF; DMO; ether; pyridine; ketones; esters; and combinations thereof;
the solvent being a $C_5$-$C_{16}$ saturated or insaturated hydrocarbon;
the solvent being ether;
the solvent being methyl isobutyl ketone;
the solvent being cyclohexanone;
the Si-containing film forming composition further comprising a catalyst or a radical generator;
the radical generator being a photoinitiator;
the radical generator being a phenone;
the radical generator being a quinine;
the radical generator being a metallocene;
the radical generator being a thermal radical initiator;
the radical generator being a peroxide;
the radical generator being an azo compound comprising an —N=N— unit;
the catalyst being a Lewis acid;
the catalyst being a photo-acid generator;
the catalyst being a hydrosilylation catalyst;
the Lewis acid being Tris(pentafluorophenyl)borane $B(C_6F_5)_3$;
the Lewis acid being a derivative;
the Lewis acid being a non-coordinating anion formed by the complexation of $B(C_6F_5)_3$ with a metallocene compound;
forming the Si-containing film via a spin coating technique;
forming the Si-containing film via a spray coating technique;
forming the Si-containing film via a dip coating technique;
forming the Si-containing film via a slit coating technique;
annealing the Si-containing film;
UV-curing the Si containing film;
UV curing the Si containing film under a reactive atmosphere to enhance the cross linking of the oligomers; or
laser treating the Si-containing film.

Notation and Nomenclature

The following detailed description and claims utilize a number of abbreviations, symbols, and terms, which are generally well known in the art. While definitions are typically provided with the first instance of each acronym, for convenience, Table 1 provides a list of the abbreviations, symbols, and terms used along with their respective definitions.

TABLE 1

| | |
|---|---|
| a or an | One or more than one |
| Approximately or about | ±10% of the value stated |
| LCD-TFT | liquid-crystal display - thin-film transistor |
| TFT | thin-film transistor |
| MIM | Metal-insulator-metal |
| DRAM | dynamic random-access memory |
| CVD | chemical vapor deposition |
| LPCVD | low pressure chemical vapor deposition |
| PCVD | pulsed chemical vapor deposition |
| SACVD | sub-atmospheric chemical vapor deposition |
| PECVD | plasma enhanced chemical vapor deposition |
| APCVD | atmospheric pressure chemical vapor deposition |
| HWCVD | hot-wire chemical vapor deposition |
| f-CVD | flowable chemical vapor deposition |
| f-PECVD | flowable plasma enhanced chemical vapor deposition |
| MOCVD | metal organic chemical vapor deposition |
| ALD | atomic layer deposition |
| spatial ALD | spatial atomic layer deposition |
| HWALD | hot-wire atomic layer deposition |
| PEALD | plasma enhanced atomic layer deposition |
| GCMS | gas chromatography-mass spectrometry |
| GPC | Gel Permeation Chromatography |
| HCDS | hexachlorodisilane ($Si_2Cl_6$) |
| PCDS | pentachlorodisilane ($Si_2HCl_5$) |
| SRO | Strontium Ruthenium Oxide |
| LAH | Lithium aluminium hydride $LiAlH_4$ |
| THF | tetrahydrofuran |
| Me | Methyl |
| Et | Ethyl |
| iPr | iso-Propyl |
| nPr | n-propyl |
| iBu | iso-Butyl |
| tBu | tert-Butyl |

The standard abbreviations of the elements from the periodic table of elements are used herein. It should be understood that elements may be referred to by these abbreviations (e.g., Si refers to silicon, N refers to nitrogen, O refers to oxygen, C refers to carbon, etc.).

As used herein, the term "independently" when used in the context of describing R groups should be understood to denote that the subject R group is not only independently selected relative to other R groups bearing the same or different subscripts or superscripts, but is also independently selected relative to any additional species of that same R group. For example in the formula $MR^1_x (NR^2R^3)_{(4-x)}$, where x is 2 or 3, the two or three $R^1$ groups may, but need not be identical to each other or to $R^2$ or to $R^3$. Further, it should be understood that unless specifically stated otherwise, values of R groups are independent of each other when used in different formulas.

As used herein, the term "hydrocarbon" refers to a saturated or unsaturated function group containing exclusively carbon and hydrogen atoms. As used herein, the term "alkyl group" refers to saturated functional groups containing exclusively carbon and hydrogen atoms. An alkyl group is one type of hydrocarbon. Further, the term "alkyl group" refers to linear, branched, or cyclic alkyl groups. Examples of linear alkyl groups include without limitation, methyl groups, ethyl groups, propyl groups, butyl groups, etc. Examples of branched alkyls groups include without limitation, t-butyl. Examples of cyclic alkyl groups include without limitation, cyclopropyl groups, cyclopentyl groups, cyclohexyl groups, etc.

As used herein, the term "aryl" refers to aromatic ring compounds where one hydrogen atom has been removed from the ring.

As used herein, the term "heterocyclic group" refers to a cyclic compound that has atoms of at least two different elements (not including H), such as C and S and/or N, as members of its ring.

As used herein, the term "carbosilazane" refers to a linear, branched, or cyclic molecule containing Si, C, and N atoms and at least one Si—N bond;

As used herein, the acronym "DSP" stands for disilapropane, more particularly to $H_3Si—CH_2—SiH_3$ or its ligand analog —$H_2Si—CH_2—SiH_3$ or its monomer analog —$H_2Si—CH_2—SiH_2$—; the acronym "DSB" stands for disilabutane, more particularly to $H_3Si—CH_2—CH_2—SiH_3$ or its ligand analog —$H_2Si—CH_2—CH_2—SiH_3$ or its monomer analog —$H_2Si—CH_2—CH_2—SiH_2$—; and the abbreviations "HNDSP2", "RNDSP2", "NDSP3", "HNDSB2", "RNDSB2", and "NDSB3" stand for $HN(DSP)_2$, $RN(DSP)_2$, $N(DSP)_3$, $HN(DSB)_2$, $RN(DSB)_2$, and $N(DSB)_3$, respectively, wherein R is as defined.

As used herein, the abbreviation "Me" refers to a methyl group; the abbreviation "Et" refers to an ethyl group; the abbreviation "Pr" refers to any propyl group (i.e., n-propyl or isopropyl); the abbreviation "iPr" refers to an isopropyl group; the abbreviation "Bu" refers to any butyl group (n-butyl, iso-butyl, t-butyl, sec-butyl); the abbreviation "tBu" refers to a tert-butyl group; the abbreviation "sBu" refers to a sec-butyl group; the abbreviation "iBu" refers to an iso-butyl group; the abbreviation "Ph" refers to a phenyl group; the abbreviation "Am" refers to any amyl group (iso-amyl, sec-amyl, tert-amyl); the abbreviation "Cy" refers to a cyclic hydrocarbon group (cyclobutyl, cyclopentyl, cyclohexyl, etc.).

As used herein, the term "halogen-free" means X ranging from 0 ppmw to 1000 ppmw, preferably from 0 ppmw to 500 ppmw, and more preferably from 0 ppmw to 100 ppmw, wherein X=Cl, Br, or I).

The standard abbreviations of the elements from the periodic table of elements are used herein. It should be understood that elements may be referred to by these abbreviations (e.g., Si refers to silicon, N refers to nitrogen, O refers to oxygen, C refers to carbon, etc.).

Please note that the films or layers deposited, such as silicon oxide, are listed throughout the specification and claims without reference to their proper stoichiometry (i.e., $SiO_2$). The layers may include pure (Si) layers, silicide ($M_oSi_p$) layers, carbide ($Si_oSi_p$) layers, nitride ($Si_kN_l$) layers, oxide ($Si_nO_m$) layers, or mixtures thereof; wherein M is an element and k, l, m, n, o, and p inclusively range from 1 to 6. For instance, cobalt silicide is $Co_kSi_l$, where k and l each range from 0.5 to 5. Similarly, any referenced layers may also include a Silicon oxide layer, $Si_nO_m$, wherein n ranges from 0.5 to 1.5 and m ranges from 1.5 to 3.5. More preferably, the silicon oxide layer is $SiO_2$. The silicon oxide layer may be a silicon oxide based dielectric material, such as organic based or silicon oxide based low-k dielectric materials such as the Black Diamond II or III material by Applied Materials, Inc. Alternatively, any referenced silicon-containing layer may be pure silicon. Any silicon-containing layers may also include dopants, such as B, C, P, As and/or Ge.

Any and all ranges recited herein are inclusive of their endpoints (i.e., x=1 to 4 includes x=1, x=4, and x=any number in between), irrespective of whether the term 'inclusively' is used.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
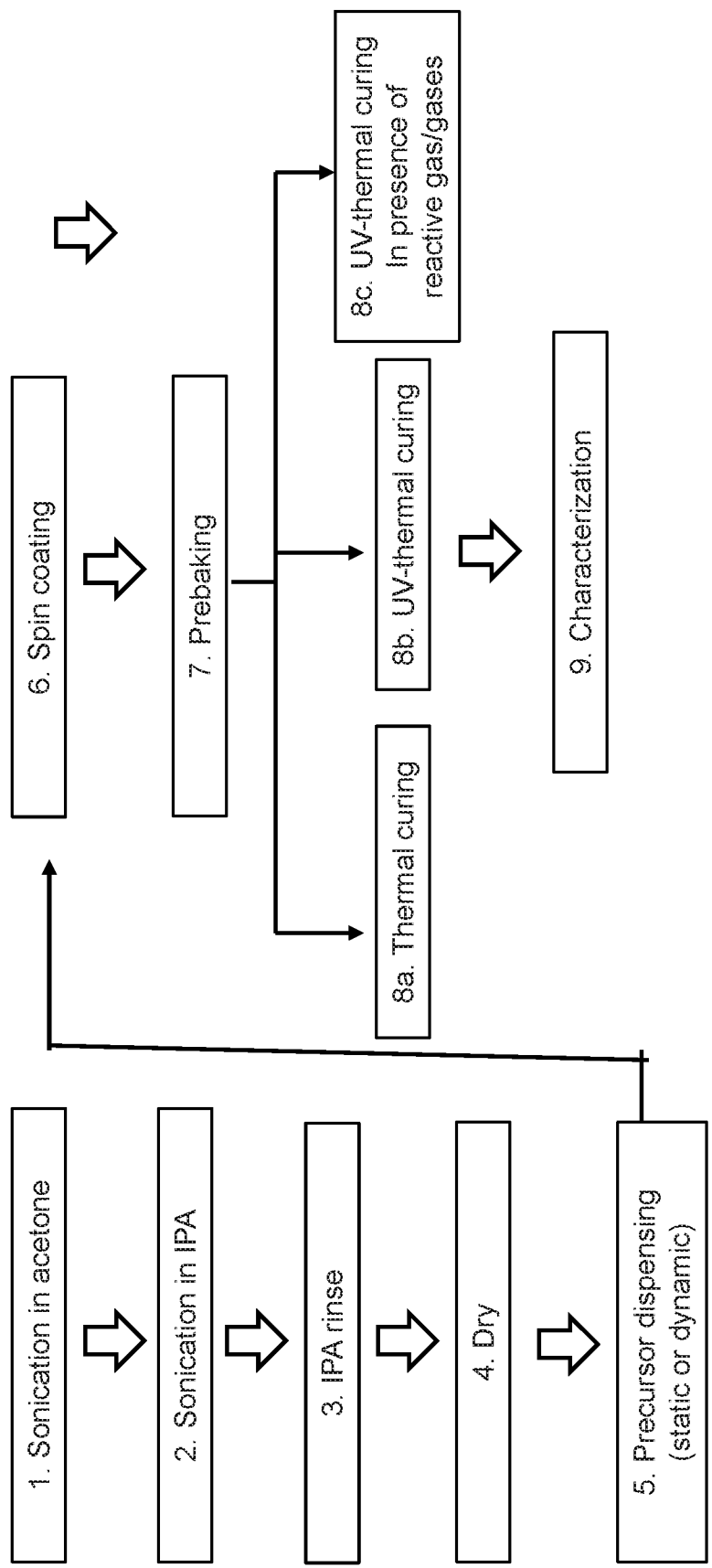
FIG. 1 is a flow chart for an exemplary deposition process.

Disclosed are Si-containing film forming compositions comprising carbosilazane or polycarbosilazane (or polyorganosilazane) precursors. Also disclosed are methods of synthesizing the carbosilazane or polycarbosilazane precursors and methods of using the same to deposit silicon-containing films for manufacturing semiconductors.

The disclosed precursors have the following formula:

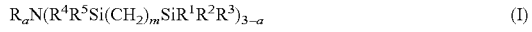

or a unit having the fallowing formula:

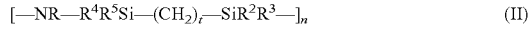

wherein a=0 to 1; m=1 to 4; t=1 to 4; n=2 to 400;

$R^1$, $R^2$, $R^3$, $R^4$, and $R^5$ are independently H, a hydrocarbon group ($C^1$ to $C^6$), or an alkylamino group having the formula $NR''_2$ and each R'' is independently H, a $C^1$-$C^6$ hydrocarbon group, a $C_6$-$C_{12}$ aryl, or $NR''_2$ forms a cyclic amine group, and provided that at least one of $R^1$, $R^2$, $R^3$, $R^4$, and $R^5$ is H; and R is H; a $C_1$-$C_6$ hydrocarbon group; a silyl group having the formula $Si_xR'_{2x+1}$ with x=1 to 4 and each R' independently=H, a $C_1$-$C_6$ hydrocarbon group, or an alkylamino group having the formula $NR''_2$ and each R'' is independently H, a $C_1$-$C_6$ group, a $C_6$-$C_{12}$ aryl, or $NR''_2$ forms a cyclic amine group; or a $R^{1'}R^{2'}R^{3'}Si(CH_2)_bSiR^{4'}R^{5'}$ group, wherein b=1 to 2 and $R^{1'}$, $R^{2'}$, $R^{3'}$, $R^{4'}$, and $R^{5'}$ are independently H, a $C_1$-$C_6$ hydrocarbon group, a $C_6$-$C_{12}$ aryl, or an alkylamino group having the formula $NR''_2$ and each R'' is independently H, a $C_1$-$C_6$ group, a $C_6$-$C_{12}$ aryl, or $NR''_2$ forms a cyclic amine group; and provided that at least one of $R^{1'}$, $R^{2'}$, $R^{3'}$, $R^{4'}$, and $R^{5'}$ is H. Preferably, m=1 to 2 and t=1 to 2. The R'' of the alkylamino groups may be joined to form a cyclic chain on the N atom. For example, $NR''_2$ may form pyridine, pyrrole, pyrrolidine, or imidazole ring structures. The precursors may have improved volatility when the precursor contains 6 Hs in formula (I) (i.e., R, $R^1$, $R^2$, $R^3$, $R^4$ and $R^5$ are each independently a H) or 5 Hs in each N—Si—C—Si or N—Si—C—C—Si backbone unit in formula (II) (i.e., R, $R^2$, $R^3$, $R^4$ and $R^5$ are each independently a H).

The disclosed precursors shown in formula (I) and (II) provide flexibilities to produce Si-containing film forming compositions that specifically have one element in more weight than the others depending on applications. For example, if more Si is preferred in the film, R may be a silane having the formula $Si_xH_{2x+1}$ (x=1 to 4) or a $R^{1'}R^{2'}R^{3'}Si(CH_2)_bSiR^{4'}R^{5'}$ group wherein b=1 to 2. If more N is preferred in the film, R, $R^1$, $R^2$, $R^3$, $R^4$, and $R^5$ are each independently an alkylamino group having the formula $NR''_2$. If more C is preferred in the film, R, $R^1$, $R^2$, $R^3$, $R^4$, and $R^5$ may be a hydrocarbon group (C1 to C12) or form a long carbon linking chain in the backbone unit, such as N—Si—$C_c$—Si (c=1 to 2).

The disclosed precursors contain no Si-halogen bonds which is important because halogens may damage other layers in the substrate (e.g., low k layers, copper interconnect layers, etc.). The disclosed Si-containing film forming compositions are halogen-free and capable of forming globally planarized, thermally stable and adherent dielectric layers and other dielectric-like layers or materials on semiconductor devices, semiconductor components, electronic components and layered materials.

The disclosed precursor may contain one or two hydrogen atoms directly bonded to the Si atom. The Si—H bonds of the disclosed precursors may help to provide a larger growth rate per cycle in ALD processes when compared to analogous Si-halogen containing precursors because the H atoms occupy less surface area, resulting in more molecules on the substrate surface. Inclusion of he SiH bonds (i.e., hydride functionality) may produce less steric bulk, which may provide the precursors with higher reactivity to the substrate than precursors that do not contain the SiH bond. These Si—H bonds may help increase the volatility of the precursor, which is important for vapor deposition processes. As a result, for vapor depositions processes, at least one of $R^1$, $R^2$, or $R^3$ preferably=H and at least one of $R^4$ or $R^5$ preferably=H in the disclosed precursors of Formula (I).

The disclosed precursor may contain one, two, or three amino groups directly bonded to the Si atom. These Si—N bonds may help increase thermal stability of the precursor, which is also important for vapor deposition processes. The amino group may also help incorporate N and C atoms into the resulting film, which may make the resulting layer more resistant to any subsequent etching processes.

One of ordinary skill in the art will recognize that the volatility provided by the Si—H bonds competes directly with the thermal stability provided by the amino groups. Applicants believe that at least $HN(SiH(NiPr_2)$-$CH_2$—$SiH_3)_2$ and $HN(SiH_2$—$CH_2$—$SiH_2(NiPr_2))_2$ successfully balance those competing characteristics.

One of ordinary skill in the art will recognize that embodiments in which m=1 may produce precursors having higher volatility and lower melting points, being more suitable for vapor deposition. Embodiments in which m=2 may also be suitable for vapor deposition when the resulting silicon-containing film also contains carbon. Embodiments in which m=3 or t=1-3 may be suitable for casting deposition methods, such as spin-on or dip coating.

Some of the disclosed Si-containing film forming compositions have properties suitable for vapor depositions methods, such as high vapor pressure, low melting point (preferably being in liquid form at room temperature), low sublimation point, and high thermal stability. The Si-containing film forming compositions preferably are stable at a temperature producing a vapor pressure of 1-5 Torr. The carbosilazane or polycarbosilazane (or polyorganosilazane) precursors in the disclosed Si-containing film forming compositions suitable for vapor deposition typically have a molecular weight ranging from approximately 150 to approximately 600, preferably from approximately 200 to approximately 400.

Some of the disclosed Si-containing film forming compositions have properties suitable for spin coating, spray coating, dip coating, or slit coating methods, such as low vapor pressure, low melting point (preferably being in liquid form at room temperature), and good solubility in the conventional coating processes. The carbosilazane or polycarbosilazane (or polyorganosilazane) precursors in the disclosed Si-containing film forming compositions suitable for these deposition techniques typically have a molecular weight ranging from approximately 500 to approximately 1,000,000, preferably from approximately 1,000 to approximately 100,000, and more preferably from 3,000 to 50,000.

When a=0, the disclosed carbosilazane precursor presented in formula (I) has the following formula:

$$N(SiR^4R^5(CH_2)_mSiR^1R^2R^3)_3 \quad (III)$$

When m=1, and $R^1$, $R^2$, $R^3$, $R^4$ and $R^5$=H, the disclosed precursor presented in formula (III) is tris(1,3-disilapropane) amine [$N(SiH_2—CH_2—SiH_3)_3$ or NDSP3]. As shown in the examples that follow, this liquid precursor is suitable for vapor deposition applications due at least partially to the benefits discussed above for SiH bonds and low molecular weight.

Exemplary precursors presented in formula (III) wherein m=1, $R^1$, $R^2$, $R^3$ and $R^4$=H include, but are not limited to, $N(SiH(CH_2=CH)—CH_2—SiH_3)_3$, $N(SiH(CH_2=CH—CH_2)—CH_2—SiH_3)_3$, $N(SiH(NH_2)—CH_2—SiH_3)_3$, $N(SiH(NMe_2)-CH_2—SiH_3)_3$, $N(SiH(NMeEt)-CH_2—SiH_3)_3$, $N(SiH(NEt_2)-CH_2—SiH_3)_3$, $N(SiH(NnPr_2)-CH_2—SiH_3)_3$, $N(SiH(NiPr_2)-CH_2—SiH_3)_3$, $N(SiH(NBu_2)-CH_2—SiH_3)_3$, $N(SiH(NiBu_2)-CH_2—SiH_3)_3$, $N(SiH(NtBu_2)-CH_2—SiH_3)_3$, $N(SiH(NAm_2)-CH_2—SiH_3)_3$; $N(SiH(NCyPentyl_2)-CH_2—SiH_3)_3$, $N(SiH(Nhexyl_2)-CH_2—SiH_3)_3$, $N(SiH(NCyHex_2)-CH_2—SiH_3)_3$, $N(SiH(NMeH)—CH_2—SiH_3)_3$; $N(SiH(NEtH)—CH_2—SiH_3)_3$, $N(SiH(NnPrH)—CH_2—SiH_3)_3$, $N(SiH(NiPrH)—CH_2—SiH_3)_3$, $N(SiH(NBuH)—CH_2—SiH_3)_3$, $N(SiH(NiBuH)—CH_2—SiH_3)_3$, $N(SiH(NtBuH)—CH_2—SiH_3)_3$, $N(SiH(NAmH)—CH_2—SiH_3)_3$, $N(SiH(pyridine)-CH_2—SiH_3)_3$, $N(SiH(pyrrole)-CH_2—SiH_3)_3$, $N(SiH(pyrrolidine)-CH_2—SiH_3)_3$, and $N(SiH(imidazole)-CH_2—SiH_3)_3$.

Exemplary precursors presented in formula (III) wherein m=1, $R^2$, $R^3$, $R^4$ and $R^5$=H include, but are not limited to, $N(SiH_2—CH_2—SiH_2(CH_2=CH))_3$, $N(SiH_2—CH_2—SiH_2(CH_2=CH—CH_2))_3$, $N(SiH_2—CH_2—SiH_2(NH_2))_3$, $N(SiH_2—CH_2—SiH_2(NMe_2))_3$, $N(SiH_2—CH_2—SiH_2(NMeEt))_3$, $N(SiH_2—CH_2—SiH_2(NEt_2))_3$, $N(SiH_2—CH_2—SiH_2(NnPr_2))_3$, $N(SiH_2—CH_2—SiH_2(NiPr_2))_3$, $N(SiH_2—CH_2—SiH_2(NBu_2))_3$, $N(SiH_2—CH_2—SiH_2(NiBu_2))_3$, $N(SiH_2—CH_2—SiH_2(NtBu_2))_3$, $N(SiH_2—CH_2—SiH_2(NAm_2))_3$, $N(SiH_2—CH_2—SiH_2(NCyPentyl_2))_3$, $N(SiH_2—CH_2—SiH_2(Nhexyl_2))_3$, $N(SiH_2—CH_2—SiH_2(NCyHex_2))_3$, $N(SiH_2—CH_2—SiH_2(NMeH))_3$, $N(SiH_2—CH_2—SiH_2(NEtH))_3$, $N(SiH_2—CH_2—SiH_2(NnPrH))_3$, $N(SiH_2—CH_2—SiH_2(NiPrH))_3$, $N(SiH_2—CH_2—SiH_2(NBuH))_3$, $N(SiH_2—CH_2—SiH_2(NiBuH))_3$, $N(SiH_2—CH_2—SiH_2(NtBuH))_3$, $N(SiH_2—CH_2—SiH_2(NAmH))_3$, $N(SiH_2—CH_2—SiH_2(pyridine))_3$, $N(SiH_2—CH_2—SiH_2(pyrrole))_3$, $N(SiH_2—CH_2—SiH_2(pyrrolidine))_3$, and $N(SiH_2—CH_2—SiH_2(imidazole))_3$. These precursors are suitable for vapor deposition due at least partially to the benefits discussed above for SiH bonds and low molecular weight. The terminal amino ligand may also provide improved thermal stability, as well as an additional N and/or C source for the resulting film.

Exemplary precursors presented in formula (III) wherein m=1, $R^1$, $R^2$ and $R^3$=H include, but are not limited to, $N(Si(CH_2=CH)_2—CH_2—SiH_3)_3$, $N(Si(CH_2=CH—CH_2)_2—CH_2—SiH_3)_3$, $N(Si(NH_2)_2—CH_2—SiH_3)_3$, $N(Si(NMe_2)_2-CH_2—SiH_3)_3$, $N(Si(NMeEt)_2-CH_2—SiH_3)_3$, $N(SiNEt_2-CH_2—SiH_3)_3$, $N(Si(NnPr_2)_2-CH_2—SiH_3)_3$, $N(Si(NiPr_2)_2-CH_2—SiH_3)_3$, $N(Si(NBu_2)_2-CH_2—SiH_3)_3$, $N(Si(NiBu_2)_2-CH_2—SiH_3)_3$, $N(Si(NtBu_2)_2-CH_2—SiH_3)_3$, $N(Si(NAm_2)_2-CH_2—SiH_3)_3$, $N(Si(NCyPentyl_2)_2-CH_2—SiH_3)_3$, $N(Si(Nhexyl_2)_2-CH_2—SiH_3)_3$, $N(Si(NCyHexyl_2)_2-CH_2—SiH_3)_3$, $N(Si(NMeH)_2—CH_2—SiH_3)_3$, $N(Si(NEtH)_2—CH_2—SiH_3)_3$, $N(Si(NnPrH)_2—CH_2—SiH_3)_3$, $N(Si(NiPrH)_2—CH_2—SiH_3)_3$, $N(Si(NBuH)_2—CH_2—SiH_3)_3$, $N(Si(NiBuH)_2—CH_2—SiH_3)_3$, $N(Si(NtBuH)_2—CH_2—SiH_3)_3$, $N(Si(NAmH)_2—CH_2—SiH_3)_3$, $N(Si(pyridine)_2-CH_2—SiH_3)_3$, $N(Si(pyrrole)_2-CH_2—SiH_3)_3$, $N(Si(pyrrolidine)_2-CH_2—SiH_3)_3$, and $N(Si(imidazole)_2-CH_2—SiH_3)_3$.

Exemplary precursors presented in formula (III) wherein m=1, $R^2$, $R^3$ and $R^4$=H include, but are not limited to $N(SiH(CH_2=CH)—CH_2—SiH_2(CH_2=CH))_3$, $N(SiH(CH_2=CH—CH_2)—CH_2—SiH_2(CH_2=CH—CH_2))_3$, $N(SiH(NH_2)—CH_2—SiH_2(NH_2))_3$, $N(SiH(NMe_2)-CH_2—SiH_2(NMe_2))_3$, $N(SiH(NMeEt)-CH_2—SiH_2(NMeEt))_3$, $N(SiH(NEt_2)-CH_2—SiH_2(NEt_2))_3$, $N(SiH(NnPr_2)-CH_2—SiH_2(NnPr_2))_3$, $N(SiH(NiPr_2)-CH_2—SiH_2(NiPr_2))_3$, $N(SiH(NBu_2)-CH_2—SiH_2(NBu_2))_3$, $N(SiH(NiBu_2)-CH_2—SiH_2(NiBu_2))_3$, $N(SiH(NtBu_2)-CH_2—SiH_2(NtBu_2))_3$, $N(SiH(NAm_2)-CH_2—SiH_2(NAm_2))_3$, $N(SiH(NCyPentyl_2)-CH_2—SiH_2(NCyPentyl_2))_3$, $N(SiH(Nhexyl_2)-CH_2—SiH_2(Nhexyl_2))_3$, $N(SiH(NCyHexyl_2)-CH_2—SiH_2(NCyHexyl_2))_3$, $N(SiH(NMeH)—CH_2—SiH_2(NMeH))_3$, $N(SiH(NEtH)—CH_2—SiH_2(NEtH))_3$, $N(SiH(NnPrH)—CH_2—SiH_2(NnPrH))_3$, $N(SiH(NiPrH)—CH_2—SiH_2(NiPrH))_3$, $N(SiH(NBuH)—CH_2—SiH_2(NBuH))_3$, $N(SiH(NiBuH)—CH_2—SiH_2(NiBuH))_3$, $N(SiH(NtBuH)—CH_2—SiH_2(NtBuH))_3$, $N(SiH(NAmH)—CH_2—SiH_2(NAmH))_3$, $N(SiH(pyridine)-CH_2—SiH_2(pyridine))_3$, $N(SiH(pyrrole)-CH_2—SiH_2(pyrrole))_3$, $N(SiH(pyrrolidine)-CH_2—SiH_2(pyrrolidine))_3$, and $N(SiH(imidazole)-CH_2—SiH_2(imidazole))_3$.

Exemplary precursors presented in formula (III) wherein m=1, $R^3$, $R^4$ and $R^5$=H include but are not limited to, $N(SiH_2—CH_2—SiNCH_2=CH)_2)_3$, $N(SiH_2—CH_2—SiH(CH_2=CH—CH_2)_2)_3$, $N(SiH_2—CH_2—SiH(NH_2)_2)_3$, $N(SiH_2—CH_2—SiH(NMe_2)_2)_3$, $N(SiH_2—CH_2—SiH(NMeEt)_2)_3$, $N(SiH_2—CH_2—SiH(NEt_2)_2)_3$, $N(SiH_2—CH_2—SiH(NnPr_2)_2)_3$, $N(SiH_2—CH_2—SiH(NiPr_2)_2)_3$, $N(SiH_2—CH_2—SiH(NBu_2)_2)_3$, $N(SiH_2—CH_2—SiH(NiBu_2)_2)_3$, $N(SiH_2—CH_2—SiH(NtBu_2)_2)_3$, $N(SiH_2—CH_2—SiH(NAm_2)_2)_3$, $N(SiH_2—CH_2—SiH(NCyPentyl_2)_2)_3$, $N(SiH_2—CH_2—SiH(Nhexyl_2)_2)_3$, $N(SiH_2—CH_2—SiH(NCyHexyl_2)_2)_3$, $N(SiH_2—CH_2—SiH(NMeH)_2)_3$, $N(SiH_2—CH_2—SiH(NEtH)_2)_3$, $N(SiH_2—CH_2—SiH(NnPrH)_2)_3$, $N(SiH_2—CH_2—SiH(NiPrH)_2)_3$, $N(SiH_2—CH_2—SiH(NBuH)_2)_3$, $N(SiH_2—CH_2—SiH(NiBuH)_2)_3$, $N(SiH_2—CH_2—SiH(NtBuH)_2)_3$, $N(SiH_2—CH_2—SiH(NAmH)_2)_3$, $N(SiH_2—CH_2—SiH(pyridine)_2)_3$, $N(SiH_2—CH_2—SiH(pyrrole)_2)_3$, $N(SiH_2—CH_2—SiH(pyrrolidine)_2)_3$, and $N(SiH_2—CH_2—SiH(imidazole)_2)_3$. These precursors may be suitable for either vapor deposition or coating applications due at least partially to the benefits discussed above for SiH bonds The terminal amino ligands may also provide improved thermal stability, as well as an additional N and/or C source for the resulting film. Finally, the listed precursors having lower molecular weights and higher vapor pressures are better suited for vapor deposition techniques, whereas those having higher molecular weights are better suited for coating techniques.

Exemplary precursors presented in formula (III) wherein m=1, $R^4$ and $R^5$=H include, but are not limited to, $N(SiH_2—CH_2—Si(CH_2=CH)_3)_3$, $N(SiH_2—CH_2—Si(CH_2=CH—CH_2)_3)_3$, $N(SiH_2—CH_2—Si(NH_2)_3)_3$, $N(SiH_2—CH_2—Si(NMe_2)_3)_3$, $N(SiH_2—CH_2—Si(NMeEt)_3)_3$, $N(SiH_2—CH_2—Si(NEt_2)_3)_3$, $N(SiH_2—CH_2—Si(NnPr_2)_3)_3$, $N(SiH_2—CH_2—Si(NiPr_2)_3)_3$, $N(SiH_2—CH_2—Si(NBu_2)_3)_3$, $N(SiH_2—CH_2—Si(NiBu_2)_3)_3$, $N(SiH_2—CH_2—Si(NtBu_2)_3)_3$, $N(SiH_2—CH_2—Si(NAm_2)_3)_3$, $N(SiH_2—CH_2—Si(NCyPentyl_2)_3)_3$, $N(SiH_2—CH_2—Si(Nhexyl_2)_3)_3$, $N(SiH_2—CH_2—Si(NCyHexyl_2)_3)_3$, $N(SiH_2—CH_2—Si(NMeH)_3)_3$, $N(SiH_2—CH_2—Si(NEtH)_3)_3$, $N(SiH_2—CH_2—Si(NnPrH)_3)_3$, $N(SiH_2—CH_2—Si(NiPrH)_3)_3$, $N(SiH_2—CH_2—Si(NBuH)_3)_3$, $N(SiH_2—CH_2—Si(NiBuH)_3)_3$, $N(SiH_2—CH_2—Si(NtBuH)_3)_3$, $N(SiH_2—CH_2—Si(NAmH)_3)_3$, $N(SiH_2—CH_2—Si(pyridine)_3)_3$, $N(SiH_2—CH_2—Si(pyrrole)_3)_3$, $N(SiH_2—CH_2—Si(pyrrolidine)_3)_3$, and $N(SiH_2—CH_2—Si(imidazole)_3)_3$. These precursors may be suitable for vapor deposition or coating applications due at least partially to the benefits discussed above for SiH bonds The terminal amino ligands may also provide improved thermal stability, as well as an additional N and/or C source for the resulting film. Finally, the listed precursors having lower molecular weights and higher vapor pressures are better suited for vapor deposition techniques, whereas those having higher molecular weights are better suited for coating techniques.

When m=2, $R^1$, $R^2$, $R^3$, $R^4$ and $R^5$=H, the disclosed carbosilazane precursor is tris(1,4-disilabutane)amine [$N(SiH_2—CH_2—CH_2—SiH_3)_3$ or NDSB3]. This liquid precursor is suitable for vapor deposition due at least partially to the benefits discussed above for SiH bonds and low molecular weight.

Exemplary precursors presented in formula (III) wherein m=2, $R^1$, $R^2$, $R^3$ and $R^4$=H include, but are not limited to, $N(SiH(CH_2=CH)—CH_2—CH_2—SiH_3)_3$, $N(SiH(CH_2=CH—CH_2)—CH_2—CH_2—SiH_3)_3$, $N(SiH(NH_2)—CH_2—CH_2—SiH_3)_3$, $N(SiH(NMe_2)-CH_2—CH_2—SiH_3)_3$, $N(SiH(NMeEt)-CH_2—CH_2—SiH_3)_3$, $N(SiH(NEt_2)-CH_2—CH_2—SiH_3)_3$, $N(SiH(NnPr_2)-CH_2—CH_2—SiH_3)_3$, $N(SiH(NiPr_2)-CH_2—CH_2—SiH_3)_3$, $N(SiH(NBu_2)-CH_2—CH_2—SiH_3)_3$, $N(SiH(NiBu_2)-CH_2—CH_2—SiH_3)_3$, $N(SiH(NtBu_2)-CH_2—CH_2—SiH_3)_3$, $N(SiH(NAm_2)-CH_2—CH_2—SiH_3)_3$, $N(SiH(NCyPentyl_2)-CH_2—CH_2—SiH_3)_3$, $N(SiH(Nhexyl_2)-CH_2—CH_2—SiH_3)_3$, $N(SiH(NCyHexyl_2)-CH_2—CH_2—SiH_3)_3$, $N(SiH(NMeH)—CH_2—CH_2—SiH_3)_3$, $N(SiH(NEtH)—CH_2—CH_2—SiH_3)_3$, $N(SiH(NnPrH)—CH_2—CH_2—SiH_3)_3$, $N(SiH(NiPrH)—CH_2—CH_2—SiH_3)_3$, $N(SiH(NBuH)—CH_2—CH_2—SiH_3)_3$, $N(SiH(NiBuH)—CH_2—CH_2—SiH_3)_3$, $N(SiH(NtBuH)—CH_2—CH_2—SiH_3)_3$, $N(SiH(NAmH)—CH_2—CH_2—SiH_3)_3$, $N(SiH(pyridine)-CH_2—CH_2—SiH_3)_3$, $N(SiH(pyrrole)-CH_2—CH_2—SiH_3)_3$, $N(SiH(pyrrolidine)-CH_2—CH_2—SiH_3)_3$, and $N(SiH(imidazole)-CH_2—CH_2—SiH_3)_3$.

Exemplary precursors presented in formula (III) wherein m=2, $R^2$, $R^3$, $R^4$ and $R^5$=H include, but are not limited to, $N(SiH_2—CH_2—CH_2—SiH_2(CH_2=CH))_3$, $N(SiH_2—CH_2—CH_2—SiH_2(CH_2=CH—CH_2))_3$, $N(SiH_2—CH_2—CH_2—SiH_2(NH_2))_3$, $N(SiH_2—CH_2—CH_2—SiH_2(NMe_2))_3$, $N(SiH_2—CH_2—CH_2—SiH_2(NMeEt))_3$, $N(SiH_2—CH_2—CH_2—SiH_2(NEt_2))_3$, $N(SiH_2—CH_2—CH_2—SiH_2(NnPr_2))_3$, $N(SiH_2—CH_2—CH_2—SiH_2(NiPr_2))_3$, $N(SiH_2—CH_2—CH_2—SiH_2(NBu_2))_3$, $N(SiH_2—CH_2—CH_2—SiH_2(NiBu_2))_3$, $N(SiH_2—CH_2—CH_2—SiH_2(NtBu_2))_3$, $N(SiH_2—CH_2—CH_2—SiH_2(NAm_2))_3$, $N(SiH_2—CH_2—CH_2—SiH_2(NCyPentyl_2))_3$, $N(SiH_2—CH_2—CH_2—SiH_2(Nhexyl_2))_3$, $N(SiH_2—CH_2—CH_2—SiH_2(NCyHexyl_2))_3$, $N(SiH_2—CH_2—CH_2—SiH_2(NMeH))_3$, $N(SiH_2—CH_2—CH_2—SiH_2(NEtH))_3$, $N(SiH_2—CH_2—CH_2—SiH_2(NnPrH))_3$, $N(SiH_2—CH_2—CH_2—SiH_2(NiPrH))_3$, $N(SiH_2—CH_2—CH_2—SiH_2(NBuH))_3$, $N(SiH_2—CH_2—CH_2—SiH_2(NiBuH))_3$, $N(SiH_2—CH_2—CH_2—SiH_2(NtBuH))_3$, $N(SiH_2—CH_2—CH_2—SiH_2(NAmH))_3$, $N(SiH_2—CH_2—CH_2—SiH_2(pyridine))_3$, $N(SiH_2—CH_2—CH_2—SiH_2(pyrrole))_3$, $N(SiH_2—CH_2—CH_2—SiH_2(pyrrolidine))_3$, and $N(SiH_2—CH_2—CH_2—SiH_2(imidazole))_3$. These precursors may be suitable for vapor deposition applications due at least partially to the benefits discussed above for SiH bonds and low molecular weight. The terminal amino ligands may also provide improved thermal stability, as discussed above, as well as an additional N and/or C source for the resulting film.

Exemplary precursors presented in formula (III) wherein m=2, $R^1$, $R^2$ and $R^3$=H include, but are not limited to, $N(Si(CH_2=CH)_2—CH_2—CH_2—SiH_3)_3$, $N(Si(CH_2=CH—CH_2)_2—CH_2—CH_2—SiH_3)_3$, $N(Si(NH_2)_2—CH_2—CH_2—SiH_3)_3$, $N(Si(NMe_2)_2-CH_2—CH_2—SiH_3)_3$, $N(Si(NMeEt)_2-CH_2—CH_2—SiH_3)_3$, $N(SiNEt_2-CH_2—CH_2—SiH_3)_3$, $N(Si(NnPr_2)_2-CH_2—CH_2—SiH_3)_3$, $N(Si(NiPr_2)_2-CH_2—CH_2—SiH_3)_3$, $N(Si(NBu_2)_2-CH_2—CH_2—SiH_3)_3$, $N(Si(NiBu_2)_2-CH_2—CH_2—SiH_3)_3$, $N(Si(NtBu_2)_2-CH_2—CH_2—SiH_3)_3$, $N(Si(NAm_2)_2-CH_2—CH_2—SiH_3)_3$, $N(Si(NCyPentyl_2)_2-CH_2—CH_2—SiH_3)_3$, $N(Si(Nhexyl_2)_2-CH_2—CH_2—SiH_3)_3$, $N(Si(NCyHexyl_2)_2-CH_2—CH_2—SiH_3)_3$, $N(Si(NMeH)_2—CH_2—CH_2—SiH_3)_3$, $N(Si(NEtH)_2—CH_2—CH_2—SiH_3)_3$, $N(Si(NnPrH)_2—CH_2—CH_2—SiH_3)_3$, $N(Si(NiPrH)_2—CH_2—CH_2—SiH_3)_3$, $N(Si(NBuH)_2—CH_2—CH_2—SiH_3)_3$, $N(Si(NiBuH)_2—CH_2—CH_2—SiH_3)_3$, $N(Si(NtBuH)_2—CH_2—CH_2—SiH_3)_3$, $N(Si(NAmH)_2—CH_2—CH_2—SiH_3)_3$, $N(Si(pyridine)_2-CH_2—CH_2—SiH_3)_3$, $N(Si(pyrrole)_2-CH_2—CH_2—SiH_3)_3$, $N(Si(pyrrolidine)_2-CH_2—CH_2—SiH_3)_3$, and $N(Si(imidazole)_2-CH_2—CH_2—SiH_3)_3$.

Exemplary precursors presented in formula (III) wherein m=2, $R^2$, $R^3$ and $R^4$=H include, but are not limited to, $N(SiH(CH_2=CH)—CH_2—CH_2—SiH_2(CH_2=CH))_3$, $N(SiH(CH_2=CH—CH_2)—CH_2—CH_2—SiH_2(CH_2=CH—CH_2))_3$, $N(SiH(NH_2)—CH_2—CH_2—SiH_2(NH_2))_3$, $N(SiH(NMe_2)-CH_2—CH_2—SiH_2(NMe_2))_3$, $N(SiH(NMeEt)-CH_2—CH_2—SiH_2(NMeEt))_3$, $N(SiH(NEt_2)-CH_2—CH_2—SiH_2(NEt_2))_3$, $N(SiH(NnPr_2)-CH_2—CH_2—SiH_2(NnPr_2))_3$, $N(SiH(NiPr_2)-CH_2—CH_2—SiH_2(NiPr_2))_3$, $N(SiH(NBu_2)-CH_2—CH_2—SiH_2(NBu_2))_3$, $N(SiH(NiBu_2)-CH_2—CH_2—SiH_2(NiBu_2))_3$, $N(SiH(NtBu_2)-CH_2—CH_2—SiH_2(NtBu_2))_3$, $N(SiH(NAm_2)-CH_2—CH_2—SiH_2(NAm_2))_3$, $N(SiH(NCyPentyl_2)-CH_2—CH_2—SiH_2(NCyPentyl_2))_3$, $N(SiH(Nhexyl_2)-CH_2—CH_2—SiH_2(Nhexyl_2))_3$, $N(SiH(NCyHexyl_2)-CH_2—CH_2—SiH_2(NCyHexyl_2))_3$, $N(SiH(NMeH)—CH_2—CH_2—SiH_2(NMeH))_3$, $N(SiH(NEtH)—CH_2—CH_2—SiH_2(NEtH))_3$, $N(SiH(NnPrH)—CH_2—CH_2—SiH_2(NnPrH))_3$, $N(SiH(NiPrH)—CH_2—CH_2—SiH_2(NiPrH))_3$, $N(SiH(NBuH)—CH_2—CH_2—SiH_2(NBuH))_3$, $N(SiH(NiBuH)—CH_2—CH_2—SiH_2(NiBuH))_3$, $N(SiH(NtBuH)—CH_2—CH_2—SiH_2(NtBuH))_3$, $N(SiH(NAmH)—CH_2—CH_2—SiH_2(NAmH))_3$, $N(SiH(pyridine)-CH_2—CH_2—SiH_2(pyridine))_3$, $N(SiH(pyrrole)-CH_2—CH_2—SiH_2(pyrrole))$_3$, N(SiH(pyrrolidine)-CH$_2$—CH$_2$—SiH$_2$(pyrrolidine))$_3$, and N(SiH(imidazole)-CH$_2$—CH$_2$—SiH$_2$(imidazole))$_3$.

Exemplary precursors presented in formula (III) wherein m=2, R$^3$, R$^4$ and R$^5$=H include, but are not limited to, N(SiH$_2$—CH$_2$—CH$_2$—SiH(CH$_2$=CH)$_2$)$_3$, N(SiH$_2$—CH$_2$—CH$_2$—SiH(CH$_2$=CH—CH$_2$)$_2$)$_3$, N(SiH$_2$-CH$_2$—CH$_2$—SiH(NH$_2$)$_2$)$_3$, N(SiH$_2$—CH$_2$—CH$_2$—SiH(NMe$_2$)$_2$)$_3$, N(SiH$_2$—CH$_2$—CH$_2$—SiH(NMeEt)$_2$)$_3$, N(SiH$_2$—CH$_2$—CH$_2$—SiH(NEt$_2$)$_2$)$_3$, N(SiH$_2$—CH$_2$—CH$_2$—SiH(NnPr$_2$)$_2$)$_3$, N(SiH$_2$-CH$_2$—CH$_2$—SiH(NiPr$_2$)$_2$)$_3$, N(SiH$_2$—CH$_2$—CH$_2$—SiH(NBu$_2$)$_2$)$_3$, N(SiH$_2$—CH$_2$—CH$_2$—SiH(NiBu$_2$)$_2$)$_3$, N(SiH$_2$—CH$_2$—CH$_2$—SiH(NtBu$_2$)$_2$)$_3$, N(SiH$_2$—CH$_2$—CH$_2$—SiH(NAm$_2$)$_2$)$_3$, N(SiH$_2$-CH$_2$—CH$_2$—SiH(NCyPentyl$_2$)$_2$)$_3$, N(SiH$_2$—CH$_2$—CH$_2$—SiH(Nhexyl$_2$)$_2$)$_3$, N(SiH$_2$—CH$_2$—CH$_2$—SiH (NCyHexyl$_2$)$_2$)$_3$, N(SiH$_2$—CH$_2$—CH$_2$—SiH(NMeH)$_2$)$_3$, N(SiH$_2$—CH$_2$—CH$_2$—SiH(NEtH)$_2$)$_3$, N(SiH$_2$—CH$_2$—CH$_2$—SiH(NnPrH)$_2$)$_3$, N(SiH$_2$—CH$_2$—CH$_2$—SiH(NiPrH)$_2$)$_3$, N(SiH$_2$—CH$_2$—CH$_2$—SiH(NBuH)$_2$)$_3$, N(SiH$_2$—CH$_2$—CH$_2$—SiH(NiBuH)$_2$)$_3$, N(SiH$_2$—CH$_2$—CH$_2$—SiH(NtBuH)$_2$)$_3$, N(SiH$_2$—CH$_2$—CH$_2$—SiH (NAmH)$_2$)$_3$, N(SiH$_2$—CH$_2$—CH$_2$—SiH(pyridine)$_2$)$_3$, N(SiH$_2$—CH$_2$—CH$_2$—SiH(pyrrole)$_2$)$_3$, N(SiH$_2$—CH$_2$—CH$_2$—SiH(pyrrolidine)$_2$)$_3$, and N(SiH$_2$—CH$_2$—CH$_2$—SiH (imidazole)$_2$)$_3$. These precursors may be suitable for vapor deposition or coating applications due at least partially to the benefits discussed above for SiH bonds The terminal amino ligands may also provide improved thermal stability, as discussed above, as well as an additional N and/or C source for the resulting film. Finally, the listed precursors having lower molecular weights and higher vapor pressures are better suited for vapor deposition techniques, whereas those having higher molecular weights are better suited for coating techniques.

Exemplary precursors presented in formula (W) wherein m=2, R$^4$ and R$^5$=H include, but are not limited to, N(SiH$_2$—CH$_2$—CH$_2$—Si(CH$_2$=CH)$_3$)$_3$, N(SiH$_2$—CH$_2$—CH$_2$—Si(CH$_2$=CH—CH$_2$)$_3$)$_3$, N(SiH$_2$—CH$_2$—CH$_2$—Si(NH$_2$)$_3$)$_3$, N(SiH$_2$—CH$_2$—CH$_2$—Si(NMe$_2$)$_3$)$_3$, N(SiH$_2$—CH$_2$—CH$_2$—Si(NMeEt)$_3$)$_3$, N(SiH$_2$—CH$_2$—CH$_2$—Si(NEt$_2$)$_3$)$_3$, N(SiH$_2$—CH$_2$—CH$_2$—Si(NnPr$_2$)$_3$)$_3$, N(SiH$_2$—CH$_2$—CH$_2$—Si(NiPr$_2$)$_3$)$_3$, N(SiH$_2$—CH$_2$—CH$_2$—Si(NBu$_2$)$_3$)$_3$, N(SiH$_2$—CH$_2$—CH$_2$—Si(NiBu$_2$)$_3$)$_3$, N(SiH$_2$—CH$_2$—CH$_2$—Si(NtBu$_2$)$_3$)$_3$, N(SiH$_2$—CH$_2$—CH$_2$—Si(NAm$_2$)$_3$)$_3$, N(SiH$_2$—CH$_2$—CH$_2$—Si(NCyPentyl$_2$)$_3$)$_3$, N(SiH$_2$—CH$_2$—CH$_2$—Si(Nhexyl$_2$)$_3$)$_3$, N(SiH$_2$—CH$_2$—CH$_2$—Si (NCyHexyl$_2$)$_3$)$_3$, N(SiH$_2$—CH$_2$—CH$_2$—Si(NMeH)$_3$)$_3$, N(SiH$_2$—CH$_2$—CH$_2$—Si(NEtH)$_3$)$_3$, N(SiH$_2$—CH$_2$—CH$_2$—Si(NnPrH)$_3$)$_3$, N(SiH$_2$—CH$_2$—CH$_2$—Si(NiPrH)$_3$)$_3$, N(SiH$_2$—CH$_2$—CH$_2$—Si(NBuH)$_3$)$_3$, N(SiH$_2$—CH$_2$—CH$_2$—Si(NiBuH)$_3$)$_3$, N(SiH$_2$—CH$_2$—CH$_2$—Si(NtBuH)$_3$)$_3$, N(SiH$_2$—CH$_2$—CH$_2$—Si(NAmH)$_3$)$_3$, N(SiH$_2$—CH$_2$—CH$_2$—Si(pyridine)$_3$)$_3$, N(SiH$_2$—CH$_2$—CH$_2$—Si(pyrrole)$_3$)$_3$, N(SiH$_2$—CH$_2$—CH$_2$—Si(pyrrolidine)$_3$)$_3$, and N(SiH$_2$—CH$_2$—CH$_2$—Si(imidazole)$_3$)$_3$. These precursors are suitable for coating applications due at least partially to the benefits discussed above for SiH bonds The terminal amino ligands may also provide an additional N and/or C source for the resulting film.

When a=1, the disclosed carbosilazane precursor presented in formula (I) has the following formula:

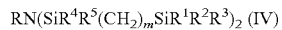

RN(SiR$^4$R$^5$(CH$_2$)$_m$SiR$^1$R$^2$R$^3$)$_2$ (IV)

When m=1 and R, R$^1$, R$^2$, R$^3$, R$^4$ and R$^5$=H, the disclosed precursor presented in formula (IV) is bis(1,3-disilapropane) amine [HN(SiH$_2$—CH$_2$—SiH$_3$)$_2$ or NDSP2]. NDSP2 is volatile and contains many Si—H bonds, making it more reactive to the substrate surface. As a result, this precursor is suitable for vapor deposition processes and, more particularly, for ALD processes. Applicants believe that this precursor may even be sufficiently reactive to attach to Si—Cl terminated or even Si terminated substrate surfaces in PEALD processes using N$_2$.

When m=1; R$^1$, R$^2$, R$^3$, R$^4$ and R$^5$=H; and R=Si$_x$H$_{2x+1}$, with x=1 to 4, the disclosed carbosilazane precursors presented in formula (IV) are SiH$_3$N(SiH$_2$—CH$_2$—SiH$_3$)$_2$, Si$_2$H$_5$N(SiH$_2$—CH$_2$—SiH$_3$)$_2$, Si$_3$H$_7$N(SiH$_2$—CH$_2$—SiH$_3$)$_2$, and Si$_4$H$_9$N(SiH$_2$—CH$_2$—SiH$_3$)$_2$. These precursors may be suitable for vapor deposition applications due at least partially to the benefits discussed above for SiH bonds The additional N—Si bond makes these precursors more stable than those having a N—H bond, but more reactive than those having a N—C bond. As a result, these precursors may be desirable when moderate conditions are required for polymerization. The carbon-free Si$_x$H$_{2x+1}$ may also result in more Si in the resulting film than the corresponding molecules in which R=H or an alkyl group.

When m=1; R$^1$, R$^2$, R$^3$, R$^4$ and R$^5$=H; and R=SiH$_z$(C$_y$H$_{2y+1}$)$_{3-z}$, with y=1 to 6, z=0 to 2, the disclosed carbosilazane precursor presented in formula (IV) include, but are not limited to, (SiMe$_3$)N(SiH$_2$—CH$_2$—SiH$_3$)$_2$, (SiEt$_3$)N(SiH$_2$—CH$_2$—SiH$_3$)$_2$, Si(iPr)$_3$N(SiH$_2$—CH$_2$—SiH$_3$)$_2$, Si(nPr)$_3$N(SiH$_2$—CH$_2$—SiH$_3$)$_2$, Si(Bu)$_3$N(SiH$_2$—CH$_2$—SiH$_3$)$_2$, Si(iBu)$_3$N(SiH$_2$—CH$_2$—SiH$_3$)$_2$, Si(tBu)$_3$N(SiH$_2$—CH$_2$—SiH$_3$)$_2$, Si(amyl)$_3$N(SiH$_2$—CH$_2$—SiH$_3$)$_2$, Si(hexyl)$_3$N(SiH$_2$—CH$_2$—SiH$_3$)$_2$, (SiHMe$_2$)N(SiH$_2$—CH$_2$—SiH$_3$)$_2$, (SiHEt$_2$)N(SiH$_2$—CH$_2$—SiH$_3$)$_2$, SiH(iPr)$_2$N(SiH$_2$—CH$_2$—SiH$_3$)$_2$, SiH(nPr)$_2$N(SiH$_2$—CH$_2$—SiH$_3$)$_2$, SiH(Bu)$_2$N(SiH$_2$—CH$_2$—SiH$_3$)$_2$, SiH(iBu)$_2$N(SiH$_2$—CH$_2$—SiH$_3$)$_2$, SiH(tBu)$_2$N(SiH$_2$—CH$_2$—SiH$_3$)$_2$, SiH(amyl)$_2$N(SiH$_2$—CH$_2$—SiH$_3$)$_2$, SiH(hexyl)$_2$N(SiH$_2$—CH$_2$—SiH$_3$)$_2$, (SiH$_2$Me)N(SiH$_2$—CH$_2$—SiH$_3$)$_2$, (SiH$_2$Et)N(SiH$_2$—CH$_2$—SiH$_3$)$_2$, SiH$_2$(iPr)N(SiH$_2$—CH$_2$—SiH$_3$)$_2$, SiH$_2$(nPr)N(SiH$_2$—CH$_2$—SiH$_3$)$_2$, SiH$_2$(Bu)N(SiH$_2$—CH$_2$—SiH$_3$)$_2$, SiH$_2$(iBu)N(SiH$_2$—CH$_2$—SiH$_3$)$_2$, SiH$_2$(tBu)N(SiH$_2$—CH$_2$—SiH$_3$)$_2$, SiH$_2$(amyl)N(SiH$_2$—CH$_2$—SiH$_3$)$_2$, and SiH$_2$(hexyl)N(SiH$_2$—CH$_2$—SiH$_3$)$_2$. The additional N—Si bond makes these precursors more stable than those having a N—H bond, but more reactive than those having a N—C bond. As a result, these precursors may be desirable when moderate conditions are required for polymerization. The length of the carbon chain may be selected to provide the desired amount of carbon in the film. Finally, the listed precursors having lower molecular weights and higher vapor pressures are better suited for vapor deposition techniques, whereas those having higher molecular weights are better suited for coating techniques.

When m=1; R$^1$, R$^2$, R$^3$, R$^4$ and R$^5$=H; and R=a R$^{1'}$R$^{2'}$R$^{3'}$Si(CH$_2$)$_b$SiR$^{4'}$R$^{5'}$ group with b=1 to 2 and R$^{1'}$, R$^{2'}$, R$^{3'}$, R$^{4'}$, and R$^{5'}$ independently H or a C$_1$-C$_6$ hydrocarbon group, the disclosed carbosilazane precursors presented in formula (IV) include, but are not limited to (SiH$_3$—CH$_2$—CH$_2$—SiH$_2$)N(SiH$_2$—CH$_2$—SiH$_3$)$_2$, (SiMe$_3$-CH$_2$—SiMe$_2$)N(SiH$_2$—CH$_2$—SiH$_3$)$_2$, (SiMe$_3$-CH$_2$—CH$_2$—SiMe$_2$)N(SiH$_2$—CH$_2$—SiH$_3$)$_2$, (SiEt$_3$-CH$_2$—SiEt$_2$)N(SiH$_2$—CH$_2$—SiH$_3$)$_2$, or (SiEt$_3$-CH$_2$—CH$_2$—SiEt$_2$)N(SiH$_2$—CH$_2$—SiH$_3$)$_2$.

When m=1; R$^1$, R$^2$, R$^3$, R$^4$ and R$^5$=H; and R=C$_y$H$_{2y+1}$, with y=1 to 6, the disclosed carbosilazane precursors presented in formula (IV) include (Me)N(SiH$_2$—CH$_2$—SiH$_3$)$_2$, (Et)N(SiH$_2$—CH$_2$—SiH$_3$)$_2$, (nPr)N(SiH$_2$—CH$_2$—SiH$_3$)$_2$, (iPr)N(SiH$_2$—CH$_2$—SiH$_3$)$_2$, (Bu)N(SiH$_2$—CH$_2$—SiH$_3$)$_2$, (iBu)N(SiH$_2$—CH$_2$—SiH$_3$)$_2$, (tBu)N(SiH$_2$—CH$_2$—SiH$_3$)$_2$, (amyl)N(SiH$_2$—CH$_2$—SiH$_3$)$_2$, and (hexyl)N(SiH$_2$—CH$_2$—

SiH$_3$)$_2$. This family of compounds may be useful for vapor deposition of films having carbon content, such as SiOC or SiNC, because the Si—C bond (for Si—R) is not highly reactive and is likely to remain intact during the deposition process. As a result, to prevent deposition of too much C, y is preferably 1 to 3. These precursors are also easier to synthesize than the DSP3 analogs because the RNHR$_2$ reactant is a liquid for Et, Pr, Bu, Pentyl, and Hexyl.

When m=1; R$^1$, R$^2$, R$^3$, R$^4$ and R$^5$=H; and R=C$_x$H$_{2x-y}$, with x=2 to 6, y=0 for x=2-6 or y=2 for x=3-6 or y=4 for x=4-6 the disclosed carbosilazane precursors presented in formula (IV) include (Vinyl)N(SiH$_2$—CH$_2$—SiH$_3$)$_2$, (Allyl)N(SiH$_2$—CH$_2$—SiH$_3$)$_2$, (propadiene)N(SiH$_2$—CH$_2$—SiH$_3$)$_2$, (butene)N(SiH$_2$—CH$_2$—SiH$_3$)$_2$, (butadiene)N(SiH$_2$—CH$_2$—SiH$_3$)$_2$, (butatriene)N(SiH$_2$—CH$_2$—SiH$_3$)$_2$, or (hexadiene)N(SiH$_2$—CH$_2$—SiH$_3$)$_2$. This family of compounds may be also useful for vapor deposition of films having carbon content. Additionally, the unsaturated hydrocarbon provides cross-linking opportunities between the chemi- or physio-sorbed precursors.

When m=1; R$^1$, R$^2$, R$^3$, R$^4$ and R$^5$=H; and R=SiH$_x$(NR'R'')$_{3-x}$ with x=1 or 2 and R' and R'' independently Me, Et, iPr, or nPr, the disclosed carbosilazane precursors presented in formula (IV) include, but are not limited to, (SiH$_2$NMe$_2$)N(SiH$_2$—CH$_2$—SiH$_3$)$_2$, (SiH$_2$NEt$_2$)N(SiH$_2$—CH$_2$—SiH$_3$)$_2$, (SiH$_2$NiPr$_2$)N(SiH$_2$—CH$_2$—SiH$_3$)$_2$, (SiH$_2$NnPr$_2$)N(SiH$_2$—CH$_2$—SiH$_3$)$_2$, (SiH$_2$NMeEt)N(SiH$_2$—CH$_2$—SiH$_3$)$_2$, (SiH(NMe$_2$)$_2$)N(SiH$_2$—CH$_2$—SiH$_3$)$_2$, and SiH(NEt$_2$)$_2$)N(SiH$_2$—CH$_2$—SiH$_3$)$_2$.

Exemplary carbosilazane precursors presented in formula (IV) wherein m=1; R$^1$, R$^2$, R$^3$ and R$^4$=H; and R=H, C$_u$H$_{2u+1}$, or Si$_v$H$_{2v-1}$, with u=1-6 and v=1-4, include, but are not limited to, RN(SiH(CH$_2$═CH))—CH$_2$—SiH$_3$)$_2$, RN(SiH(CH$_2$═CH—CH$_2$))—CH$_2$—SiH$_3$)$_2$, RN(SiH(NH$_2$)—CH$_2$—SiH$_3$)$_2$, RN(SiH(NMe$_2$)-CH$_2$—SiH$_3$)$_2$, RN(SiH(NMeEt)-CH$_2$—SiH$_3$)$_2$, RN(SiH(NEt$_2$)-CH$_2$—SiH$_3$)$_2$, RN(SiH(NnPr$_2$)-CH$_2$—SiH$_3$)$_2$, RN(SiH(NiPr$_2$)-CH$_2$—SiH$_3$)$_2$, RN(SiH(NBu$_2$)-CH$_2$—SiH$_3$)$_2$, RN(SiH(NiBu$_2$)-CH$_2$—SiH$_3$)$_2$, RN(SiH(NtBu$_2$)-CH$_2$—SiH$_3$)$_2$, RN(SiH(NAm$_2$)-CH$_2$—SiH$_3$)$_2$, RN(SiH(NCyPentyl$_2$)-CH$_2$—SiH$_3$)$_2$, RN(SiH(Nhexyl$_2$)-CH$_2$—SiH$_3$)$_2$, RN(SiH(NCyHexyl$_2$)-CH$_2$—SiH$_3$)$_2$, RN(SiH(NMeH)—CH$_2$—SiH$_3$)$_2$, RN(SiH(NEtH)—CH$_2$—SiH$_3$)$_2$, RN(SiH(NnPrH)—CH$_2$—SiH$_3$)$_2$, RN(SiH(NiPrH)—CH$_2$—SiH$_3$)$_2$, RN(SiH(NBuH)—CH$_2$—SiH$_3$)$_2$, RN(SiH(NiBuH)—CH$_2$—SiH$_3$)$_2$, RN(SiH(NtBuH)—CH$_2$—SiH$_3$)$_2$, RN(SiH(NAmH)—CH$_2$—SiH$_3$)$_2$, RN(SiH(pyridine)-CH$_2$—SiH$_3$)$_2$, RN(SiH(pyrrole)-CH$_2$—SiH$_3$)$_2$, RN(SiH(pyrrolidine)-CH$_2$—SiH$_3$)$_2$, and RN(SiH(imidazole)-CH$_2$—SiH$_3$)$_2$.

Exemplary carbosilazane precursors presented in formula (IV) wherein m=1; R$^2$, R$^3$, R$^4$ and R$^5$=H; and R=H, C$_u$H$_{2u+1}$, or SivH$_{2v-1}$, with u=1-6 and v=1-4, include, but are not limited to, RN(SiH$_2$—CH$_2$—SiH$_2$(CH$_2$═CH))$_2$, RN(SiH$_2$—CH$_2$—SiH$_2$(CH$_2$═CH—CH$_2$))$_2$, RN(SiH$_2$—CH$_2$—SiH$_2$(NH$_2$))$_2$, RN(SiH$_2$—CH$_2$—SiH$_2$(NMe$_2$))$_2$, RN(SiH$_2$—CH$_2$—SiH$_2$(NMeEt))$_2$, RN(SiH$_2$—CH$_2$—SiH$_2$(NEt$_2$))$_2$, RN(SiH$_2$—CH$_2$—SiH$_2$(NnPr$_2$))$_2$, RN(SiH$_2$—CH$_2$—SiH$_2$(NiPr$_2$))$_2$, RN(SiH$_2$—CH$_2$—SiH$_2$(NBu$_2$))$_2$, RN(SiH$_2$—CH$_2$—SiH$_2$(NiBu$_2$))$_2$, RN(SiH$_2$—CH$_2$—SiH$_2$(NtBu$_2$))$_2$, RN(SiH$_2$—CH$_2$—SiH$_2$(NAm$_2$))$_2$, RN(SiH$_2$—CH$_2$—SiH$_2$(NCyPentyl$_2$))$_2$, RN(SiH$_2$—CH$_2$—SiH$_2$(Nhexyl$_2$))$_2$, RN(SiH$_2$—CH$_2$—SiH$_2$(NCyHexyl$_2$))$_2$, RN(SiH$_2$—CH$_2$—SiH$_2$(NMeH))$_2$, RN(SiH$_2$—CH$_2$—SiH$_2$(NEtH))$_2$, RN(SiH$_2$—CH$_2$—SiH$_2$(NnPrH))$_2$, RN(SiH$_2$—CH$_2$—SiH$_2$(NiPrH))$_2$, RN(SiH$_2$—CH$_2$—SiH$_2$(NBuH))$_2$, RN(SiH$_2$—CH$_2$—SiH$_2$(NiBuH))$_2$, RN(SiH$_2$—CH$_2$—SiH$_2$(NtBuH))$_2$, RN(SiH$_2$—CH$_2$—SiH$_2$(NAmH))$_2$, RN(SiH$_2$—CH$_2$—SiH$_2$(pyridine))$_2$, RN(SiH$_2$—CH$_2$—SiH$_2$(pyrrole))$_2$, RN(SiH$_2$—CH$_2$—SiH$_2$(pyrrolidine))$_2$, and RN(SiH$_2$—CH$_2$—SiH$_2$(imidazole))$_2$. These precursors may be suitable for vapor deposition or coating applications due at least partially to the benefits discussed above for SiH bonds The terminal amino ligands may also provide improved thermal stability, as discussed above, as well as an additional N and/or C source for the resulting film. Finally, the listed precursors having lower molecular weights and higher vapor pressures are better suited for vapor deposition techniques, whereas those having higher molecular weights are better suited for coating techniques.

Exemplary carbosilazane precursors presented in formula (IV) wherein m=1; R$^1$, R$^2$ and R$^3$=H; and R=H, C$_u$H$_{2u+1}$, or SivH$_{2v-1}$, with u=1-6 and v=1-4, include, but are not limted to, RN(Si(CH$_2$═CH)$_2$—CH$_2$—SiH$_3$)$_2$, RN(Si(CH$_2$═CH—CH$_2$)$_2$—CH$_2$—SiH$_3$)$_2$, RN(Si(NH$_2$)$_2$—CH$_2$—SiH$_3$)$_2$, RN(Si(NMe$_2$)$_2$-CH$_2$—SiH$_3$)$_2$, RN(Si(NMeEt)$_2$-CH$_2$—SiH$_3$)$_2$, RN(SiNEt$_2$-CH$_2$—SiH$_3$)$_2$, RN(Si(NnPr$_2$)$_2$-CH$_2$—SiH$_3$)$_2$, RN(Si(NiPr$_2$)$_2$-CH$_2$—SiH$_3$)$_2$, RN(Si(NBu$_2$)$_2$-CH$_2$—SiH$_3$)$_2$, RN(Si(NiBu$_2$)$_2$-CH$_2$—SiH$_3$)$_2$, RN(Si(NtBu$_2$)$_2$-CH$_2$—SiH$_3$)$_2$, RN(Si(NAm$_2$)$_2$-CH$_2$—SiH$_3$)$_2$, RN(Si(NCyPentyl$_2$)$_2$-CH$_2$—SiH$_3$)$_2$, RN(Si(Nhexyl$_2$)$_2$-CH$_2$—SiH$_3$)$_2$, RN(Si(NCyHexyl$_2$)$_2$-CH$_2$—SiH$_3$)$_2$, RN(Si(NMeH)$_2$—CH$_2$—SiH$_3$)$_2$, RN(Si(NEtH)$_2$—CH$_2$—SiH$_3$)$_2$, RN(Si(NnPrH)$_2$—CH$_2$—SiH$_3$)$_2$, RN(Si(NiPrH)$_2$—CH$_2$—SiH$_3$)$_2$, RN(Si(NBuH)$_2$—CH$_2$—SiH$_3$)$_2$, RN(Si(NiBuH)$_2$—CH$_2$—SiH$_3$)$_2$, RN(Si(NtBuH)$_2$—CH$_2$—SiH$_3$)$_2$, RN(Si(NAmH)$_2$—CH$_2$—SiH$_3$)$_2$, RN(Si(pyridine)$_2$-CH$_2$—SiH$_3$)$_2$, RN(Si(pyrrole)$_2$-CH$_2$—SiH$_3$)$_2$, RN(Si(pyrrolidine)$_2$-CH$_2$—SiH$_3$)$_2$, and RN(Si(imidazole)$_2$-CH$_2$—SiH$_3$)$_2$.

Exemplary carbosilazane precursors presented in formula (IV) wherein m=1; R$^2$, R$^3$ and R$^4$=H; and R=H, C$_u$H$_{2u+1}$, or SivH$_{2v-1}$, with u=1-6 and v=1-4, include RN(SiH(CH$_2$═CH)—CH$_2$—SiH$_2$(CH$_2$═CH))$_2$, RN(SiH(CH$_2$═CH—CH$_2$)—CH$_2$—SiH$_2$(CH$_2$═CH—CH$_2$))$_2$, RN(SiH(NH$_2$)—CH$_2$—SiH$_2$(NH$_2$))$_2$, RN(SiH(NMe$_2$)-CH$_2$—SiH$_2$(NMe$_2$))$_2$, RN(SiH(NMeEt)-CH$_2$—SiH$_2$(NMeEt))$_2$, RN(SiH(NEt$_2$)-CH$_2$—SiH$_2$(NEt$_2$))$_2$, RN(SiH(NnPr$_2$)-CH$_2$—SiH$_2$(NnPr$_2$))$_2$, RN(SiH(NiPr$_2$)-CH$_2$—SiH$_2$(NiPr$_2$))$_2$, RN(SiH(NBu$_2$)-CH$_2$—SiH$_2$(NBu$_2$))$_2$, RN(SiH(NiBu$_2$)-CH$_2$—SiH$_2$(NiBu$_2$))$_2$, RN(SiH(NtBu$_2$)-CH$_2$—SiH$_2$(NtBu$_2$))$_2$, RN(SiH(NAm$_2$)-CH$_2$—SiH$_2$(NAm$_2$))$_2$, RN(SiH(NCyPentyl$_2$)-CH$_2$—SiH$_2$(NCyPentyl$_2$))$_2$, RN(SiH(Nhexyl$_2$)-CH$_2$—SiH$_2$(Nhexyl$_2$))$_2$, RN(SiH(NCyHexyl$_2$)-CH$_2$—SiH$_2$(NCyHexyl$_2$))$_2$, RN(SiH(NMeH)—CH$_2$—SiH$_2$(NMeH))$_2$, RN(SiH(NEtH)—CH$_2$—SiH$_2$(NEtH))$_2$, RN(SiH(NnPrH)—CH$_2$—SiH$_2$(NnPrH))$_2$, RN(SiH(NiPrH)—CH$_2$—SiH$_2$(NiPrH))$_2$, RN(SiH(NBuH)—CH$_2$—SiH$_2$(NBuH))$_2$, RN(SiH(NiBuH)—CH$_2$—SiH$_2$(NiBuH))$_2$, RN(SiH(NtBuH)—CH$_2$—SiH$_2$(NtBuH))$_2$, RN(SiH(NAmH)—CH$_2$—SiH$_2$(NAmH))$_2$, RN(SiH(pyridine)-CH$_2$—SiH$_2$(pyridine))$_2$, RN(SiH(pyrrole)-CH$_2$—SiH$_2$(pyrrole))$_2$, RN(SiH(pyrrolidine)-CH$_2$—SiH$_2$(pyrrolidine))$_2$, and RN(SiH(imidazole)-CH$_2$—SiH$_2$(imidazole))$_2$.

Exemplary carbosilazane precursors presented in formula (IV) wherein m=1; R$^3$, R$^4$ and R$^5$=H; R=H, C$_u$H$_{2u+1}$, or SivH$_{2v-1}$, with u=1-6 and v=1-4, include, but are not limited to, RN(SiH$_2$—CH$_2$—SiH(CH$_2$═CH)$_2$)$_2$, RN(SiH$_2$—CH$_2$—SiH(CH$_2$═CH—CH$_2$)$_2$)$_2$, RN(SiH$_2$—CH$_2$—SiH(NH$_2$)$_2$)$_2$, RN(SiH$_2$—CH$_2$—SiH(NMe$_2$)$_2$)$_2$, RN(SiH$_2$—CH$_2$—SiH(NMeEt)$_2$)$_2$, RN(SiH$_2$—CH$_2$—SiH(NEt$_2$)$_2$)$_2$, RN(SiH$_2$—CH$_2$—SiH(NnPr$_2$)$_2$)$_2$, RN(SiH$_2$—CH$_2$—SiH(NiPr$_2$)$_2$)$_2$, RN(SiH$_2$—CH$_2$—SiH(NBu$_2$)$_2$)$_2$, RN(SiH$_2$—CH$_2$—SiH(NiBu$_2$)$_2$)$_2$, RN(SiH$_2$—CH$_2$—SiH(NtBu$_2$)$_2$)$_2$, RN(SiH$_2$—CH$_2$—SiH(NAm$_2$)$_2$)$_2$, RN(SiH$_2$—CH$_2$—SiH(NCyPentyl$_2$)$_2$)$_2$, RN(SiH$_2$—CH$_2$—SiH(Nhexyl$_2$)$_2$)$_2$, RN(SiH$_2$—CH$_2$—SiH(NCyHexyl$_2$)$_2$)$_2$, RN(SiH$_2$—CH$_2$—SiH(NMeH)$_2$)$_2$, RN(SiH$_2$—CH$_2$—SiH(NEtH)$_2$)$_2$, RN(SiH$_2$—CH$_2$—SiH(NnPrH)$_2$)$_2$, RN(SiH$_2$—CH$_2$—SiH(NiPrH)$_2$)$_2$, RN(SiH$_2$—CH$_2$—SiH(NBuH)$_2$)$_2$, RN(SiH$_2$—CH$_2$—SiH(NiBuH)$_2$)$_2$, RN(SiH$_2$—CH$_2$—SiH(NtBuH)$_2$)$_2$, RN(SiH$_2$—CH$_2$—SiH(NAmH)$_2$)$_2$, RN(SiH$_2$—CH$_2$—SiH(pyridine)$_2$)$_2$, RN(SiH$_2$—CH$_2$—SiH(pyrrole)$_2$)$_2$, RN(SiH$_2$—CH$_2$—SiH(pyrrolidine)$_2$)$_2$, and RN(SiH$_2$—CH$_2$—SiH(imidazole)$_2$)$_2$. These precursors are suitable for vapor deposition or coating applications due at least partially to the benefits discussed above for SiH bonds The terminal amino ligands may also provide improved thermal stability, as discussed above, as well as an additional N and/or C source for the resulting film. Finally, the listed precursors having lower molecular weights and higher vapor pressures are better suited for vapor deposition techniques, whereas those having higher molecular weights are better suited for coating techniques.

Exemplary carbosilazane precursors presented in formula (IV) wherein m=1; R$^4$ and R$^5$=H; and R=H, C$_u$H$_{2u+1}$, or SivH$_{2v-1}$, with u=1-6 and v=1-4, include, but are not limited to, RN(SiH$_2$—CH$_2$—Si(CH$_2$=CH)$_3$)$_2$, RN(SiH$_2$—CH$_2$—Si(CH$_2$=CH—CH$_2$)$_3$)$_2$, RN(SiH$_2$—CH$_2$—Si(NH$_2$)$_3$)$_2$, RN(SiH$_2$—CH$_2$—Si(NMe$_2$)$_3$)$_2$, RN(SiH$_2$—CH$_2$—Si(NMeEt)$_3$)$_2$, RN(SiH$_2$—CH$_2$—Si(NEt$_2$)$_3$)$_2$, RN(SiH$_2$—CH$_2$—Si(NnPr$_2$)$_3$)$_2$, RN(SiH$_2$—CH$_2$—Si(NiPr$_2$)$_3$)$_2$, RN(SiH$_2$—CH$_2$—Si(NBu$_2$)$_3$)$_2$, RN(SiH$_2$—CH$_2$—Si(NiBu$_2$)$_3$)$_2$, RN(SiH$_2$—CH$_2$—Si(NtBu$_2$)$_3$)$_2$, RN(SiH$_2$—CH$_2$—Si(NAm$_2$)$_3$)$_2$, RN(SiH$_2$—CH$_2$—Si(NCyPentyl$_2$)$_3$)$_2$, RN(SiH$_2$—CH$_2$—Si(Nhexyl$_2$)$_3$)$_2$, RN(SiH$_2$—CH$_2$—Si(NCyHexyl$_2$)$_3$)$_2$, RN(SiH$_2$—CH$_2$—Si(NMeH)$_3$)$_2$, RN(SiH$_2$—CH$_2$—Si(NEtH)$_3$)$_2$, RN(SiH$_2$—CH$_2$—Si(NnPrH)$_3$)$_2$, RN(SiH$_2$—CH$_2$—Si(NiPrH)$_3$)$_2$, RN(SiH$_2$—CH$_2$—Si(NBuH)$_3$)$_2$, RN(SiH$_2$—CH$_2$—Si(NiBuH)$_3$)$_2$, RN(SiH$_2$—CH$_2$—Si(NtBuH)$_3$)$_2$, RN(SiH$_2$—CH$_2$—Si(NAmH)$_3$)$_2$, RN(SiH$_2$—CH$_2$—Si(pyridine)$_3$)$_2$, RN(SiH$_2$—CH$_2$—Si(pyrrole)$_3$)$_2$, RN(SiH$_2$—CH$_2$—Si(pyrrolidine)$_3$)$_2$, and RN(SiH$_2$—CH$_2$—Si(imidazole)$_3$)$_2$. These precursors may be suitable vapor deposition or coating applications due at least partially to the benefits discussed above for SiH bonds The terminal amino ligands may also provide improved thermal stability, as discussed above, as well as an additional N and/or C source for the resulting film. Finally, the listed precursors having lower molecular weights and higher vapor pressures are better suited for vapor deposition techniques, whereas those having higher molecular weights are better suited for coating techniques.

When m=2 and R, R$^1$, R$^2$, R$^3$, R$^4$ and R$^5$=H, the disclosed carbosilazane precursor is HN(SiH$_2$—CH$_2$—CH$_2$—SiH$_3$)$_2$ (HNDSB2). HNDSB2 is volatile and contains many Si—H bonds, making it more reactive to the substrate surface. As a result, this precursor may be suitable for vapor deposition processes and, more particularly, for ALD processes. Applicants believe that this precursor may even be sufficiently reactive to attach to Si—Cl terminated or even Si terminated substrate surfaces in PEALD processes using N$_2$.

When m=2; R$^1$, R$^2$, R$^3$, R$^4$ and R$^5$=H; and R=Si$_x$H$_{2x+1}$, with x=1 to 4, the disclosed carbosilazane precursors presented in formula (IV) are SiH$_3$N(SiH$_2$—CH$_2$—CH$_2$—SiH$_3$)$_2$, Si$_2$H$_5$N(SiH$_2$—CH$_2$—CH$_2$—SiH$_3$)$_2$, Si$_3$H$_7$N(SiH$_2$—CH$_2$—CH$_2$—SiH$_3$)$_2$, and Si$_4$H$_9$N(SiH$_2$—CH$_2$—CH$_2$—SiH$_3$)$_2$. These precursors may be suitable for vapor deposition applications due at least partially to the benefits discussed above for SiH bonds. The additional N—Si bond makes these precursors more stable than those having a N—H bond, but more reactive than those having a N—C bond. As a result, these precursors may be desirable when moderate conditions are required for polymerization. The carbon-free Si$_x$H$_{2x+1}$ may also result in more Si in the resulting film than the corresponding molecules in which R=H or an alkyl group.

When m=2; R$^1$, R$^2$, R$^3$, R$^4$ and R$^5$=H; and R=SiH$_z$(C$_y$H$_{2y+1}$)$_{3-z}$, with y=1 to 6, z=0 to 2, the disclosed carbosilazane precursor presented in formula (IV) include, but are not limited to (SiMe$_3$)N(SiH$_2$—CH$_2$—CH$_2$—SiH$_3$)$_2$, (SiEt$_3$)N(SiH$_2$—CH$_2$—CH$_2$—SiH$_3$)$_2$, Si(iPr)$_3$N(SiH$_2$—CH$_2$—CH$_2$—SiH$_3$)$_2$, Si(nPr)$_3$N(SiH$_2$—CH$_2$—CH$_2$—SiH$_3$)$_2$, Si(Bu)$_3$N(SiH$_2$—CH$_2$—CH$_2$—SiH$_3$)$_2$, Si(iBu)$_3$N(SiH$_2$—CH$_2$—CH$_2$—SiH$_3$)$_2$, Si(tBu)$_3$N(SiH$_2$—CH$_2$—CH$_2$—SiH$_3$)$_2$, Si(amyl)$_3$N(SiH$_2$—CH$_2$—CH$_2$—SiH$_3$)$_2$, Si(hexyl)$_3$N(SiH$_2$—CH$_2$—CH$_2$—SiH$_3$)$_2$, (SiHMe$_2$)N(SiH$_2$—CH$_2$—CH$_2$—SiH$_3$)$_2$, (SiHEt$_2$)N(SiH$_2$—CH$_2$—CH$_2$—SiH$_3$)$_2$, SiH(iPr)$_2$N(SiH$_2$—CH$_2$—CH$_2$—SiH$_3$)$_2$, SiH(nPr)$_2$N(SiH$_2$—CH$_2$—CH$_2$—SiH$_3$)$_2$, SiH(Bu)$_2$N(SiH$_2$—CH$_2$—CH$_2$—SiH$_3$)$_2$, SiH(iBu)$_2$N(SiH$_2$—CH$_2$—CH$_2$—SiH$_3$)$_2$, SiH(tBu)$_2$N(SiH$_2$—CH$_2$—CH$_2$—SiH$_3$)$_2$, SiH(amyl)$_2$N(SiH$_2$—CH$_2$—CH$_2$—SiH$_3$)$_2$, SiH(hexyl)$_2$N(SiH$_2$—CH$_2$—CH$_2$—SiH$_3$)$_2$, (SiH$_2$Me$_2$)N(SiH$_2$—CH$_2$—CH$_2$—SiH$_3$)$_2$, (SiH$_2$Et$_2$)N(SiH$_2$—CH$_2$—CH$_2$—SiH$_3$)$_2$, SiH$_2$(iPr)N(SiH$_2$—CH$_2$—CH$_2$—SiH$_3$)$_2$, SiH$_2$(nPr)N(SiH$_2$—CH$_2$—CH$_2$—SiH$_3$)$_2$, SiH$_2$(Bu)N(SiH$_2$—CH$_2$—CH$_2$—SiH$_3$)$_2$, SiH$_2$(iBu)N(SiH$_2$—CH$_2$—CH$_2$—SiH$_3$)$_2$, SiH$_2$(tBu)N(SiH$_2$—CH$_2$—CH$_2$—SiH$_3$)$_2$, SiH$_2$(amyl)N(SiH$_2$—CH$_2$—CH$_2$—SiH$_3$)$_2$, and SiH$_2$(hexyl)N(SiH$_2$—CH$_2$—CH$_2$—SiH$_3$)$_2$. The additional N—Si bond makes these precursors more stable than those having a N—H bond, but more reactive than those having a N—C bond. As a result, these precursors may be desirable when moderate conditions are required for polymerization. The length of the carbon chain may be selected to provide the desired amount of carbon in the film. Finally, the listed precursors having lower molecular weights and higher vapor pressures are better suited for vapor deposition techniques, whereas those having higher molecular weights are better suited for coating techniques.

When m=2; R$^1$, R$^2$, R$^3$, R$^4$ and R$^5$=H; and R=a R$^{1'}$R$^{2'}$R$^{3'}$Si(CH$_2$)$_b$SiR$^{4'}$R$^{5'}$ group, with b=1 to 2 and R$^{1'}$, R$^{2'}$, R$^{3'}$, R$^{4'}$, and R$^{5'}$ are independently H or a C$_1$-C$_6$ hydrocarbon group, the disclosed carbosilazane precursors presented in formula (IV) include, but are not limited to, (SiH$_3$—CH$_2$—SiH$_2$)N(SiH$_2$—CH$_2$—CH$_2$—SiH$_3$)$_2$, (SiH$_3$—CH$_2$—CH$_2$—SiH$_2$)N(SiH$_2$—CH$_2$—CH$_2$—SiH$_3$)$_2$, (SiMe$_3$-CH$_2$—SiMe$_2$)N(SiH$_2$—CH$_2$—CH$_2$—SiH$_3$)$_2$, (SiMe$_3$-CH$_2$—CH$_2$—SiMe$_2$)N(SiH$_2$—CH$_2$—CH$_2$—SiH$_3$)$_2$, (SiEt$_3$-CH$_2$—SiEt$_2$)N(SiH$_2$—CH$_2$—CH$_2$—SiH$_3$)$_2$, and (SiEt$_3$-CH$_2$—CH$_2$—SiEt$_2$)N(SiH$_2$—CH$_2$—CH$_2$—SiH$_3$)$_2$.

When m=2; R$^1$, R$^2$, R$^3$, R$^4$ and R$^5$=H; and R=C$_y$H$_{2y+1}$, with y=1 to 6, the disclosed carbosilazane precursors presented in formula (IV) include, but are not limited to, (Me)N(SiH$_2$—CH$_2$—CH$_2$—SiH$_3$)$_2$, (Et)N(SiH$_2$—CH$_2$—CH$_2$—SiH$_3$)$_2$, (nPr)N(SiH$_2$—CH$_2$—CH$_2$—SiH$_3$)$_2$, (iPr)N(SiH$_2$—CH$_2$—CH$_2$—SiH$_3$)$_2$, (Bu)N(SiH$_2$—CH$_2$—CH$_2$—SiH$_3$)$_2$, (iBu)N(SiH$_2$—CH$_2$—CH$_2$—SiH$_3$)$_2$, (tBu)N(SiH$_2$—CH$_2$—CH$_2$—SiH$_3$)$_2$, (amyl)N(SiH$_2$—CH$_2$—CH$_2$—SiH$_3$)$_2$, and (hexyl)N(SiH$_2$—CH$_2$—CH$_2$—SiH$_3$)$_2$. This family of compounds may be useful for vapor deposition of films having carbon content, such as SiOC or SiNC, because the Si—C bond (for Si—R) is not highly reactive and is likely to remain intact during the deposition process. As a result, to prevent deposition of too much C, y is preferably 1 to 3. These precursors are also easier to synthesize than the DSB3 analogs because the RNHR$_2$ reactant is a liquid for Et, Pr, Bu, Pentyl, and Hexyl.

When m=2; R$^1$, R$^2$, R$^3$, R$^4$ and R$^5$=H; and R=SiH$_x$(NR'R")$_{3-x}$ with x=1 or 2 and R' and R" independently Me, Et, iPr, nPr, the disclosed carbosilazane precursors presented in formula (IV) include, but are not limited to, $(SiH_2NMe_2)N(SiH_2-CH_2-CH_2-SiH_3)_2$, $(SiH_2NEt_2)N(SiH_2-CH_2-CH_2-SiH_3)_2$, $(SiH_2NiPr_2)N(SiH_2-CH_2-CH_2-SiH_3)_2$, $(SiH_2NnPr_2)N(SiH_2-CH_2-CH_2-SiH_3)_2$, $(SiH_2NMeEt)N(SiH_2-CH_2-CH_2-SiH_3)_2$, $(SiH(NMe_2)_2)N(SiH_2-CH_2-CH_2-SiH_3)_2$, and $SiH(NEt_2)_2)N(SiH_2-CH_2-CH_2-SiH_3)_2$.

Exemplary carbosilazane precursors presented in formula (IV) wherein m=2; $R^1$, $R^2$, $R^3$ and $R^4$=H; and R=H, $C_uH_{2u+1}$, or $SivH_{2v-1}$, with u=1-6 and v=1-4, include, but are not limited to, $RN(SiH(CH_2=CH)-CH_2-CH_2-SiH_3)_2$, $RN(SiH(CH_2=CH-CH_2)-CH_2-CH_2-SiH_3)_2$, $RN(SiH(NH_2)-CH_2-CH_2-SiH_3)_2$, $RN(SiH(NMe_2)-CH_2-CH_2-SiH_3)_2$, $RN(SiH(NMeEt)-CH_2-CH_2-SiH_3)_2$, $RN(SiH(NEt_2)-CH_2-CH_2-SiH_3)_2$, $RN(SiH(NnPr_2)-CH_2-CH_2-SiH_3)_2$, $RN(SiH(NiPr_2)-CH_2-CH_2-SiH_3)_2$, $RN(SiH(NBu_2)-CH_2-CH_2-SiH_3)_2$, $RN(SiH(NiBu_2)-CH_2-CH_2-SiH_3)_2$, $RN(SiH(NtBu_2)-CH_2-CH_2-SiH_3)_2$, $RN(SiH(NAm_2)-CH_2-CH_2-SiH_3)_2$, $RN(SiH(NCyPentyl_2)-CH_2-CH_2-SiH_3)_2$, $RN(SiH(Nhexyl_2)-CH_2-CH_2-SiH_3)_2$, $RN(SiH(NCyHexyl_2)-CH_2-CH_2-SiH_3)_2$, $RN(SiH(NMeH)-CH_2-CH_2-SiH_3)_2$, $RN(SiH(NEtH)-CH_2-CH_2-SiH_3)_2$, $RN(SiH(NnPrH)-CH_2-CH_2-SiH_3)_2$, $RN(SiH(NiPrH)-CH_2-CH_2-SiH_3)_2$, $RN(SiH(NBuH)-CH_2-CH_2-SiH_3)_2$, $RN(SiH(NiBuH)-CH_2-CH_2-SiH_3)_2$, $RN(SiH(NtBuH)-CH_2-CH_2-SiH_3)_2$, $RN(SiH(NAmH)-CH_2-CH_2-SiH_3)_2$, $RN(SiH(pyridine)-CH_2-CH_2-SiH_3)_2$, $RN(SiH(pyrrole)-CH_2-CH_2-SiH_3)_2$, $RN(SiH(pyrrolidine)-CH_2-CH_2-SiH_3)_2$, and $RN(SiH(imidazole)-CH_2-CH_2-SiH_3)_2$.

Exemplary carbosilazane precursors presented in formula (IV) wherein m=2; $R^2$, $R^3$, $R^4$ and $R^5$=H; and R=H, $C_uH_{2u+1}$, or $SivH_{2v-1}$, with u=1-6 and v=1-4, include, but are not limited to, $RN(SiH_2-CH_2-CH_2-SiH_2(CH_2=CH))_2$, $RN(SiH_2-CH_2-CH_2-SiH_2(CH_2=CH-CH_2))_2$, $RN(SiH_2-CH_2-CH_2-SiH_2(NH_2))_2$, $RN(SiH_2-CH_2-CH_2-SiH_2(NMe_2))_2$, $RN(SiH_2-CH_2-CH_2-SiH_2(NMeEt))_2$, $RN(SiH_2-CH_2-CH_2-SiH_2(NEt_2))_2$, $RN(SiH_2-CH_2-CH_2-SiH_2(NnPr_2))_2$, $RN(SiH_2-CH_2-CH_2-SiH_2(NiPr_2))_2$, $RN(SiH_2-CH_2-CH_2-SiH_2(NBu_2))_2$, $RN(SiH_2-CH_2-CH_2-SiH_2(NiBu_2))_2$, $RN(SiH_2-CH_2-CH_2-SiH_2(NtBu_2))_2$, $RN(SiH_2-CH_2-CH_2-SiH_2(NAm_2))_2$, $RN(SiH_2-CH_2-CH_2-SiH_2(NCyPentyl_2))_2$, $RN(SiH_2-CH_2-CH_2-SiH_2(Nhexyl_2))_2$, $RN(SiH_2-CH_2-CH_2-SiH_2(NCyHexyl_2))_2$, $RN(SiH_2-CH_2-CH_2-SiH_2(NMeH))_2$, $RN(SiH_2-CH_2-CH_2-SiH_2(NEtH))_2$, $RN(SiH_2-CH_2-CH_2-SiH_2(NnPrH))_2$, $RN(SiH_2-CH_2-CH_2-SiH_2(NiPrH))_2$, $RN(SiH_2-CH_2-CH_2-SiH_2(NBuH))_2$, $RN(SiH_2-CH_2-CH_2-SiH_2(NiBuH))_2$, $RN(SiH_2-CH_2-CH_2-SiH_2(NtBuH))_2$, $RN(SiH_2-CH_2-CH_2-SiH_2(NAmH))_2$, $RN(SiH_2-CH_2-CH_2-SiH_2(pyridine))_2$, $RN(SiH_2-CH_2-CH_2-SiH_2(pyrrole))_2$, $RN(SiH_2-CH_2-CH_2-SiH_2(pyrrolidine))_2$, and $RN(SiH_2-CH_2-CH_2-SiH_2(imidazole))_2$. These precursors are suitable for either vapor deposition or coating applications due at least partially to the benefits discussed above for SiH bonds The terminal amino ligands may also provide improved thermal stability, as discussed above, as well as an additional N and/or C source for the resulting film. Finally, the listed precursors having lower molecular weights and higher vapor pressures are better suited for vapor deposition techniques, whereas those having higher molecular weights are better suited for coating techniques.

Exemplary carbosilazane precursors presented in formula (IV) wherein m=2; $R^1$, $R^2$ and $R^3$=H; and R=H, $C_uH_{2u+1}$, or $Si_vH_{2v-1}$, with u=1-6 and v=1-4, include, but are not limited to, $RN(Si(CH_2=CH)_2-CH_2-CH_2-SiH_3)_2$, $RN(Si(CH_2=CH-CH_2)_2-CH_2-CH_2-SiH_3)_2$, $RN(Si(NH_2)_2-CH_2-CH_2-SiH_3)_2$, $RN(Si(NMe_2)_2-CH_2-CH_2-SiH_3)_2$, $RN(Si(NMeEt)_2-CH_2-CH_2-SiH_3)_2$, $RN(Si(NEt_2)_2-CH_2-CH_2-SiH_3)_2$, $RN(Si(NnPr_2)_2-CH_2-CH_2-SiH_3)_2$, $RN(Si(NiPr_2)_2-CH_2-CH_2-SiH_3)_2$, $RN(Si(NBu_2)_2-CH_2-CH_2-SiH_3)_2$, $RN(Si(NiBu_2)_2-CH_2-CH_2-SiH_3)_2$, $RN(Si(NtBu_2)_2-CH_2-CH_2-SiH_3)_2$, $RN(Si(NAm_2)_2-CH_2-CH_2-SiH_3)_2$, $RN(Si(NCyPentyl_2)_2-CH_2-CH_2-SiH_3)_2$, $RN(Si(Nhexyl_2)_2-CH_2-CH_2-SiH_3)_2$, $RN(Si(NCyHexyl_2)_2-CH_2-CH_2-SiH_3)_2$, $RN(Si(NMeH)_2-CH_2-CH_2-SiH_3)_2$, $RN(Si(NEtH)_2-CH_2-CH_2-SiH_3)_2$, $RN(Si(NnPrH)_2-CH_2-CH_2-SiH_3)_2$, $RN(Si(NiPrH)_2-CH_2-CH_2-SiH_3)_2$, $RN(Si(NBuH)_2-CH_2-CH_2-SiH_3)_2$, $RN(Si(NiBuH)_2-CH_2-CH_2-SiH_3)_2$, $RN(Si(NtBuH)_2-CH_2-CH_2-SiH_3)_2$, $RN(Si(NAmH)_2-CH_2-CH_2-SiH_3)_2$, $RN(Si(pyridine)_2-CH_2-CH_2-SiH_3)_2$, $RN(Si(pyrrole)_2-CH_2-CH_2-SiH_3)_2$, $RN(Si(pyrrolidine)_2-CH_2-CH_2-SiH_3)_2$, and $RN(Si(imidazole)_2-CH_2-CH_2-SiH_3)_2$.

Exemplary carbosilazane precursors presented in formula (IV) wherein m=2; $R^2$, $R^3$ and $R^4$=H; and R=H, $C_uH_{2u+1}$, or $SivH_{2v-1}$, with u=1-6 and v=1-4, include, but are not limited to, $RN(SiH(CH_2=CH)-CH_2-CH_2-SiH_2(CH_2=CH))_2$, $RN(SiH(CH_2=CH-CH_2)-CH_2-CH_2-SiH_2(CH_2=CH-CH_2))_2$, $RN(SiH(NH_2)-CH_2-CH_2-SiH_2(NH_2))_2$, $RN(SiH(NMe_2)-CH_2-CH_2-SiH_2(NMe_2))_2$, $RN(SiH(NMeEt)-CH_2-CH_2-SiH_2(NMeEt))_2$, $RN(SiH(NEt_2)-CH_2-CH_2-SiH_2(NEt_2))_2$, $RN(SiH(NnPr_2)-CH_2-CH_2-SiH_2(NnPr_2))_2$, $RN(SiH(NiPr_2)-CH_2-CH_2-SiH_2(NiPr_2))_2$, $RN(SiH(NBu_2)-CH_2-CH_2-SiH_2(NBu_2))_2$, $RN(SiH(NiBu_2)-CH_2-CH_2-SiH_2(NiBu_2))_2$, $RN(SiH(NtBu_2)-CH_2-CH_2-SiH_2(NtBu_2))_2$, $RN(SiH(NAm_2)-CH_2-CH_2-SiH_2(NAm_2))_2$, $RN(SiH(NCyPentyl_2)-CH_2-CH_2-SiH_2(NCyPentyl_2))_2$, $RN(SiH(Nhexyl_2)-CH_2-CH_2-SiH_2(Nhexyl_2))_2$, $RN(SiH(NCyHexyl_2)-CH_2-CH_2-SiH_2(NCyHexyl_2))_2$, $RN(SiH(NMeH)-CH_2-CH_2-SiH_2(NMeH))_2$, $RN(SiH(NEtH)-CH_2-CH_2-SiH_2(NEtH))_2$, $RN(SiH(NnPrH)-CH_2-CH_2-SiH_2(NnPrH))_2$, $RN(SiH(NiPrH)-CH_2-CH_2-SiH_2(NiPrH))_2$, $RN(SiH(NBuH)-CH_2-CH_2-SiH_2(NBuH))_2$, $RN(SiH(NiBuH)-CH_2-CH_2-SiH_2(NiBuH))_2$, $RN(SiH(NtBuH)-CH_2-CH_2-SiH_2(NtBuH))_2$, $RN(SiH(NAmH)-CH_2-CH_2-SiH_2(NAmH))_2$, $RN(SiH(pyridine)-CH_2-CH_2-SiH_2(pyridine))_2$, $RN(SiH(pyrrole)-CH_2-CH_2-SiH_2(pyrrole))_2$, $RN(SiH(pyrrolidine)-CH_2-CH_2-SiH_2(pyrrolidine))_2$, and $RN(SiH(imidazole)-CH_2-CH_2-SiH_2(imidazole))_2$.

Exemplary carbosilazane precursors presented in formula (IV) wherein m=2; $R^3$, $R^4$ and $R^5$=H; and R=H, $C_uH_{2u+1}$, or $SivH_{2v-1}$, with u=1-6 and v=1-4, include, but are not limited to, $RN(SiH_2-CH_2-CH_2-SiH(CH_2=CH)_2)_2$, $RN(SiH_2-CH_2-CH_2-SiH(CH_2=CH-CH_2)_2)_2$, $RN(SiH_2-CH_2-CH_2-SiH(NH_2)_2)_2$, $RN(SiH_2-CH_2-CH_2-SiH(NMe_2)_2)_2$, $RN(SiH_2-CH_2-CH_2-SiH(NMeEt)_2)_2$, $RN(SiH_2-CH_2-CH_2-SiH(NEt_2)_2)_2$, $RN(SiH_2-CH_2-CH_2-SiH(NnPr_2)_2)_2$, $RN(SiH_2-CH_2-CH_2-SiH(NiPr_2)_2)_2$, $RN(SiH_2-CH_2-CH_2-SiH(NBu_2)_2)_2$, $RN(SiH_2-CH_2-CH_2-SiH(NiBu_2)_2)_2$, $RN(SiH_2-CH_2-CH_2-SiH(NtBu_2)_2)_2$, $RN(SiH_2-CH_2-CH_2-SiH(NAm_2)_2)_2$, $RN(SiH_2-CH_2-CH_2-SiH(NCyPentyl_2)_2)_2$, $RN(SiH_2-CH_2-CH_2-SiH(Nhexyl_2)_2)_2$, $RN(SiH_2-CH_2-CH_2-SiH(NCy- Hexyl$_2$)$_2$)$_2$, RN(SiH$_2$—CH$_2$—CH$_2$—SiH(NMeH)$_2$)$_2$, RN(SiH$_2$—CH$_2$—CH$_2$—SiH(NEtH)$_2$)$_2$, RN(SiH$_2$—CH$_2$—CH$_2$—SiH(NnPrH)$_2$)$_2$, RN(SiH$_2$—CH$_2$—CH$_2$—SiH(NiPrH)$_2$)$_2$, RN(SiH$_2$—CH$_2$—CH$_2$—SiH(NBuH)$_2$)$_2$, RN(SiH$_2$—CH$_2$—CH$_2$—SiH(NiBuH)$_2$)$_2$, RN(SiH$_2$—CH$_2$—CH$_2$—SiH(NtBuH)$_2$)$_2$, RN(SiH$_2$—CH$_2$—CH$_2$—SiH(NAmH)$_2$)$_2$, RN(SiH$_2$—CH$_2$—CH$_2$—SiH(pyridine)$_2$)$_2$, RN(SiH$_2$—CH$_2$—CH$_2$—SiH(pyrrole)$_2$)$_2$, RN(SiH$_2$—CH$_2$—CH$_2$—SiH(pyrrolidine)$_2$)$_2$, and RN(SiH$_2$—CH$_2$—CH$_2$—SiH(imidazole)$_2$)$_2$. These precursors are suitable for vapor deposition or coating applications due at least partially to the benefits discussed above for SiH bonds The terminal amino ligands may also provide improved thermal stability, as discussed above, as well as an additional N and/or C source for the resulting film. Finally, the listed precursors having lower molecular weights and higher vapor pressures are better suited for vapor deposition techniques, whereas those having higher molecular weights are better suited for coating techniques.

Exemplary carbosilazane precursors presented in formula (IV) wherein m=2; R$^4$ and R$^5$=H; and R=H, C$_u$H$_{2u+1}$, or SivH$_{2v-1}$, with u=1-6 and v=1-4, include, but are not limited to, RN(SiH$_2$—CH$_2$—CH$_2$—Si(CH$_2$=CH)$_3$)$_2$, RN(SiH$_2$-CH$_2$—CH$_2$—Si(CH$_2$=CH—CH$_2$)$_3$)$_2$, RN(SiH$_2$—CH$_2$—CH$_2$—Si(NH$_2$)$_3$)$_2$, RN(SiH$_2$—CH$_2$—CH$_2$—Si(NMe$_2$)$_3$)$_2$, RN(SiH$_2$—CH$_2$—CH$_2$—Si(NMeEt)$_3$)$_2$, RN(SiH$_2$—CH$_2$—CH$_2$—Si(NEt$_2$)$_3$)$_2$, RN(SiH$_2$—CH$_2$—CH$_2$—Si(NnPr$_2$)$_3$)$_2$, RN(SiH$_2$—CH$_2$—CH$_2$—Si(NiPr$_2$)$_3$)$_2$, RN(SiH$_2$—CH$_2$—CH$_2$—Si(NBu$_2$)$_3$)$_2$, RN(SiH$_2$—CH$_2$—CH$_2$—Si(NiBu$_2$)$_3$)$_2$, RN(SiH$_2$—CH$_2$—CH$_2$—Si(NtBu$_2$)$_3$)$_2$, RN(SiH$_2$—CH$_2$—CH$_2$—Si(NAm$_2$)$_3$)$_2$, RN(SiH$_2$—CH$_2$—CH$_2$—Si(NCyPentyl$_2$)$_3$)$_2$, RN(SiH$_2$—CH$_2$—CH$_2$—Si(Nhexyl$_2$)$_3$)$_2$, RN(SiH$_2$—CH$_2$—CH$_2$—Si(NCyHexyl$_2$)$_3$)$_2$, RN(SiH$_2$—CH$_2$—CH$_2$—Si(NMeH)$_3$)$_2$, RN(SiH$_2$—CH$_2$—CH$_2$—Si(NEtH)$_3$)$_2$, RN(SiH$_2$—CH$_2$—CH$_2$—Si(NnPrH)$_3$)$_2$, RN(SiH$_2$—CH$_2$—CH$_2$—Si(NiPrH)$_3$)$_2$, RN(SiH$_2$—CH$_2$—CH$_2$—Si(NBuH)$_3$)$_2$, RN(SiH$_2$—CH$_2$—CH$_2$—Si(NiBuH)$_3$)$_2$, RN(SiH$_2$—CH$_2$—CH$_2$—Si(NtBuH)$_3$)$_2$, RN(SiH$_2$—CH$_2$—CH$_2$—Si(NAmH)$_3$)$_2$, RN(SiH$_2$—CH$_2$—CH$_2$—Si(pyridine)$_3$)$_2$, RN(SiH$_2$—CH$_2$—CH$_2$—Si(pyrrole)$_3$)$_2$, RN(SiH$_2$—CH$_2$—CH$_2$—Si(pyrrolidine)$_3$)$_2$, and RN(SiH$_2$—CH$_2$—CH$_2$—Si(imidazole)$_3$)$_2$. These precursors are suitable for vapor deposition or coating applications due at least partially to the benefits discussed above for SiH bonds The terminal amino ligands may also provide improved thermal stability, as discussed above, as well as an additional N and/or C source for the resulting film. Finally, the listed precursors having lower molecular weights and higher vapor pressures are better suited for vapor deposition techniques, whereas those having higher molecular weights are better suited for coating techniques.

Returning to formula (II), when t=1 and R, R$^2$, R$^3$, R$^4$ and R$^5$=H, the disclosed polycarbosilazane precursor presented contain a unit having the formula [—NH—SiH$_2$—CH$_2$—SiH$_2$]$_n$ (i.e., [—NH-DSP-]$_n$). [—NH-DSP-]$_n$ contains many Si—H bonds, making it more reactive to the substrate surface. As a result, this precursor may be suitable for spin on deposition processes. Applicants believe that this precursor may even be sufficiently reactive to attach to Si—Cl or Si—OH terminated or even Si terminated substrate surfaces in CVD or ALD processes.

When t=1; R$^2$, R$^3$, R$^4$ and R$^5$=H; and R=Si$_x$H$_{2x+1}$, with x=1 to 4, the disclosed precursors contain a unit having the formula [—N(SiH$_3$)—SiH$_2$—CH$_2$—SiH$_2$—]$_n$, [—N(Si$_2$H$_5$)—SiH$_2$—CH$_2$—SiH$_2$—]$_n$, [—N(Si$_3$H$_7$)—SiH$_2$—CH$_2$—SiH$_2$]$_n$, [—N(Si$_4$H$_9$)—SiH$_2$—CH$_2$—SiH$_2$]$_n$. The choice of silyl ligand may help provide a film having the desired silicon content. In other words, the Si$_4$H$_9$ ligand may produce a film with more Si than that produced by the SiH$_3$ ligand.

When t=1; R$^2$, R$^3$, R$^4$ and R$^5$=H; and R=SiH$_z$(C$_y$H$_{2y+1}$)$_{3-z}$, with y=1 to 6, z=0 to 2, the disclosed precursors contain a unit having the formula including, but not limited to, [—N(Si(Me)$_3$)-SiH$_2$—CH$_2$—SiH$_2$—]$_n$, [—N(Si(Et)$_3$)-SiH$_2$—CH$_2$—SiH$_2$—]$_n$, [—N(Si(iPr)$_3$)-SiH$_2$—CH$_2$—SiH$_2$—]$_n$, [—N(Si(nPr)$_3$)-SiH$_2$—CH$_2$—SiH$_2$—]$_n$, [—N(Si(Bu)$_3$)-SiH$_2$—]$_n$, [—CH$_2$—SiH$_2$—]$_n$, [—N(Si(iBu)$_3$)-SiH$_2$—CH$_2$—SiH$_2$—]$_n$, [—N(Si(tBu)$_3$)-SiH$_2$—CH$_2$—SiH$_2$—]$_n$, [—N(Si(amyl)$_3$)-SiH$_2$—CH$_2$—SiH$_2$—]$_n$, [—N(Si(hexyl)$_3$)-SiH$_2$—CH$_2$—SiH$_2$—]$_n$, [—Nx(SiH(Me)$_2$)-SiH$_2$—CH$_2$—SiH$_2$—]$_n$, [—N(SiH(Et)$_2$)-SiH$_2$—CH$_2$—SiH$_2$—]$_n$, [—N(SiH(iPr)$_2$)-SiH$_2$—CH$_2$—SiH$_2$—]$_n$, [—N(SiH(nPr)$_2$)-SiH$_2$—CH$_2$—SiH$_2$—]$_n$, [—N(SiH(Bu)$_2$)-SiH$_2$—CH$_2$—SiH$_2$—]$_n$, [—N(SiH(iBu)$_2$)-SiH$_2$—CH$_2$—SiH$_2$—]$_n$, [—N(SiH(tBu)$_2$)-SiH$_2$—CH$_2$—SiH$_2$—]$_n$, [—N(SiH(amyl)$_2$)-SiH$_2$—CH$_2$—SiH$_2$—]$_n$, [—N(SiH(hexyl)$_2$)-SiH$_2$—CH$_2$—SiH$_2$—]$_n$, [—N(SiH$_2$(Me))-SiH$_2$—CH$_2$—SiH$_2$—]$_n$, [—N(SiH$_2$(Et))-SiH$_2$—CH$_2$—SiH$_2$—]$_n$, [—N(SiH$_2$(iPr))-SiH$_2$—CH$_2$—SiH$_2$—]$_n$, [—N(SiH$_2$(nPr))-SiH$_2$—CH$_2$—SiH$_2$—]$_n$, [—N(SiH$_2$(Bu))-SiH$_2$—CH$_2$—SiH$_2$—]$_n$, [—N(SiH$_2$(iBu))-SiH$_2$—CH$_2$—SiH$_2$—]$_n$, [—N(SiH$_2$(tBu))-SiH$_2$—CH$_2$—SiH$_2$—]$_n$, [—N(SiH$_2$(amyl))-SiH$_2$—CH$_2$—SiH$_2$—]$_n$, and [—N(SiH$_2$(hexyl))-SiH$_2$—CH$_2$—SiH$_2$—]$_n$.

When t=1; R$^2$, R$^3$, R$^4$ and R$^5$=H; and R=a R$^{1'}$R$^{2'}$R$^{3'}$Si(CH$_2$)$_b$SiR$^{4'}$R$^{5'}$ group, with b=1 to 2 and R$^{1'}$, R$^{2'}$, R$^{3'}$, R$^{4'}$, and R$^{5'}$ are independently H or a C$_1$-C$_6$ hydrocarbon group, the disclosed precursors contain a unit having the formula including, but not limited to, [—N(SiH$_3$—CH$_2$—SiH$_2$)—SiH$_2$—CH$_2$—SiH$_2$—]$_n$, [—N(SiH$_3$—CH$_2$—CH$_2$—SiH$_2$)—SiH$_2$—CH$_2$—SiH$_2$—]$_n$, [—N(SiMe$_3$-CH$_2$—SiMe$_2$)-SiH$_2$—CH$_2$—SiH$_2$—]$_n$, [—N(SiMe$_3$-CH$_2$—CH$_2$—SiMe$_2$)-SiH$_2$—CH$_2$—SiH$_2$—]$_n$, [—N(SiEt$_3$-CH$_2$—SiEt$_2$)-SiH$_2$—CH$_2$—SiH$_2$—]$_n$, and [—N(SiEt$_3$-CH$_2$—CH$_2$—SiEt$_2$)-SiH$_2$—CH$_2$—SiH$_2$—]$_n$.

When t=1; R$^2$, R$^3$, R$^4$ and R$^5$=H; and R=C$_y$H$_{2y+1}$, with y=1 to 6, the disclosed polycarbosilazane precursors contain a unit having the formula including, but not limited to, [—N(Me)-SiH$_2$—CH$_2$—SiH$_2$—]$_n$, [—N(Et)-SiH$_2$—CH$_2$—SiH$_2$—]$_n$, [—N(iPr)-SiH$_2$—CH$_2$—SiH$_2$—]$_n$, [—N(nPr)-SiH$_2$—CH$_2$—SiH$_2$—]$_n$, [—N(Bu)-SiH$_2$—CH$_2$—SiH$_2$—]$_n$, [—N(iBu)-SiH$_2$—CH$_2$—SiH$_2$—]$_n$, [—N(tBu)-SiH$_2$—CH$_2$—SiH$_2$—]$_n$, [—N(amyl)-SiH$_2$—CH$_2$—SiH$_2$—]$_n$, and [—N(hexyl)-SiH$_2$—CH$_2$—SiH$_2$—]$_n$. This family of compounds may be useful for deposition of films having carbon content, such as SiOC or SiNC, because the Si—C bond (for Si—R) is not highly reactive and is likely to remain intact during the deposition process. As a result, to prevent deposition of too much C, y is preferably 1 to 3. These precursors are also easier to synthesize than the [—NH-DSPH-]$_n$, analogs because the RNHR$_2$ reactant is a liquid for Et, Pr, Bu, Pentyl, and Hexyl.

When t=1; R$^2$, R$^3$, R$^4$ and R$^5$=H; and R=R$^{1'}$R$^{2'}$R$^{3'}$Si(CH$_2$)$_b$SiR$^{4'}$R$^{5'}$ with b=1 to 2 and R$^{1'}$, R$^{2'}$, R$^{3'}$, R$^{4'}$ and R$^{5'}$=H, the disclosed polycarbosilazane precursor contain a unit having the formula including, but not limited to, [—N(—SiH$_2$—CH$_2$—SiH$_3$)—SiH$_2$—CH$_2$—SiH$_2$—]$_n$ (i.e., [—N(DSP)-DSP-]$_n$) or [—N(—SiH$_2$—CH$_2$—CH$_2$—SiH$_3$)—SiH$_2$—CH$_2$—SiH$_2$—]$_n$, (i.e., [—N(DSB)-DSP-]$_n$).

When t=1; R$^2$, R$^3$, R$^4$ and R$^5$=H; and R=SiH$_x$(NR'R'')$_{3-x}$ with x=1 or 2 and R' and R'' independently Me, Et, iPr, nPr, the disclosed carbosilazane precursors contain a unit having the formula including, but not limited to, [—N(SiH$_2$NMe$_2$)—SiH$_2$—CH$_2$—SiH$_2$—]$_n$, [—N(SiH$_2$NEt$_2$)-

SiH$_2$—CH$_2$—SiH$_2$—]$_n$, [—N(SiH$_2$NiPr$_2$)-SiH$_2$—CH$_2$—SiH$_2$—]$_n$, [—N(SiH$_2$NnPr$_2$)-SiH$_2$—CH$_2$—SiH$_2$—]$_n$, [—N(SiH$_2$NMeEt)-SiH$_2$—CH$_2$—SiH$_2$—]$_n$, [—N(SiH(NMe$_2$)$_2$)-SiH$_2$—CH$_2$—SiH$_2$—]$_n$, and [—N(SiH(NEt$_2$)$_2$)-SiH$_2$—CH$_2$—SiH$_2$—]$_n$.

Exemplary polycarbosilazane precursors presented in formula (II) wherein t=1 and R, R$^3$, R$^4$ and R$^5$=H contain a unit having the formula including, but not limited to, [—NH—H$_2$Si—CH$_2$—SiH(CH$_2$=CH$_2$)—]$_n$, [—NH—H$_2$Si—CH$_2$—SiH(CH$_2$—CH$_2$=CH$_2$)—]$_n$, [—NH—H$_2$Si—CH$_2$—SiH(NH$_2$)—]$_n$, [—NH—H$_2$Si—CH$_2$—SiH(NMe$_2$)—]$_n$, [—NH—H$_2$Si—CH$_2$—SiH(NMeEt)—]$_n$, [—NH—H$_2$Si—CH$_2$—SiH(NEt$_2$)-]$_n$, [—NH—H$_2$Si—CH$_2$—SiH(NnPr$_2$)—]$_n$, [—NH—H$_2$Si—CH$_2$—SiH(NiPr$_2$)-]$_n$, [—NH—H$_2$Si—CH$_2$—SiH(NBu$_2$)—]$_n$, [—NH—H$_2$Si—CH$_2$—SiH(NiBu$_2$)-]$_n$, [—NH—H$_2$Si—CH$_2$—SiH(NtBu$_2$)—]$_n$, [—NH—H$_2$Si—CH$_2$—SiH(NAm$_2$)-]$_n$, [—NH—H$_2$Si—CH$_2$—SiH(NCyPentyl$_2$)—]$_n$, [—NH—H$_2$Si—CH$_2$—SiH(Nhexyl$_2$)-]$_n$, [—NH—H$_2$Si—CH$_2$—SiH(NCyHexyl$_2$)—]$_n$, [—NH—H$_2$Si—CH$_2$—SiH(NMeH)—]$_n$, [—NH—H$_2$Si—CH$_2$—SiH(NEtH)—]$_n$, [—NH—H$_2$Si—CH$_2$—SiH(NnPrH)—]$_n$, [—NH—H$_2$Si—CH$_2$—SiH(NiPrH)—]$_n$, [—NH—H$_2$Si—CH$_2$—SiH(NBuH)—]$_n$, [—NH—H$_2$Si—CH$_2$—SiH(NiBuH)—]$_n$, [—NH—H$_2$Si—CH$_2$—SiH(NtBuH)—]$_n$, [—NH—H$_2$Si—CH$_2$—SiH(NAmH)—]$_n$, [—NH—H$_2$Si—CH$_2$—SiH(pyridine)-]$_n$, [—NH—H$_2$Si—CH$_2$—SiH(pyrrole)—]$_n$, [—NH—H$_2$Si—CH$_2$—SiH(pyrrolidine)- ]$_n$, and [—NH—H$_2$Si—CH$_2$—SiH(imidazole)—]$_n$. These precursors are suitable for spin-coating applications due at least partially to the benefits discussed above for SiH bonds. The amino ligand may also provide improved thermal stability, as discussed above, as well as an additional N and/or C source for the resulting film, Exemplary polycarbosilazane precursors presented in formula (II) wherein t=1 and R, R$^4$ and R$^5$=H contain a unit having the formula including, but not limited to, [—NH—H$_2$Si—CH$_2$—Si(CH$_2$=CH$_2$)$_2$—]$_n$, [—NH—H$_2$Si—CH$_2$—Si(CH$_2$—CH$_2$=CH$_2$)$_2$—]$_n$, [—NH—H$_2$Si—CH$_2$—Si(NH$_2$)$_2$—]$_n$, [—NH—H$_2$Si—CH$_2$—Si(NMe$_2$)$_2$—]$_n$, [—NH—H$_2$Si—CH$_2$—Si(NMeEt)$_2$—]$_n$, [—NH—H$_2$Si—CH$_2$—Si(NEt$_2$)$_2$—]$_n$, [—NH—H$_2$Si—CH$_2$—Si(NnPr$_2$)$_2$—]$_n$, [—NH—H$_2$Si—CH$_2$—Si(NiPr$_2$)$_2$—]$_n$, [—NH—H$_2$Si—CH$_2$—Si(NBu$_2$)$_2$—]$_n$, [—NH—H$_2$Si—CH$_2$—Si(NiBu$_2$)$_2$—]$_n$, [—NH—H$_2$Si—CH$_2$—Si(NtBu$_2$)$_2$—]$_n$, [—NH—H$_2$Si—CH$_2$—Si(NAm$_2$)$_2$—]$_n$, [—NH—H$_2$Si—CH$_2$—Si(NCyPentyl$_2$)$_2$-]$_n$, [—NH—H$_2$Si—CH$_2$—Si(Nhexyl$_2$)$_2$-]$_n$, [—NH—H$_2$Si—CH$_2$—Si(NCyHexyl$_2$)$_2$-]$_n$, [—NH—H$_2$Si—CH$_2$—Si(NMeH)$_2$—]$_n$, [—NH—H$_2$Si—CH$_2$—Si(NEtH)$_2$—]$_n$, [—NH—H$_2$Si—CH$_2$—Si(NnPrH)$_2$—]$_n$, [—NH—H$_2$Si—CH$_2$—Si(NiPrH)$_2$—]$_n$, [—NH—H$_2$Si—CH$_2$—Si(NBuH)$_2$—]$_n$, [—NH—H$_2$Si—CH$_2$—Si(NiBuH)$_2$—]$_n$, [—NH—H$_2$Si—CH$_2$—Si(NtBuH)—]$_n$, [—NH—H$_2$Si—CH$_2$—Si(NAmH)$_2$—]$_n$, [—NH—H$_2$Si—CH$_2$—Si(pyridine)$_2$—]$_n$, [—NH—H$_2$Si—CH$_2$—Si(pyrrole)$_2$-]$_n$, [—NH—H$_2$Si—CH$_2$—Si(pyrrolidine)$_2$—]$_n$, and [—NH—H$_2$Si—CH$_2$—Si(imidazole)$_2$-]$_n$. These precursors are suitable for spin-coating applications due at least partially to the benefits discussed above for SiH bonds The terminal amino ligand may also provide improved thermal stability, as discussed above, as well as an additional N and/or C source for the resulting film.

Exemplary polycarbosilazane precursors presented in formula (II) wherein t=1 and R, R$^3$ and R$^5$=H contain a unit having the formula including, but not limited to, [—NH—SiH(CH$_2$=CH$_2$)—CH$_2$—SiH(CH$_2$=CH$_2$)—]$_n$, [—NH—SiH—(CH$_2$—CH$_2$=CH$_2$)—CH$_2$—SiH(CH$_2$—CH$_2$=CH$_2$)—]$_n$, [—NH—SiH(NH$_2$)—CH$_2$—SiH(NH$_2$)—]$_n$, [—NH—SiH(NMe$_2$)-CH$_2$—SiH(NMe$_2$)-]$_n$, [—NH—SiH(NMeEt)-CH$_2$—SiH(NMeEt)-]$_n$, [—NH—SiH(NEt$_2$)-CH$_2$—SiH(NEt$_2$)-]$_n$, [—NH—SiH(NnPr$_2$)-CH$_2$—SiH(NnPr$_2$)-]$_n$, [—NH—SiH(NiPr$_2$)-CH$_2$—SiH(NiPr$_2$)-]$_n$, [—NH—SiH(NBu$_2$)-CH$_2$—SiH(NBu$_2$)-]$_n$, [—NH—SiH(NiBu$_2$)-CH$_2$—SiH(NiBu$_2$)-]$_n$, [—NH—SiH(NtBu$_2$)-CH$_2$—SiH(NtBu$_2$)-]$_n$, [—NH—SiH(NAm$_2$)-CH$_2$—SiH(NAm$_2$)-]$_n$, [—NH—SiH(NCyPentyl$_2$)-CH$_2$—SiH(NCyPentyl$_2$)-]$_n$, [—NH—SiH(Nhexyl$_2$)-CH$_2$—SiH(Nhexyl$_2$)-]$_n$, [—NH—SiH(NCyHexyl$_2$)-CH$_2$—SiH(NCyHexyl$_2$)-]$_n$, [—NH—SiH(NMeH)—CH$_2$—SiH(NMeH)—]$_n$, [—NH—SiH(NEtH)—CH$_2$—SiH(NEtH)—]$_n$, [—NH—SiH(NnPrH)—CH$_2$—SiH(NnPrH)—]$_n$, [—NH—SiH(NiPrH)—CH$_2$—SiH(NiPrH)—]$_n$, [—NH—SiH(NBuH)—CH$_2$—SiH(NBuH)—]$_n$, [—NH—SiH(NiBuH)—CH$_2$—SiH(NiBuH)—]$_n$, [—NH—SiH(NtBuH)—CH$_2$—SiH(NtBuH)—]$_n$, [—NH—SiH(NAmH)—CH$_2$—SiH(NAmH)—]$_n$, [—NH—SiH(pyridine)-CH$_2$—SiH(pyridine)-]$_n$, [—NH—SiH(pyrrole)-CH$_2$—SiH(pyrrole)—]$_n$, [—NH—SiH(pyrrolidine)-CH$_2$—SiH(pyrrolidine)-]$_n$, and [—NH—SiH(imidazole)-CH$_2$—SiH(imidazole)-]$_n$. These precursors are suitable for spin-coating applications due at least partially to the benefits discussed above for SiH bonds The terminal amino ligand may also provide improved thermal stability, as discussed above, as well as an additional N and/or C source for the resulting film.

When t=2 and R, R$^2$, R$^3$, R$^4$ and R$^5$=H, the disclosed polycarbosilazane precursor contain a unit having the formula [—NH—SiH$_2$—CH$_2$—CH$_2$—SiH$_2$—]$_n$ (i.e., [—NH-DSB-]$_n$). [—NH-DSB-]$_n$ contains many Si—H bonds, making it more reactive to the substrate surface. As a result, this precursor may be suitable for spin on deposition processes. Applicants believe that this precursor may even be sufficiently reactive to attach to Si—Cl terminated or even Si terminated substrate surfaces.

When t=2; R$^2$, R$^3$, R$^4$ and R$^5$=H; and R=Si$_x$H$_{2x+1}$, with x=1 to 4, the disclosed polycarbosilazane precursors contain a unit having the formula [—N(SiH$_3$)—SiH$_2$—CH$_2$—CH$_2$—SiH$_2$—]$_n$, [—N(Si$_2$H$_5$)—SiH$_2$—CH$_2$—CH$_2$—SiH$_2$—]$_n$, [—N(Si$_3$H$_7$)—SiH$_2$—CH$_2$—CH$_2$—SiH$_2$—]$_n$, and/or [—N(Si$_4$H$_9$)—SiH$_2$—CH$_2$—CH$_2$—SiH$_2$—]$_n$. The choice of silyl ligand may help provide a film having the desired silicon content. In other words, the Si$_4$H$_9$ ligand may produce a film with more Si than that produced by the SiH$_3$ ligand.

When t=2; R$^1$, R$^2$, R$^3$, R$^4$ and R$^5$=H; and R=SiH$_z$(C$_y$H$_{2y+1}$)$_{3-z}$, with y=1 to 6 and z=0 to 2, the disclosed carbosilazane precursor contain a unit having the formula including, but not limited to, [—N(Si(Me)$_3$)-SiH$_2$—CH$_2$—CH$_2$—SiH$_2$—]$_n$, [—N(Si(Et)$_3$)-SiH$_2$—CH$_2$—CH$_2$—SiH$_2$—]$_n$, [—N(Si(iPr)$_3$)-SiH$_2$—GHz-CH$_2$—SiH$_2$—]$_n$, [—N(Si(nPr)$_3$)-SiH$_2$—CH$_2$—CH$_2$—SiH$_2$—]$_n$, [—N(Si(Bu)$_3$)-SiH$_2$—CH$_2$—CH$_2$—SiH$_2$—]$_n$, [—N(Si(iBu)$_3$)-SiH$_2$—CH$_2$—CH$_2$—SiH$_2$—]$_n$, [—N(Si(tBU)$_3$)-SiH$_2$—CH$_2$—CH$_2$—SiH$_2$—]$_n$, [—N(Si(amyl)$_3$)-SiH$_2$—CH$_2$—CH$_2$—SiH$_2$—]$_n$, [—N(Si(hexyl)$_3$)-SiH$_2$—CH$_2$—CH$_2$—SiH$_2$—]$_n$, [—Nx(SiH(Me)$_2$)-SiH$_2$—CH$_2$—CH$_2$—SiH$_2$—]$_n$, [—N(SiH(Et)$_2$)-SiH$_2$—CH$_2$—CH$_2$—SiH$_2$—]$_n$, [—N(SiH(iPr)$_2$)-SiH$_2$—CH$_2$—CH$_2$—SiH$_2$—]$_n$, [—N(SiH(nPr)$_2$)-SiH$_2$—CH$_2$—CH$_2$—SiH$_2$—]$_n$, [—N(SiH(Bu)$_2$)-SiH$_2$—CH$_2$—CH$_2$—SiH$_2$—]$_n$, [—N(SiH(iBu)$_2$)-SiH$_2$—CH$_2$—CH$_2$—SiH$_2$—]$_n$, [—N(SiH(tBu)$_2$)-SiH$_2$—CH$_2$—CH$_2$—SiH$_2$—]$_n$, [—N(SiH(amyl)$_2$)-SiH$_2$—CH$_2$—CH$_2$—SiH$_2$—]$_n$, [—N(SiH(hexyl)$_2$)-SiH$_2$—CH$_2$—CH$_2$—

$SiH_2$—]$_n$, [—N($SiH_2$(Me))-$SiH_2$—$CH_2$—$CH_2$—$SiH_2$—]$_n$, [—N($SiH_2$(Et))-$SiH_2$—$CH_2$—$CH_2$—$SiH_2$—]$_n$, [—N($SiH_2$(iPr))-$SiH_2$—$CH_2$—$CH_2$—$SiH_2$—]$_n$, [—N($SiH_2$(nPr))-$SiH_2$—$CH_2$—$CH_2$—$SiH_2$—]$_n$, [—N($SiH_2$(Bu))-$SiH_2$—$CH_2$—$CH_2$—$SiH_2$—]$_n$, [—N($SiH_2$(iBu))-$SiH_2$—$CH_2CH_2$—$SiH_2$—]$_n$, [—N($SiH_2$(tBu))-$SiH_2$—$CH_2$—$CH_2$—$SiH_2$—]$_n$, and [—N($SiH_2$(amyl))-$SiH_2$—$CH_2$—$CH_2$—$SiH_2$—]$_n$, and [—N($SiH_2$(hexyl))-$SiH_2$—$CH_2$—$CH_2$—$SiH_2$—]$_n$.

When t=2, R=$C_yH_{2y+1}$ (y=1 to 6), and $R^2$, $R^3$, $R^4$ and $R^5$=H, the disclosed polycarbosilazane precursors contain a unit having the formula including, but not limited to, [—N(Me)-$SiH_2$—$CH_2$—$CH_2$—$SiH_2$—]$_n$, [—N(Et)-$SiH_2$—$CH_2$—$CH_2$—$SiH_2$—]$_n$, [—N(iPr)-$SiH_2$—$CH_2$—$CH_2$—$SiH_2$—]$_n$, [—N(nPr)-$SiH_2$—$CH_2$—$CH_2$—$SiH_2$—]$_n$, [—N(Bu)-$SiH_2$—$CH_2$—$CH_2$—$SiH_2$—]$_n$, [—N(iBu)-$SiH_2$—$CH_2$—$CH_2$—$SiH_2$—]$_n$, [—N(tBu)-$SiH_2$—$CH_2$—$CH_2$—$SiH_2$—]$_n$, [—N(amyl)-$SiH_2$—$CH_2$—$CH_2$—$SiH_2$—]$_n$, and [—N(hexyl)-$SiH_2$—$CH_2$—$CH_2$—$SiH_2$—]$_n$, This family of compounds may be useful for deposition of films having carbon content, such as SiOC or SiNC, because the Si—C bond (for Si—R) is not highly reactive and is likely to remain intact during the deposition process. As a result, to prevent deposition of too much C, y is preferably 1 to 3. These precursors are also easier to synthesize than the [—NH-DSB-]$_n$ analogs because the $RNHR_2$ reactant is a liquid for Et, Pr, Bu, Pentyl, and Hexyl.

When t=2; $R^2$, $R^3$, $R^4$ and $R^5$=H; and R=a $R^{1'}R^{2'}R^{3'}$Si$(CH_2)_b$Si$R^{4'}R^{5'}$ group, with b=1 to 2 and $R^{1'}$, $R^{2'}$, $R^{3'}$, $R^{4'}$, and $R^{5'}$ independently H or a $C_1$-$C_6$ hydrocarbon group, the disclosed polycarbosilazane precursors contain a unit having the formula including, but not limited, [—N($SiH_3$—$CH_2$—$SiH_2$)—$SiH_2$—$CH_2$—$CH_2$—$SiH_2$—]$_n$, [—N($SiH_3$—$CH_2$—$CH_2$—$SiH_2$)—$SiH_2$—$CH_2$—$CH_2$—$SiH_2$—]$_n$, [—N($SiMe_3$-$CH_2$—$SiMe_2$)-$SiH_2$—$CH_2$—$CH_2$—$SiH_2$—]$_n$, [—N($SiMe_3$-$CH_2$—$CH_2$—$SiMe_2$)-$SiH_2$—$CH_2$—$CH_2$—$SiH_2$—]$_n$, [—N($SiEt_3$-$CH_2$—$SiEt_2$)-$SiH_2$—$CH_2$—$CH_2$—$SiH_2$—]$_n$, and [—N($SiEt_3$-$CH_2$—$CH_2$—$SiEt_2$)-$SiH_2$—$CH_2$—$CH_2$-$SiH_2$—]$_n$.

When t=$R^2$, $R^3$, $R^4$ and $R^5$=H; and R=$R^{1'}R^{2'}R^{3'}$Si$(CH_2)_b$Si$R^{4'}R^{5'}$ with b=1 to 2 and $R^{1'}$, $R^{2'}$, $R^{3'}$, $R^{4'}$ and $R^{5'}$=H, the disclosed polycarbosilazane precursor contain a unit having the formula [—N(—$SiH_2$—$CH_2$—$SiH_3$)—$SiH_2$—$CH_2$—$CH_2$—$SiH_2$—]$_n$ (i.e., [—N(DSP)-DSB-]$_n$) or [—N(—$SiH_2$—$CH_2$—$CH_2$—$SiH_3$)—$SiH_2$—$CH_2$—$CH_2$—$SiH_2$—]$_n$ (i.e., [—N(DSB)-DSB-]$_n$). [—N(DSP)-DSB-]$_n$ and [—N(DSB)-DSB-]$_n$ contains many Si—H bonds, making it more reactive to the substrate surface. As a result, this precursor may be suitable for spin on deposition processes. Applicants believe that this precursor may even be sufficiently reactive to attach to Si—Cl terminated or even Si terminated substrate surfaces.

When t=2; $R^2$, $R^3$, $R^4$ and $R^5$=H; and R=$SiH_x$(NR'R'')$_{3-x}$ with x=1 or 2 and R' and R'' independently are Me, Et, iPr, nPr, the disclosed carbosilazane precursors contain a unit having the formula including, but not limited to, [—N($SiH_2NMe_2$)-$SiH_2$—$CH_2$—$CH_2$—$SiH_2$—]$_n$, [—N($SiH_2NEt_2$)-$SiH_2$—$CH_2$—$CH_2$—$SiH_2$—]$_n$, [—N($SiH_2NiPr_2$)-$SiH_2$—$CH_2$—$CH_2$—$SiH_2$—]$_n$, [—N($SiH_2NnPr_2$)-$SiH_2$—$CH_2$—$CH_2$—$SiH_2$—]$_n$, [—N($SiH_2NMeEt$)-$SiH_2$—$CH_2$ -$CH_2$—$SiH_2$—]$_n$, [—N(SiH($NMe_2$)$_2$)-$SiH_2$—$CH_2$—$CH_2$—$SiH_2$—]$_n$, and [—N(SiH($NEt_2$)$_2$)-$SiH_2$—$CH_2$—$CH_2$—$SiH_2$—]$_n$.

Exemplary polycarbosilazane precursors presented in formula (II) wherein t=2 and R, $R^3$, $R^4$ and $R^5$=H contain a unit having the formula including, but not limited to, [—NH—$H_2Si$—$CH_2$—$CH_2$—SiH($CH_2$—$CH_2$=$CH_2$)—]$_n$, [—NH—$H_2Si$—$CH_2$—$CH_2$—SiH($CH_2$—$CH_2$=$CH_2$)—]$_n$, [—NH—$H_2Si$—$CH_2$—$CH_2$—SiH($NH_2$)$_n$, [—NH—$H_2Si$—$CH_2$—$CH_2$—SiH($NMe_2$)-]$_n$, [—NH—$H_2Si$—$CH_2$—$CH_2$—SiH(NMeEt)-]$_n$, [—NH—$H_2Si$—$CH_2$—$CH_2$—SiH($NEt_2$)-]$_n$, [—NH—$H_2Si$—$CH_2$—$CH_2$—SiH($NnPr_2$)-]$_n$, [—NH—$H_2Si$—$CH_2$—$CH_2$—SiH($NiPr_2$)-]$_n$, [—NH—$H_2Si$—$CH_2$—$CH_2$—SiH($NBu_2$)-]$_n$, [—NH—$H_2Si$—$CH_2$—$CH_2$—SiH($NiBu_2$)-]$_n$, [—NH—$H_2Si$—$CH_2$—$CH_2$—SiH($NtBu_2$)-]$_n$, [—NH—$H_2Si$—$CH_2$—$CH_2$—SiH($NAm_2$)-]$_n$, [—NH—$H_2Si$—$CH_2$—$CH_2$—SiH($NCyPentyl_2$)-]$_n$, [—NH—$H_2Si$—$CH_2$—$CH_2$—SiH($Nhexyl_2$)-]$_n$, [—NH—$H_2Si$—$CH_2$—$CH_2$—SiH($NCyHexyl_2$)-]$_n$, [—NH—$H_2Si$—$CH_2$—$CH_2$—SiH(NMeH)—]$_n$, [—NH—$H_2Si$—$CH_2$—$CH_2$—SiH(NEtH)—]$_n$, [—NH—$H_2Si$—$CH_2$—$CH_2$—SiH(NnPrH)—]$_n$, [—NH—$H_2Si$—$CH_2$—$CH_2$—SiH(NiPrH)—]$_n$, [—NH—$H_2Si$—$CH_2$—$CH_2$—SiH(NBuH)—]$_n$, [—NH—$H_2Si$—$CH_2$—$CH_2$—SiH(NiBuH)—]$_n$, [—NH—$H_2Si$—$CH_2$—$CH_2$—SiH(NtBuH)—]$_n$, [—NH—$H_2Si$—$CH_2$—$CH_2$—SiH(NAmH)—]$_n$, [—NH—$H_2Si$—$CH_2$—$CH_2$—SiH(pyridine)-]$_n$, [—NH—$H_2Si$—$CH_2$—$CH_2$—SiH(pyrrole)-]$_n$, [—NH—$H_2Si$—$CH_2$—$CH_2$—SiH(pyrrolidine)-]$_n$, and [—NH—$H_2Si$—$CH_2$—$CH_2$—SiH(imidazole)-]$_n$. These precursors are suitable for spin-coating applications due at least partially to the benefits discussed above for SiH bonds The amino ligand may also provide improved thermal stability, as discussed above, as well as an additional N and/or C source for the resulting film.

Exemplary polycarbosilazane precursors presented in formula (II) wherein t=2 and R, $R^4$ and $R^5$=H contain a unit having the formula including, but not limited to, [—NH—$H_2Si$—$CH_2$—$CH_2$—Si($CH_2$=$CH_2$)$_2$—]$_n$, [—NH—$H_2Si$—$CH_2$—$CH_2$—Si($CH_2$—$CH_2$=$CH_2$)$_2$—]$_n$, [—NH—$H_2Si$—$CH_2$—$CH_2$—Si($NH_2$)$_2$—]$_n$, [—NH—$H_2Si$—$CH_2$—$CH_2$—Si($NMe_2$)$_2$-]$_n$, [—NH—$H_2Si$—$CH_2$—$CH_2$—Si($NMeEt$)$_2$)-]$_n$, [—NH—$H_2Si$—$CH_2$—$CH_2$—Si($NEt_2$)$_2$—]$_n$, [—NH—$H_2Si$—$CH_2$—$CH_2$—Si($NnPr_2$)$_2$—]$_n$, [—NH—$H_2Si$—$CH_2$—$CH_2$—Si($NiPr_2$)$_2$—]$_n$, [—NH—$H_2Si$—$CH_2$—$CH_2$—Si($NBu_2$)$_2$—]$_n$, [—NH—$H_2Si$—$CH_2$—$CH_2$—Si($NiBu_2$)$_2$—]$_n$, [—NH—$H_2Si$—$CH_2$—$CH_2$—Si($NtBu_2$)$_2$—]$_n$, [—NH—$H_2Si$—$CH_2$—$CH_2$—Si($NAm_2$)$_2$—]$_n$, [—NH—$H_2Si$—$CH_2$—$CH_2$—Si($NCyPentyl_2$)$_2$-]$_n$, [—NH—$H_2Si$—$CH_2$—$CH_2$—Si($Nhexyl_2$)$_2$)-]$_n$, [—NH—$H_2Si$—$CH_2$—$CH_2$—Si($NCyHexyl_2$)$_2$-]$_n$, [—NH—$H_2Si$—$CH_2$—$CH_2$—Si($NMeH$)$_2$—]$_n$, [—NH—$H_2Si$—$CH_2$—$CH_2$—Si($NEtH$)—]$_n$, [—NH—$H_2Si$—$CH_2$—$CH_2$—Si($NnPrH_2$)—]$_n$, [—NH—$H_2Si$—$CH_2$—$CH_2$—Si($NiPrH_2$)—]$_n$, [—NH—$H_2Si$—$CH_2$—$CH_2$—Si($NBuH_2$)—]$_n$, [—NH—$H_2Si$—$CH_2$—$CH_2$—Si($NiBuH$)—]$_n$, [—NH—$H_2Si$—$CH_2$—$CH_2$—Si($NtBuH$)$_2$)—]$_n$, [—NH—$H_2Si$—$CH_2$—$CH_2$—Si($NAmH$)$_2$—]$_n$, [—NH—$H_2Si$—$CH_2$—$CH_2$—Si(pyridine)$_2$-]$_n$, [—NH—$H_2Si$—$CH_2$—$CH_2$—Si(pyrrole)$_2$-]$_n$, [—NH—$H_2Si$—$CH_2$—$CH_2$—Si(pyrrolidine)$_2$-]$_n$, and [—NH—$H_2Si$—$CH_2$—$CH_2$—Si(imidazole)$_2$-]$_n$. These precursors are suitable for spin-coating applications due at least partially to the benefits discussed above for SiH bonds The amino ligand may also provide improved thermal stability, as discussed above, as well as an additional N and/or C source for the resulting film.

Exemplary polycarbosilazane precursors presented in formula wherein t=2 and R, $R^3$ and $R^5$=H contain a unit having the formula including, but not limited to, [—NH—SiH($CH_2$=$CH_2$)—$CH_2$—$CH_2$—SiH($CH_2$=$CH_2$)—]$_n$, [—NH—SiH($CH_2$—$CH_2$=$CH_2$)—$CH_2$—$CH_2$—SiH($CH_2$—$CH_2$=$CH_2$)—]$_n$, [—NH—SiH($NH_2$)—$CH_2$—$CH_2$—SiH($NH_2$)—]$_n$, [—NH—SiH($NMe_2$)-$CH_2$—$CH_2$—

SiH(NMe$_2$)-]$_n$, [—NH—SiH(NMeEt)-CH$_2$—CH$_2$—SiH(NMeEt)—]$_n$, [—NH—SiH(NEt$_2$)-CH$_2$—CH$_2$—SiH(NEt$_2$)—]$_n$, [—NH—SiH(NnPr$_2$)-CH$_2$—CH$_2$—SiH(NnPr$_2$)-]$_n$, [—NH—SiH(NiPr$_2$)-CH$_2$—CH$_2$—SiH(NiPr$_2$)-]$_n$, [—NH—SiH(NBu$_2$)-CH$_2$—CH$_2$—SiH(NBu$_2$)-]$_n$, [—NH—SiH(NiBu$_2$)-CH$_2$—CH$_2$—SiH(NiBu$_2$)-]$_n$, [—NH—SiH(NtBu$_2$)-CH$_2$—CH$_2$—SiH(NtBu$_2$)-]$_n$, [—NH—SiH(NAm$_2$)-CH$_2$—CH$_2$—SiH(NAm$_2$)-]$_n$, [—NH—SiH(NCyPentyl$_2$)-CH$_2$—CH$_2$—SiH(NCyPentyl$_2$)-]$_n$, [—NH—SiH(Nhexyl$_2$)-CH$_2$—CH$_2$—SiH(Nhexyl$_2$)-]$_n$, [—NH—SiH(NCyHexyl$_2$)-CH$_2$—CH$_2$—SiH(NCyHexyl$_2$)-]$_n$, [—NH—SiH(NMeH)—CH$_2$—CH$_2$—SiH(NMeH)—]$_n$, [—NH—SiH(NEtH)—CH$_2$—CH$_2$—SiH(NEtH)—]$_n$, [—NH-SiH(NnPrH)—CH$_2$—CH$_2$—SiH(NnPrH)—]$_n$, [—NH—SiH(NiPrH)—CH$_2$—CH$_2$—SiH(NiPrH)—]$_n$, [—NH—SiH(NBuH)—CH$_2$—CH$_2$—SiH(NBuH)—]$_n$, [—NH—SiH(NiBuH)—CH$_2$—CH$_2$—SiH(NiBuH)—]$_n$, [—NH—SiH(NtBuH)—CH$_2$—CH$_2$—SiH(NtBuH)]$_n$, [—NH—SiH(NAmH)—CH$_2$—CH$_2$—SiH(NAmH)—]$_n$, [—NH—SiH(pyridine)-CH$_2$—CH$_2$—SiH(pyridine)-]$_n$, [—NH—SiH(pyrrole)-CH$_2$—CH$_2$—SiH(pyrrole]$_n$, [—NH—SiH(pyrrolidine)-CH$_2$—CH$_2$—SiH(pyrrolidine)-]$_n$, and [—NH—SiH(imidazole)-CH$_2$—CH$_2$—SiH(imidazole)-]$_n$. These precursors are suitable for spin-coating applications due at least partially to the benefits discussed above for SiH bonds The amino ligand may also provide improved thermal stability, as discussed above, as well as an additional N and/or C source for the resulting film.

In one exemplary synthesis method, the disclosed precursors may be synthesized using a halogen-containing reactant. In a second exemplary synthesis method, a halogen-containing reactant is not required. Both of the disclosed synthesis methods may provide high yield. The disclosed synthesis methods may be more selective than conventional synthesis methods (i.e., may yield more of the desired precursor than prior art methods). The halogen free synthesis method may be useful to produce precursors used with substrates sensitive to halides.

Applicants have discovered that specific solvent polarity selection aids in reducing the synthesis of undesired by-products. For example, in a non-polar solvent, RN(R$^4$R$^5$Si(CH$_2$)$_m$SiR$^1$R$^2$R$^3$)$_2$ may be selectively produced with minimal production of N(R$^4$R$^5$Si(CH$_2$)$_m$SiR$^1$R$^2$R$^3$)$_3$ by-product. Conversely, in a polar solvent, N(R$^4$R$^5$Si(CH$_2$)$_m$SiR$^1$R$^2$R$^3$)$_3$ containing compounds may be selectively produced with minimal RN(R$^4$R$^5$Si(CH$_2$)$_m$SiR$^1$R$^2$R$^3$)$_2$ by-product.

The disclosed synthesis methods may be scaled up to produce large amount of the product. For example, scaled up to approximately 1 kg to approximately 100 kg.

In the exemplary halogen-free synthesis route, a starting reagent having the formula H$_3$Si(CH$_2$)SiH$_3$ (i.e., DSP), is reacted with ammonia in a pressure reactor in the presence of transitional metal based heterogeneous or homogeneous catalysts. The reaction may be neat or utilize a solvent. Exemplary catalysts include, but are not limited to, Ru, Pt, Pd. If a solvent is used, the solvent may be selected from hydrocarbons, amines, ethers, among others. This reaction may produce a mixture of the di-substituted and tri-substituted product (e.g., HNDSP2 and NDSP3), or a linear or branched oligomer of N-DSP (i.e., a precursor containing a unit having the formula [—NR-DSP-]$_n$, wherein R is defined above). The reaction parameters may be optimized to produce the desired precursors. Exemplary reaction parameters include reaction temperature, stoichiometry and reaction time.

Replacing the DSP starting reagent above with a DSB starting reagent yields HNDSB2 or NDSB3. The reaction formula are as follows. H$_3$Si—CH$_2$—CH$_2$—SiH$_3$+NH$_3$→HNDSB2; H$_3$Si—CH$_2$—CH$_2$—SiH$_3$+NH$_3$→NDSB3

N-DSB-containing oligomers [—NH-DSB-]$_n$ and [—N(DSB)-DSB-]$_n$ (n=2 to 400) may be synthesized via the halogen free route by replacing DSP with DSB in a pressure reactor in the presence of transition metals based heterogeneous catalysts like but not limited to Ru, Pt, Pd and transition metals based homogeneous catalysts and heating the mixture at 20-150° C. H$_3$Si—CH$_2$—CH$_2$—SiH$_3$+NH$_3$→HN(DSB)$_2$→[—NH-DSB-]$_n$; H$_3$Si—CH$_2$—CH$_2$—SiH$_3$+NH$_3$→N(DSB)$_3$→[—N(DSB)-DSB-]$_n$.

The starting DSP or DSB reagents may be synthesized by reacting LiAlH$_4$(LAH) with SiCl$_3$CH$_2$SiCl$_3$ in diglyme (H$_3$COC$_2$H$_4$OC$_2$H$_4$OCH$_3$) or SiCl$_3$CH$_2$CH$_2$SiCl$_3$ in di-n-butyl ether (H$_9$C$_4$OC$_4$H$_9$). 3LiAlH$_4$+2SiCl$_3$CH$_2$SiCl$_3$→2DSP+3LiAlCl$_4$ or 3LiAlH$_4$+2SiCl$_3$CH$_2$CH$_2$SiCl$_3$→2DSB+3LiAlCl$_4$.

Alternatively, the ammonia reactant may be replaced with an amine having the formula R—NH$_2$, with R being a C$_1$-C$_6$ linear, branched, saturated or unsaturated hydrocarbon. This halogen-free reaction produces (-DSP-NR-) or (-DSB-NR-).

RN(—SiR$^4$R$^5$—CH$_2$—SiR$^1$R$^2$R$^3$)$_2$ may be formed in a pressure reactor by mixing HN(—SiR$^4$R$^5$—CH$_2$—SiR$^1$R$^2$R$^3$)$_2$ with a carbosilane (e.g., H$_3$SiC$_n$H$_{2n}$SiH$_3$) or corresponding R-containing compounds, with or without a solvent, in the presence of transitional metal based heterogeneous or homogeneous catalysts, Exemplary catalysts include but are not limited to Ru, Pt, Pd. The mixture is heated to a temperature ranging between 20-150° C. The reaction yields a combination of RNDSP2, NDSP3 and N-DSP-containing oligomers, Pure RNDSP2, NDSP3 or N-DSP-containing oligomer may be obtained by proper distillation or isolation methods. For example, (H$_3$Si—CH$_2$—SiH$_2$—)$_2$—N—SiH$_2$—C$_n$H$_{2n}$—SiH$_3$ may be synthesized in a pressure reactor by reacting HN(DSP)$_2$ with carbosilane H$_3$SiC$_n$H$_{2n}$SiH$_3$ in the presence of a catalyst, such as Ru/C, Pt/C, Pd/C.

HN(—SiR$^4$R$^5$—CH$_2$—SiR$^1$R$^2$R$^3$)$_2$ may be reacted with a silane having the formula Si$_x$R'$_{2x+2}$ (x=1-4) to produce [Si$_x$R'$_{2x+1}$]—N(—SiR$^4$R$^5$—CH$_2$—SiR$^1$R$^2$R$^3$)$_2$. More particularly, HNDSP2 reacts with SiH$_4$ to produce (SiH$_3$)N(DSP)$_2$. The dehydrogenative coupling reaction (halogen free route) occurs in a pressure reactor in the presence of a transition metal based heterogeneous catalyst, such as Ru, Pt, Pd and transition metals based homogeneous catalysts. The synthesis may take place with or without a solvent. The mixture is heated to a temperature between 20-150° C. HN(DSP)$_2$+Si$_n$H$_{2n+2}$→RN(DSP)$_2$, R=Si$_n$H$_{2n+1}$; n=1 to 4. When n=1, (DSP)-N(SiH$_3$)-(DSP) may also be produced. When n=2, (DSP)-N(Si$_2$H$_5$)-(DSP) may also be produced.

In another example, HN(—SiR$^4$R$^5$—CH$_2$—SiR$^1$R$^2$R$^3$)$_2$ may be reacted with a carbosilane having the formula SiH$_3$C$_x$H$_{2x+1}$(x=1-4) to produce (SiH$_2$C$_x$H$_{2x+1}$)N(—SiR$^4$R$^5$—CH$_2$—SiR$^1$R$^2$R$^3$)$_2$. More particularly, HN(DSP)$_2$ reacts with SiH$_3$Me to produce (MeSiH$_2$)N(DSP)$_2$.

(DSP)$_2$N—(SiH$_2$(CH$_2$)$_3$SiH$_3$) or (DSB)$_2$N—(SiH$_2$(CH$_2$)$_n$SiH$_3$), wherein n=1 to 2, may be synthesized by reacting HN(DSP)$_2$ or HN(DSB)$_2$ with (H$_3$SiC$_n$H$_{2n}$SiH$_3$) (n=1 to 2) in a pressure reactor by dehydrogenative coupling (halogen free route) in the presence of a catalyst like Ru/C, Pt/C, Pd/C, having the reaction formula: (DSP)$_2$N—H+H$_3$SiC$_n$H$_{2n}$SiH$_3$=(DSP)$_2$N—SiH$_2$C$_n$H$_{2n}$SiH$_3$+H$_2$, wherein n=1 to 2.

Alternatively, the RNDSP2 or RNDSB2 product may be synthesized via a halogenated route. HNDSP2 is mixed with the corresponding halogenated alkane, silane, or carbosilanes in a solvent. Suitable solvents include hydrocarbons or ethereal solvents like diethyether, tetrahydrofuran (THF), glymes or anisole. Since, HCl is a byproduct of this reaction, a HCl scavenger is required. Exemplary HCl scavengers include any amine, but preferably a tertiary amine. For example, $(H_3Si—CH_2—SiH_2—)_2—N—SiH_2—C_nH_{2n}—SiH_3$ (n=1 to 2) may be synthesized by reacting $HN(DSP)_2$ or $HN(DSB)_2$ and the corresponding halogenated carbosilane $(X—H_2SiC_nH_{2n}SiH_3; X=Cl, Br, I, n=1$ to 2) with or without a solvent. Exemplary solvents include hydrocarbons or aromatic solvents like benzene, toluene, tertiary amine etc.

$HN(—SiR^4R^5—CH_2—SiR^1R^2R^3)_2$ or $N(—SiR^4R^5—CH_2—SiR^1R^2R^3)_3$ may be selectively synthesized by mixing $X—N(—SiR^4R^5—CH_2—SiR^1R^2R^3)_2$ and $NH_3$ in a solvent. If a non-polar solvent is used, such as toluene, $HN(—SiR^4R^5—CH_2—SiR^1R^2R^3)_2$ is produced. If a polar solvent is used, $N(—SiR^4R^5—CH_2—SiR^1R^2R^3)_3$ is produced. Exemplary but non-limiting polar solvents include ethereal solvents such as diethyether, THF, glymes or anisole. For example, NDSP3 may be selectively synthesized by mixing DSP-Cl and ammonia in an ethereal solvent. Alternatively, HNDSP2 may be selectively synthesized by mixing DSP-Cl and ammonia in toluene, Since HCl is the byproduct of these reactions, a HCl scavenger is required. Exemplary HCl scavengers include but are not limited to amines and preferably a tertiary amine or excess of ammonia depending on the desired product.

$HN(—SiR^4R^5—CH_2—SiR^1R^2R^3)_2$ may be reacted with a halogenated alkane having the formula R—X, with X being Cl, Br, or I and $R=C_xH_{2x+2}$, to produce $(C_xH_{2x+1})N(—SiR^4R^5—CH_2—SiR^1R^2R^3)_2$. For example, $HN(DSP)_2$ reacts with $CH_3Cl$ to produce $(Me)N(DSP)_2$.

$(SiH_2NMe_2)N(DSP)_2$, may be synthesized by reacting $HN(DSP)_2$ and $X—SiH_2NMe_2$ with or without a solvent. The solvent may be a hydrocarbon solvent, tertiary amine, etc.

$(DSP)_2N—(SiH_2(CH_2)_nSiH_3)$ or $(DSB)_2N—(SiH_2(CH_2)_nSiH_3)$ may be synthesized by reacting $HN(DSP)_2$ or $HN(DSB)_2$ with the corresponding halogenated carbosilane $(X—H_2SiC_nH_{2n}SiH_3; X=Cl, Br, I)$ with or without a solvent. Exemplary non-limiting solvents include hydrocarbon solvents, aromatic solvents like benzene, toluene etc, tertiary amine etc.

RNDSP2 or RNDSB2 may be synthesized by mixing HNDSP2 with nBuLi (an alkyllithium linear or branched). The acidic proton on HNDSP2 may be extracted by reaction with nBuLi followed by mixing halogenated compounds having the formula of R—X, wherein X=Cl, Br or I; R is an alkane, silane, carbosilane, phenyl group or silylamino group ($SiNR'_2$ or $SiNR'R''$), wherein R' and R'' are each independently a H, a hydrocarbon group (C1 to C12), in a hydrocarbon solvent such as, but not limited to, pentane, hexane, etc. or ethereal solvent such as, but not limited to, diethyether, THF, glymes or anisole. For example, HNDSP2 reacts with $SiMe_3X$ to produce $(SiMe_3)N(DSP)_2$; HNDSP2 reacts with $CH_3X$ to produce $(Me)N(DSP)_2$. $(DSP)_2N—[CH_2]_nH$, wherein n=1-6, may be synthesized by reacting HNDSP2 with nBuLi followed by alkylhalide (alkyl=$C_nH_{2n+1}$ and halide=Cl, Br, I) in a hydrocarbon solvent like pentane, hexane etc. or ethereal solvent like diethylether, THF etc, aromatic solvents like benzene, toluene etc., having the reaction formula: HNDSP2+R—X→RNDSP2+HX, wherein X=Cl, Br or I; $R=C_nH_{2n+1}$; n=1-6.

Alternatively, HNDSB2 and NDSB3 may also be selectively synthesized by replacing DSP-Cl with DSB-Cl in the above halogen involved route for producing HNDSP2 and NDSP3. $ClSiH_2—CH_2—CH_2—SiH_3+NH_3→HN(DSB)_2+HCl$; $ClSiH_2—CH_2—CH_2—SiH_3+NH_3→NDSB3+HCl$. In a non-polar solvent, HNDSB2 may be selectively produced. Replacing the non-polar solvent with a polar solvent, NDSB3 may be selectively produced with the halogen involved route.

One of ordinary skill in the art will recognize that the substituted DSP and DSB reactants may be synthesized using $HSiR_2—CH_2—SiR_3$ or $ClSiR_2—CH_2—SiR_3$ and the dehydrocoupling or the Cl exchange route, respectively.

To ensure process reliability, the resulting Si-containing film forming composition may be purified by continuous or fractional batch distillation or sublimation prior to use to a purity ranging from approximately 90% w/w to approximately 100% w/w, preferably ranging from approximately 99% w/w to approximately 100% w/w. The Si-containing film forming compositions may contain any of the following impurities: undesired congeneric species; solvents; chlorinated metal compounds; or other reaction products. Preferably, the total quantity of these impurities is below 0.1% w/w.

The concentration of each of solvent, such as toluene, hexane, substituted hexane, pentane, substituted pentane, diethyether, THF, glymes, dimethoxy ether, or anisole in the purified material may range from approximately 0% w/w to approximately 5% w/w, preferably from approximately 0% w/w to approximately 0.1% w/w. Solvents may be used in the composition's synthesis. Separation of the solvents from the composition may be difficult if both have similar boiling points. Cooling the mixture may produce solid precursor in liquid solvent, which may be separated by filtration. Vacuum distillation may also be used, provided the precursor product is not heated above approximately its decomposition point.

In one embodiment the disclosed Si-containing film forming composition contains less than 5% v/v, preferably less than 1% v/v, more preferably less than 0.1% v/v, and even more preferably less than 0.01% v/v of any of its undesired congeneric species, reactants, or other reaction products. This embodiment may provide better process repeatability. This embodiment may be produced by distillation of the Si-containing film forming composition. In an alternate embodiment, the disclosed Si-containing film forming compositions may contain between 5% v/v and 50% v/v of the carbosilazane or polycarbosilazane precursor, particularly when the mixture provides improved process parameters or isolation of the target precursor is too difficult or expensive. For example, a mixture of reaction products may produce a stable, liquid mixture suitable for spin-on or vapor deposition.

The concentration of trace metals and metalloids in the Si-containing film forming composition may each range from approximately 0 ppbw to approximately 500 ppbw, preferably from approximately 0 ppbw to approximately 100 ppbw, and more preferably from approximately 0 ppbw to approximately 10 ppbw. One of ordinary skill in the art will recognize that extraction using a reagent, such as hydrofluoric, nitric or sulfuric acid, and analysis by atomic absorption spectroscopy, x-ray fluorescence spectroscopy, or similar analytical techniques may be used to determine the trace metal and metalloid concentrations. One of ordinary skill in the art will further recognize that the concentration required for the vapor deposition precursors may be lower than those for the polymer precursors.

The halogen concentration in the purified Si-containing film forming composition may range from approximately 0 ppmw to approximately 1000 ppmw, preferably from 0 ppmw to 500 ppmw, and more preferably from 0 ppmw to 100 pppmw. The halogen concentration may be determined by gas chromatography atomic emission spectrometry (GC-AES) or other techniques known in the art. These analysis techniques provide the total concentration of both covalently bonded halogen-silane halogens and halide ions. Alternatively, the halide concentration may determined by ion chromatography. One of ordinary skill in the art will recognize that the halide concentration may be lower than the halogen concentration for the same precursor, particularly when the precursor includes Si-halogen bonds. The halide concentrations may range from approximately 0 ppmw to approximately 500 ppmw, preferably from approximately 0 ppmw to approximately 250 ppmw, and more preferably from approximately 0 ppmw to approximately 75 ppmw.

Also disclosed are methods of using the disclosed precursors of Formula I or Formula II for vapor deposition methods. To be suitable for vapor deposition methods, the disclosed precursors should have a molecular weight ranging from approximately 150 to approximately 600, preferably from approximately 200 to approximately 400. The disclosed methods provide for the use of the Si-containing film forming composition for deposition of silicon-containing films. The disclosed methods may be useful in the manufacture of semiconductor, photovoltaic, LCD-TFT, or flat panel type devices. The method includes: introducing the vapor of the disclosed Si-containing film forming composition into a reactor having a substrate disposed therein: and depositing at least part of the disclosed carbosilazane or polycarbosilazane precursor onto the substrate via a deposition process to form a Si-containing layer.

The disclosed methods also provide for forming a bimetal-containing layer on a substrate using a vapor deposition process and, more particularly, for deposition of $SiMO_x$ films, wherein x may be 0-4 and M is Ta, Hf, Nb, Mg, Al, Sr, Y, Ba, Ca, As, Sb, Bi, Sn, Pb, Co, lanthanides (such as Er), or combinations thereof.

The disclosed methods of forming silicon-containing layers on substrates may be useful in the manufacture of semiconductor, photovoltaic, LCD-TFT, or flat panel type devices. The disclosed Si-containing film forming compositions may deposit Si-containing films using any vapor deposition methods known in the art. Examples of suitable vapor deposition methods include chemical vapor deposition (CVD) or atomic layer deposition (ALD). Exemplary CVD methods include thermal CVD, plasma enhanced CVD (PECVD), pulsed CVD (PCVD), low pressure CVD (LPCVD), sub-atmospheric CVD (SACVD) or atmospheric pressure CVD (APCVD), flowable CVD (f-CVD), metal organic chemical vapor deposition (MOCVD), hot-wire CVD (HWCVD, also known as cat-CVD, in which a hot wire serves as an energy source for the deposition process), radicals incorporated CVD, and combinations thereof. Exemplary ALD methods include thermal ALD, plasma enhanced ALD (PEALD), spatial isolation ALD, hot-wire ALD (HWALD), radicals incorporated ALD, and combinations thereof. Super critical fluid deposition may also be used. The deposition method is preferably ALD, spatial ALD, or PE-ALD in order to provide suitable step coverage and film thickness control.

The vapor of the Si-containing film forming composition is introduced into a reaction chamber containing a substrate. The temperature and the pressure within the reaction chamber and the temperature of the substrate are held at conditions suitable for vapor deposition of at least part of the carbosilazane precursor onto the substrate. In other words, after introduction of the vaporized composition into the chamber, conditions within the chamber are such that at least part of the vaporized precursor is deposited onto the substrate to form the silicon-containing film. A co-reactant may also be used to help in formation of the Si-containing layer.

The reaction chamber may be any enclosure or chamber of a device in which deposition methods take place, such as, without limitation, a parallel-plate type reactor, a cold-wall type reactor, a hot-wall type reactor, a single-wafer reactor, a multi-wafer reactor, or other such types of deposition systems. All of these exemplary reaction chambers are capable of serving as an ALD reaction chamber. The reaction chamber may be maintained at a pressure ranging from about 0.5 mTorr to about 20 Torr. In addition, the temperature within the reaction chamber may range from about 20° C. to about 600° C. One of ordinary skill in the art will recognize that the temperature may be optimized through mere experimentation to achieve the desired result.

The temperature of the reactor may be controlled by either controlling the temperature of the substrate holder or controlling the temperature of the reactor wall. Devices used to heat the substrate are known in the art. The reactor wall is heated to a sufficient temperature to obtain the desired film at a sufficient growth rate and with desired physical state and composition. A non-limiting exemplary temperature range to which the reactor wall may be heated includes from approximately 20° C. to approximately 600° C. When a plasma deposition process is utilized, the deposition temperature may range from approximately 20° C. to approximately 550° C. Alternatively, when a thermal process is performed, the deposition temperature may range from approximately 300° C. to approximately 600° C.

Alternatively, the substrate may be heated to a sufficient temperature to obtain the desired silicon-containing film at a sufficient growth rate and with desired physical state and composition, A non-limiting exemplary temperature range to which the substrate may be heated includes from 150° C. to 600° C. Preferably, the temperature of the substrate remains less than or equal to 500° C.

The type of substrate upon which the silicon-containing film will be deposited will vary depending on the final use intended. A substrate is generally defined as the material on which a process is conducted. The substrates may be any suitable substrate used in semiconductor, photovoltaic, flat panel, or LCD-TFT device manufacturing. Examples of suitable substrates include wafers, such as silicon, silica, glass, Ge, or GaAs wafers. The wafer may have one or more layers of differing materials deposited on it from a previous manufacturing step. For example, the wafers may include silicon layers (crystalline, amorphous, porous, etc.), silicon oxide layers, silicon nitride layers, silicon oxy nitride layers, carbon doped silicon oxide (SiCOH) layers, or combinations thereof. Additionally, the wafers may include copper layers, tungsten layers or metal layers (e,g. platinum, palladium, nickel, rhodium, or gold). The wafers may include barrier layers, such as manganese, manganese oxide, tantalum, tantalum nitride, etc. Plastic layers, such as poly(3,4-ethylenedioxythiophene)poly(styrenesulfonate) [PEDOT:PSS] may also be used. The layers may be planar or patterned. In some embodiments, the substrate may be a patterned photoresist film made of hydrogenated carbon, for example $CH_x$, wherein x is greater than zero (e.g., x≤4). In some embodiments, the substrate may include layers of oxides which are used as dielectric materials in MIM, DRAM, or FeRam technologies (for example, $ZrO_2$ based materials, $HfO_2$ based materials, $TiO_2$ based materials, rare earth oxide based materials, ternary oxide based materials, etc.) or from nitride-based films (for example, TaN) that are used as an oxygen barrier between copper and the low-k layer. The disclosed processes may deposit the silicon-containing layer directly on the wafer or directly on one or more than one (when patterned layers form the substrate) of the layers on top of the wafer. Furthermore, one of ordinary skill in the art will recognize that the terms "film" or "layer" used herein refer to a thickness of some material laid on or spread over a surface and that the surface may be a trench or a line. Throughout the specification and claims, the wafer and any associated layers thereon are referred to as substrates. The actual substrate utilized may also depend upon the specific precursor embodiment utilized. In many instances though, the preferred substrate utilized will be selected from hydrogenated carbon, TiN, SRO, Ru, and Si type substrates, such as polysilicon or crystalline silicon substrates.

The substrate may be patterned to include vias or trenches having high aspect ratios. For example, a conformal Si-containing film, such as $SiO_2$, may be deposited using any ALD technique on a through silicon via (TSV) having an aspect ratio ranging from approximately 20:1 to approximately 100:1. In another example, trenches can be filled with polysilazane or polycarbosilazane by flowable CVD and converted to a hard film by annealing or UV curing. The film may be converted to a silicon oxide containing film if annealed or UV cured under oxidizing atmosphere. Alternativley, the film may be converted into a silicon nitride or silicon carbonitride containing film if annealed or UV cured under inert, nitridizing atmosphere ($NH_3$, hydrazine, amine, NO) or carbonizing atmosphere.

The Si-containing film forming compositions may be supplied neat. Alternatively, the Si-containing film forming compositions may further comprise a solvent suitable for vapor deposition. The solvent may be selected from, among others, $C_1$-$C_{16}$ saturated or unsaturated hydrocarbons, tetrahydrofuran (THF), dimethyl oxalate (DMO), ether, pyridine, methyl isobutyl ketone, cyclohexanone, ethanol, isopropanol, or combinations thereof.

For vapor deposition, the Si-containing film forming compositions are introduced into a reactor in vapor form by conventional means, such as tubing and/or flow meters. The composition in vapor form may be produced by vaporizing the composition through a conventional vaporization step such as direct vaporization, distillation, by bubbling, or by using a sublimator such as the one disclosed in PCT Publication WO2009/087609 to Ku et al. The composition may be fed in liquid state to a vaporizer where it is vaporized before it is introduced into the reactor. Alternatively, the composition may be vaporized by passing a carrier gas into a container containing the precursor or by bubbling the carrier gas into the precursor. The carrier gas may include, but is not limited to, Ar, He, or $N_2$, and mixtures thereof. Bubbling with a carrier gas may also remove any dissolved oxygen present in the composition. The carrier gas and precursor are then introduced into the reactor as a vapor.

If necessary, the container may be heated to a temperature that permits the Si-containing film forming composition to be in its liquid phase and to have a sufficient vapor pressure. The container may be maintained at temperatures in the range of, for example, 0-150° C. Those skilled in the art recognize that the temperature of the container may be adjusted in a known manner to control he amount of Si-containing film forming composition vaporized.

In addition to the disclosed composition, a reaction gas may also be introduced into the reactor. The reaction gas may be an oxidizing agent such as $O_2$; $O_3$; $H_2O$; $H_2O_2$; oxygen containing radicals such as $O^-$ or $OH^-$; NO; $NO_2$; carboxylic acids such as formic acid, acetic acid, propionic acid; radical species of NO, $NO_2$, or the carboxylic acids; para-formaldehyde; and mixtures thereof. Preferably, the oxidizing agent is selected from the group consisting of $O_2$, $O_3$, $H_2O$, $H_2O_2$, oxygen containing radicals thereof such as $O^-$ or $OH^-$, and mixtures thereof. Preferably, when an ALD process is performed, the co-reactant is plasma treated oxygen, ozone, or combinations thereof. When an oxidizing gas is used, the resulting silicon containing film will also contain oxygen.

Alternatively, the reaction gas may be a reducing agent such as one of $H_2$, $NH_3$, $(SiH_3)_3N$, hydridosilanes (such as $SiH_4$, $Si_2H_6$, $SiH_3H_8$, $Si_4H_{10}$, $Si_5H_{10}$, $Si_6H_{12}$), chlorosilanes and chloropolysilanes (such as $SiHCl_3$, $SiH_2Cl_2$, $SiH_3Cl$, $Si_2Cl_6$, $Si_2HCl_5$, $SiH_3Cl_8$), alkysilanes (such as $Me_2SiH_2$, $Et_2SiH_2$, $MeSiH_3$, $EtSiH_3$), hydrazines (such as $N_2H_4$, $MeHNNH_2$, MeHNNHMe), organic amines (such as $NMeH_2$, $NEtH_2$, $NMe_2H$, $NEt_2H$, $NMe_3$, $NEt_3$, $(SiMe_3)_2NH$), diamines such as ethylene diamine, dimethylethylene diamine, tetramethylethylene diamine, pyrazoline, pyridine, B-containing molecules (such as $B_2H_6$, trimethylboron, triethylboron, borazine, substituted borazine, dialkylaminoboranes), alkyl metals (such as trimethylaluminum, triethylaluminum, dimethylzinc, diethylzinc), radical species thereof, or mixtures thereof. When a reducing agent is used, the resulting silicon containing film may be pure Si.

Alternatively, the reaction gas may be selected from the group consisting of $H_2$, $NH_3$, $SiH_4$, $Si_2H_6$, $SiH_3H_8$, $SiH_2Me_2$, $SiH_2Et_2$, $N(SiH_3)_3$, hydrogen radicals thereof, and mixtures thereof.

Alternatively, the reaction gas may be HCDS or PCDS.

Alternatively, the reaction gas may be a hydrocarbon, saturated or unsaturated, linear, branched or cyclic, such as but not limited to ethylene, acetylene, propylene, isoprene, cyclohexane, cyclohexene, cyclohexadiene, pentene, pentyne, cyclopentane, butadiene, cyclobutane, terpinene, octane, octane, or combinations thereof.

The reaction gas may be treated by a plasma, in order to decompose the reaction gas into its radical form. $N_2$ may also be utilized as a reducing agent when treated with plasma. For instance, the plasma may be generated with a power ranging from about 50 W to about 500 W, preferably from about 100 W to about 200 W. The plasma may be generated or present within the reactor itself. Alternatively, the plasma may generally be at a location removed from the reactor, for instance, in a remotely located plasma system. One of skill in the art will recognize methods and apparatus suitable for such plasma treatment.

The desired silicon-containing film also contains another element, such as, for example and without limitation, B, Zr, Hf, Ti, Nb, V, Ta, Al, Si, Ge.

The disclosed Si-containing film forming compositions may also be used with a halosilane or polyhalodisilane or polyhalotrisilane, such as hexachlorodisilane, pentachlorodisilane, or tetrachlorodisilane, or octachlorotrisilane, and one or more co-reactant gases to form SiN or SiCN films, as disclosed in PCT Publication Number WO2011/123792, the entire contents of which are incorporated herein in their entireties.

The vapor of the Si-containing film forming composition and one or more co-reactants may be introduced into the reaction chamber simultaneously (chemical vapor deposition), sequentially (atomic layer deposition), or in other combinations. For example, the Si-containing film forming composition may be introduced in one pulse and two additional metal sources may be introduced together in a separate pulse (modified atomic layer deposition). Alternatively, the reaction chamber may already contain the co-reactant prior to introduction of the Si-containing film forming composition. The co-reactant may be passed through a plasma system localized or remotely from the reaction chamber, and decomposed to radicals, like in the flowable CVD configuration. Alternatively, the Si-containing film forming composition may be introduced to the reaction chamber continuously while other precursors or reactants are introduced by pulse (pulsed-chemical vapor deposition). In another alternative, the Si-containing film forming composition and one or more co-reactants may be simultaneously sprayed from a shower head under which a susceptor holding several wafers is spun (spatial ALD).

In one non-limiting exemplary atomic layer deposition process, the vapor phase of the Si-containing film forming composition is introduced into the reaction chamber, where it is contacted with a suitable substrate. Excess composition may then be removed from the reaction chamber by purging and/or evacuating the reaction chamber. An oxygen source is introduced into the reaction chamber where it reacts with the absorbed carbosilazane or polycarbosilazane precursor in a self-limiting manner. Any excess oxygen source is removed from the reaction chamber by purging and/or evacuating the reaction chamber. If the desired film is a silicon oxide film, this two-step process may provide the desired film thickness or may be repeated until a film having the necessary thickness has been obtained.

Alternatively, if the desired film is a silicon metal/metalloid oxide film (i.e., $SiMO_x$. wherein x may be 0-4 and M is B, Zr, Hf, Ti, Nb, V, Ta, Al, Si, Ge, or combinations thereof), the two-step process above may be followed by introduction of a vapor of a metal- or metalloid-containing precursor into the reaction chamber. The metal- or metalloid-containing precursor will be selected based on the nature of the silicon metal/metalloid oxide film being deposited. After introduction into the reaction chamber, the metal- or metalloid-containing precursor is contacted with the substrate. Any excess metal- or metalloid-containing precursor is removed from the reaction chamber by purging and/or evacuating the reaction chamber. Once again, an oxygen source may be introduced into the reaction chamber to react with the metal- or metalloid-containing precursor. Excess oxygen source is removed from the reaction chamber by purging and/or evacuating the reaction chamber. If a desired film thickness has been achieved, the process may be terminated. However, if a thicker film is desired, the entire four-step process may be repeated. By alternating the provision of the Si-containing film forming composition, metal- or metalloid-containing precursor, and oxygen source, a film of desired composition and thickness can be deposited.

Additionally, by varying the number of pulses, films having a desired stoichiometric M:Si ratio may be obtained. For example, a $SiMO_2$ film may be obtained by having one pulse of the Si-containing film forming composition and one pulse of the metal- or metalloid-containing precursor, with each pulse being followed by a pulse of the oxygen source. However, one of ordinary skill in the art will recognize that the number of pulses required to obtain the desired film may not be identical to the stoichiometric ratio of the resulting film.

In another alternative, Si or dense SiCN films may be deposited via an ALD or modified plasma-enhanced ALD process using the disclosed compositions and an N-containing co-reactant like ammonia, $N_2$, $N_2/H_2$ mixture, or an amine. For $N_2$ and $N_2/H_2$ mixture, the co-reactant needs to be activated by a plasma, either direct (within the chamber) or remote.

In yet another alternative, a silicon-containing film may be deposited by the flowable PECVD (f-PECVD) method disclosed in U.S. Pat. App. Pub. No. 2014/0051264 using the disclosed Si-containing film forming compositions and a radical nitrogen- or oxygen-containing co-reactant. The radical nitrogen- or oxygen-containing co-reactant, such as $NH_3$ or $H_2O$ respectively, is generated in a remote plasma system. The radical co-reactant and the vapor phase of the disclosed compositions are introduced into the reaction chamber where they react and deposit the initially flowable film on the substrate. Applicants believe that the nitrogen atom of the disclosed compounds help to further improve the flowability of the deposited film, resulting in films having less voids than those produced by other precursors. Applicants believe that the films deposited using the disclosed Si-containing film forming compositions in a flowable CVD process with $NH_3$ plasma will produce a SiCN film having desired etching selectivity with respect to silicon oxide films due to the precursor's Si—C—Si backbone providing a film having sufficient C content.

In yet another embodiment, the flowable film can be deposited solely by condensation (Thermal flowable CVD, or T-FCVD) by holding the wafer to a temperature lower than the dew point of the precursor at the partial pressure of the precursor in the chamber. For such applications, having a low vapor pressure precursor (typically <50 torr at room temperature, and even preferably <10 torr at room temperature) is beneficial to facilitate the precursor condensation without chilling the wafer to very low temperature. The substituted or unsubstituted $N(DSP)_3$ and $RN(DSP)_2$ family of molecules have a suitable range of volatility, The cross linking of such films may then be achieved in-situ or ex-situ by one or several of various means, including but not limited to exposure of the deposited film to a reactive gas, to plasma, to photons, to an electron beam, to a neutral particle beam, or to a catalyst. The catalyst may be pre-deposited, co-deposited or post-deposited, and may be activated by means such as heating or photon exposure. Chemically speaking, such cross-linking can be achieved by a variety of chemical reactions ranging from but not restricted to Si—H/N—H $H_2$ elimination, hydrosilylation, silazane formation by condensation of amine groups, siloxane formation by condensation of silanol groups, ring opening polymerisation, and/or dehydrogenative coupling.

Also disclosed are methods of using the disclosed precursors presented in Formula (I) or (II) in coating deposition methods, such as spin coating, spray coating, dip coating or slit coating techniques. To be suitable for coating methods, the disclosed precursors should have a molecular weight ranging from approximately 500 to approximately 1,000,000, preferably from approximately 1,000 to approximately 100,000, and more preferably from approximately 3,000 to approximately 50,000. The disclosed methods provide for the use of the Si-containing film forming composition for deposition of silicon-containing films. The disclosed methods may be useful in the manufacture of semiconductor, photovoltaic, LCD-TFT, optical coatings, or flat panel type devices. The method includes: applying the liquid form of the disclosed Si-containing film forming composition on a substrate and curing to form the Si-containing layer on the substrate.

As discussed previously, the liquid form of the disclosed Si-containing film forming composition may be a neat solution of the precursor or a mixture of the precursor with a volatile solvent and optional cross linking initiators such as radical generators (thermal or photo-initiated) and catalysts. Thermally activated (peroxides or aza compounds) or UV initiated (for instance phenones, or quinones) radical initiators may be included in the Si-containing film forming composition. Catalysts that promote cross linking of the film upon UV activation or/and heating may also be included in the film-forming composition, Such catalysts include photo-acid generators, Lewis acids and typical hydrosilylation catalysts. Among such compounds, $B(C_6F_5)_3$ is a particularly suitable compound, as it is a Lewis acid and a strong dehydrogenative catalyst.

Exemplary coating deposition methods include spin-coating. FIG. 1 provide a flow chart of an exemplary spin-coating process. One of ordinary skill in the art will recognize that fewer or additional steps than those provided in FIG. 1 may be performed without departing from the teachings herein. For example, the characterization step utilized in a R&D setting may not be required in commercial operations. One of ordinary skill in the art will further recognize that the process is preferably performed under an inert atmosphere to prevent undesired oxidation of the film and/or in a clean room to help prevent contamination to prevent particle contamination of the film.

The planar or patterned substrate on which the Si-containing film is to be deposited may be prepared for the deposition process in Steps 1-4. High purity gases and solvents are used in the preparation process. Gases are typically of semiconductor grade and free of particle contamination. For semiconductor usage, solvents should be particle free, typically less than 100 particle/mL (0.5 μm particle, more preferably less than 10 particles/mL) and free of non-volatile residues that would lead to surface contamination. Semiconductor grade solvents having less than 50 ppb metal contamination (for each element, and preferably less than 5 ppb) are advised.

In Step 1, the substrate is sonicated in acetone at room temperature (between approximately 20° C. and approximately 25° C.) for approximately 60 second to approximately 120 seconds, and preferably for approximately 90 seconds. In Step 2, the planar or patterned substrate is sonicated at room temperature in isopropyl acohol (IPA) for approximately 60 second to approximately 120 seconds, and preferably for approximately 90 seconds. One of ordinary skill in the art will recognize that these steps may be performed in the same or different sonicators. Different sonicaters require more equipment, but provide an easier process. The sonicator must be thoroughly cleaned between Step 1 and 2 if used for both to prevent any contamination of the substrate. Exemplary sonicators suitable for the disclosed methods include Leela Electronics Leela Sonic Models 50, 60, 100, 150, 200, 250, or 500 or Branson's B Series, In Step 3, the substrate is removed from the IPA sonicator and rinsed with fresh IPA. In Step 4, the rinsed substrate is dried using an inert gas, such as $N_2$ or Ar. One of ordinary skill in the art will recognize that Steps 1 through 4 provide one exemplary wafer preparation process. Multiple wafer preparation processes exist and may be utilized without departing from the teachings herein. See, e.g., Handbook of Silicon Wafer Cleaning Technology, $3^{rd}$ Edition, 2017 (William Andrew). For example, an UV/ozonation process may be used if a more hydrophilic surface is desired. One of ordinary skill in the art may determine the appropriate wafer preparation process based at least upon the substrate material and degree of cleanliness required.

After this 4 step preparation, the substrate is transferred to the spin coater. Exemplary suitable spin coaters include Brewer Science's Cee® Precision spin coaters, Laurell's 650 series spin coaters, Specialty Coating System's G3 spin coaters, or Tokyo Electron's CLEAN TRACK ACT equipment family. Any of the Si-containing film forming compositions disclosed above, but preferably those of Formula II, are dispensed onto the substrate in Step 5 and the wafer is spun in Step 6. One of ordinary skill in the art will recognize that Step 5 and Step 6 may be performed sequentially (static mode) or concurrently (dynamic mode). Step 5 is performed using a manual or auto-dispensing device (such as a pipette, syringe, or liquid flow meter). When Steps 5 and 6 are performed concurrently, the initial spin rate is slow (i.e., between approximately 5 rpm to approximately 999 rpm, preferably between approximately 5 rpm to approximately 300 rpm). After all of the Si-containing film forming composition is dispensed (i.e., when Step 5 is complete in either static or dynamic mode), the spin rate ranges between approximately 1000 rpm to approximately 4000 rpm. The wafer is spun until a uniform coating is achieved across the substrate, which typically takes between approximately 10 seconds and 3 approximately minutes. Steps 5 and 6 produce a Si-containing film on the wafer. One of ordinary skill in the art will recognize tha thte required duration of the spin coating process, the acceleration rate, the solvent evaporation rate, etc., are adjustable parameters that require optimization for each new formulation in order to obtain the target film thickness and uniformity (see, e.g., University of Louisville, Micro/Nano Technology Center—Spin Coating Theory, October 2013).

After the Si-containing film is formed, the wafer is pre-baked or soft baked in Step 7 to remove any remaining volatile organic components of the Si-containing film forming composition and/or by-products from the spin-coating process. Step 7 may take place in a thermal chamber or on a hot plate at a temperature ranging from approximately 25° C. to approximately 200° C. for a time period ranging from approximately 1 minute to approximately 120 minutes. Exemplary hot plates include Brewer Science's Cee® Model 10 or 11 or Polos' precision bake plates.

In step 8, the the substrate is cured to produce the desired dielectric material. 3 non-limiting options are shown in FIG. 1. Any of the 3 options may be performed using an inert or reactive gas. Exemplary inert gases include $N_2$, Ar, He, KR, Xe, etc. The reactive gas may be used to introduce oxygen, nitrogen, or carbon into the film. Exemplary reactive gases that introduce oxygen into the film include oxygen-containing gases, such as $O_2$, $O_3$, air, $H_2O$, $H_2O_2$, etc. Exemplary reactive gases that introduce nitrogen into the film include nitrogen-containing gases, such as $NH_3$; $NR_3$, wherein R is a C1-C4 hydrocarbon; etc. Exemplary reactive gases that introduce carbon into the film include carbon-containing gases, and specifically unsaturated carbon-containing gases, such as alcenes and alcynes (ethylene, acetylene, propylene, etc.).

In Step 8a, the substrate is subject to thermal curing at a temperature ranging from approximately 101° C. to approximately 1,000° C., preferably from approximately 200° C. to approximately 800° C. under an inert or reactive gas. A furnace or rapid thermal processor may be used to perform the thermal curing process. Exemplary furnaces include the ThermoFisher Lindberg/Blue M™ tube furnace, the Thermo Scientific Thermolyne™ benchtop tube furnace or muffle furnace, the Inseto tabletop quartz tube furnace, the NeyTech Vulcan benchtop furnace, the Tokyo Electron TELINDY™ thermal processing equipment, or the ASM International ADVANCE® vertical furnace. Exemplary rapid thermal processors include Solaris 100, ULVAC RTP-6, or Annealsys As-one 100.

Alternatively, in Step 8b, the substrate is subject to UV-curing at a wavelength ranging from approximately 190 nm to approximately 400 nm using a monochromatic or polychromatic source. Exemplary VUV- or UV-curing systems suitable to perform Step 8b include, but are not limited to, the Nordson Coolwaves® 2 UV curing system, the Heraeus Noblelight Light Hammer® 10 product platform, or the Radium Xeradex® lamp.

In another alternative, both the thermal and UV process may be performed at the same temperature and wavelength criteria specified for Steps 8a and 8b. One of ordinary skill in the art will recognize that the choice of curing methods and conditions will be determined by the target silicon-containing film desired.

In Step 9, the cured film is characterized using standard analytic tools. Exemplary tools include, but are not limited to, ellipsometers, x-ray photoelectron spectroscopy, atomic force microscopy, x-ray fluorescence, fourier-transform infrared spectroscopy, scanning electron microscopy, secondary ion mass spectrometry (SIMS), Rutherford backscattering spectrometry (RBS), profilometer for stress analysis, or combination thereof.

The liquid form of the disclosed Si-containing film forming composition may be applied directly to the center of the substrate and then spread to the entire substrate by spinning or may be applied to the entire substrate by spraying. When applied directly to the center of the substrate, the substrate may be spun to utilize centrifugal forces to evenly distribute the composition over the substrate. Alternatively, the substrate may be dipped in the Si-containing film forming composition. The resulting film may be dried at room temperature for a period of time to vaporize the solvent or volatile components of the film or dried by force-drying or baking or by the use of one or a combination of any following suitable process including thermal curing and irradiations, such as, ion irritation, electron irradiation, UV and/or visible light irradiation, etc.

The disclosed carbosilazane precursors in the Si-containing film forming compositions may prove useful as monomers for the synthesis of carbosilazane containing polymers. The Si-containing film forming compositions may be used to form spin-on dielectric film formulations, for lithographic applications (tone inversion layers for instance), or for anti-reflective films. For example, the disclosed Si-containing film forming compositions may be included in a solvent and applied to a substrate to form a film. If necessary, the substrate may be rotated to evenly distribute the Si-containing film forming composition across the substrate. One of ordinary skill in the art will recognize that the viscosity of the Si-containing film forming compositions will contribute as to whether rotation of the substrate is necessary. The resulting film may be heated under an inert gas, such as Argon, Helium, or nitrogen and/or under reduced pressure. Alternatively, the resulting film may be heated under a reactive gas like $NH_3$ or hydrazine to enhance the connectivity and nitridation of the film. Electron beams or ultraviolet radiation may be applied to the resulting film. The reactive groups of the disclosed carbosilazane or polycarbosilazane precursors (i.e., the direct Si—N, N—H or Si—H bonds) may prove useful to increase the connectivity of the polymer obtained.

The silicon-containing films resulting from the processes discussed above may include $SiO_2$; SiC; SiN; SiON; SiOC; SiONC; SiBN; SiBCN; SiCN; SiMCO, in which M is selected from Zr, Hf, Ti, Nb, V, Ta, Al, Ge, depending of course on the oxidation state of M. One of ordinary skill in the art will recognize that by judicial selection of the appropriate Si-containing film forming composition nd co-reactants, the desired film composition may be obtained.

Upon obtaining a desired film thickness, the film may be subject to further processing, such as thermal annealing, furnace-annealing, rapid thermal annealing, UV or e-beam curing, and/or plasma gas exposure. Those skilled in the art recognize the systems and methods utilized to perform these additional processing steps. For example, the silicon-containing film may be exposed to a temperature ranging from approximately 200° C. and approximately 1000° C. for a time ranging from approximately 0.1 second to approximately 7200 seconds under an inert atmosphere, a H-containing atmosphere, a N-containing atmosphere, or combinations thereof. Most preferably, the temperature is 600° C. for less than 3600 seconds. Even more preferably, the temperature is less than 400° C. The annealing step may be performed in the same reaction chamber in which the deposition process is performed. Alternatively, the substrate may be removed from the reaction chamber, with the annealing/flash annealing process being performed in a separate apparatus. Any of the above post-treatment methods, but especially UV-curing, has been found effective to enhance the connectivity and cross linking of the film. Typically, a combination of thermal annealing to <400° C. (preferably about 100° C.-300° C.) and UV curing is used to obtain the film with the highest density.

EXAMPLES

The following non-limiting examples are provided to further illustrate embodiments of the invention. However, the examples are not intended to be all inclusive and are not intended to limit the scope of the inventions described herein.

Example 1

Syntheses of Starting Materials 1,2-disilapropane (DSP) and 1,3-disilabutane (DSB)

$3LiAlH_4+2SiCl_3CH_2SiCl_3 \rightarrow 2DSP+3LiAlCl_4$
$3LiAlH_4+2SiCl_3CH_2CH_2SiCl_3 \rightarrow 2DSB+3LiAlCl_4$ Lithium aluminium hydride $LiAlH_4$(LAH) was placed into a 4L vessel equipped with a mechanical stirrer under inert atmosphere. The vessel was cooled to −78° C., and then 1L of cold (ca. −30° C.) diglyme ($H_3COC_2H_4OC_2H_4OCH_3$) for DSP or di-nbutyl ether ($H_9C_4OC_4H_9$) for DSB was slowly added to the vessel. The mixture in the vessel was allowed to warm to −10° C. while stirring. 1,2-bis(trichlorosilyl)methane $SiCl_3CH_2SiCl_3$ or 1,2-bis(trichlorosilyl)ethane $SiCl_3CH_2CH_2SiCl_3$ was added dropwise to the warmed mixture, while preventing the reaction mixture from getting warmer than 20° C. After the addition, the mixture was warmed to 25° C. and stirred for 2 hours. The volatile DSP or DSB was condensed into a trap (−78° C.) at 30° C. DSP was isolated in 82% yield, 96% purity shown by Gas Chromatography (GC). DSB was isolated as colorless liquid. Yield 65%, 98.8% purity shown by GC.

Example 2

Figure 2:
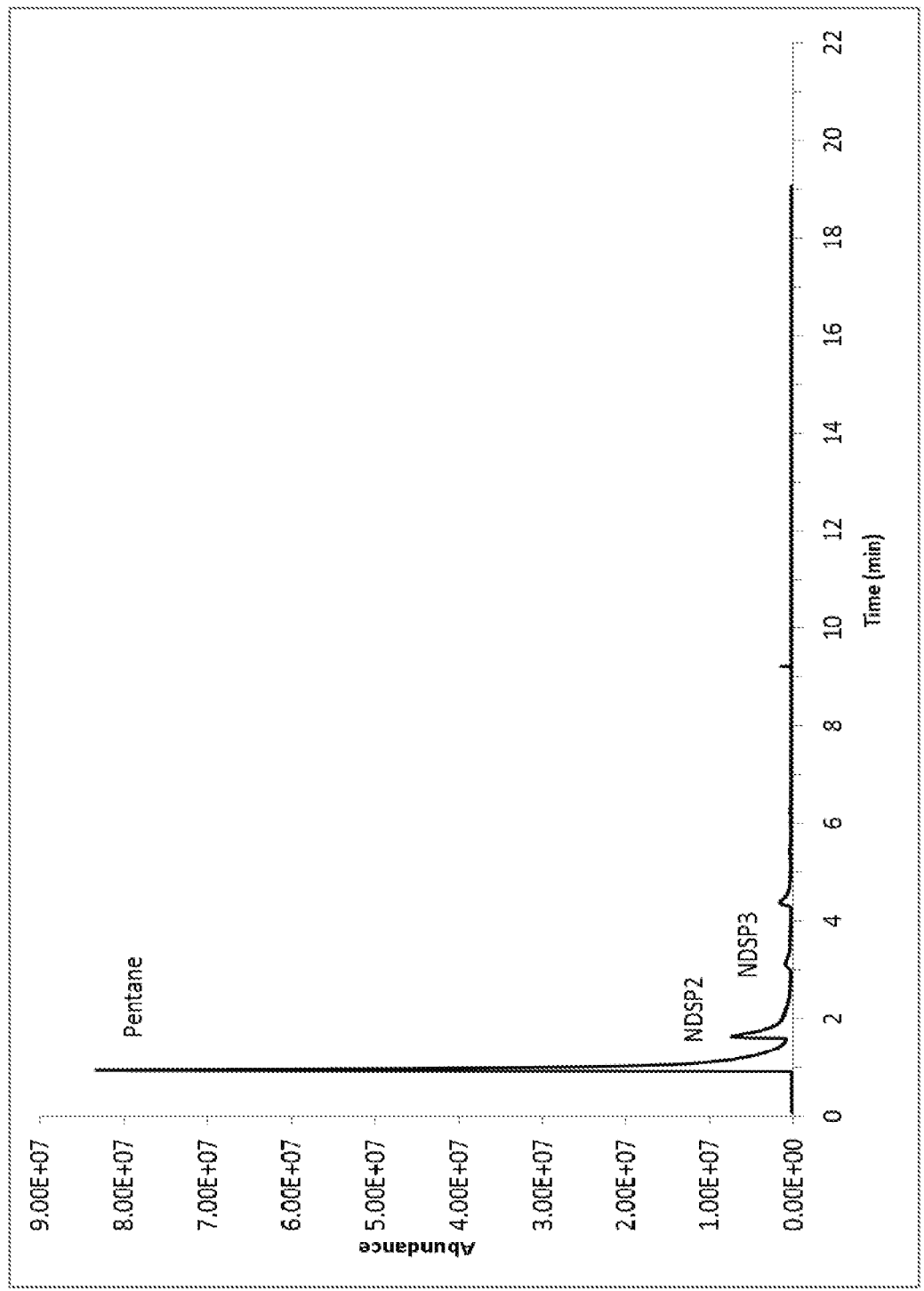
FIG. 2 is a GCMS chromatogram of the final product of the NDSP2 and NDSP3 mixture produced by the halogen-free synthesis route.

Halogen-free route syntheses of bis(disilapropane) amine $HN(SiH_2—CH_2—SiH_3)_2(HN(DSP)_2)$ and tris((silylmethyl)silyl)amine $N(SiH_2—CH_2—SiH_3)_3$ $(N(DSP)_3)$ $H_3Si—CH_2—SiH_3+NH_3 \rightarrow HN(DSP)_2$
$H_3Si—CH_2—SiH_3+NH_3 \rightarrow N(DSP)_3$ Disilapropane and ammonia were catalyzed by Platinum on Carbon in a pressure reactor to produce $HN(DSP)_2$ and $N(DSP)_3$. This is a halogen free route. The 0.3 L autoclave was equipped with a mechanical stirrer, thermocouple, pressure gauge, pressure transducer, and 3 metering valves. 0.5 g; 2.56 mol of Platinum on carbon catalyst was added to the autoclave. The reactor was subsequently heated steadily under dynamic vacuum to 140° C. and held at this temperature for 3 hr. After cooling down to room temperature, the reactor was pressurized with helium (800 torr). Pentane (50 mL) was introduced into the reactor in the glove box. After immersion of the reactor in a liquid nitrogen bath, atmospheric nitrogen was removed under vacuum. Ammonia (3 g, 0.176 mol) and disilapropane (53.7 g, 0.705 mol) were transferred to the reactor. The reactor was then heated to 50° C. After stirring at 457 rpm for 30 hr, a pressure increase of approximately 486 psi was observed after cooling to room temperature. Volatile components of the reactor contents were cryotrapped in a stainless steel lecture bottle (SSLB) down to a pressure of 10 Torr. Analysis of the reactor contents by liquid inject GCMS revealed a 7:1 mixture of $HN(DSP)_2$ and $N(DSP)_3$ together with minor higher boiling components. FIG. 2 is a GCMS spectrum of the final product of the $N(DSP)_2$ and $N(DSP)_3$ mixture produced.

Figure 3:
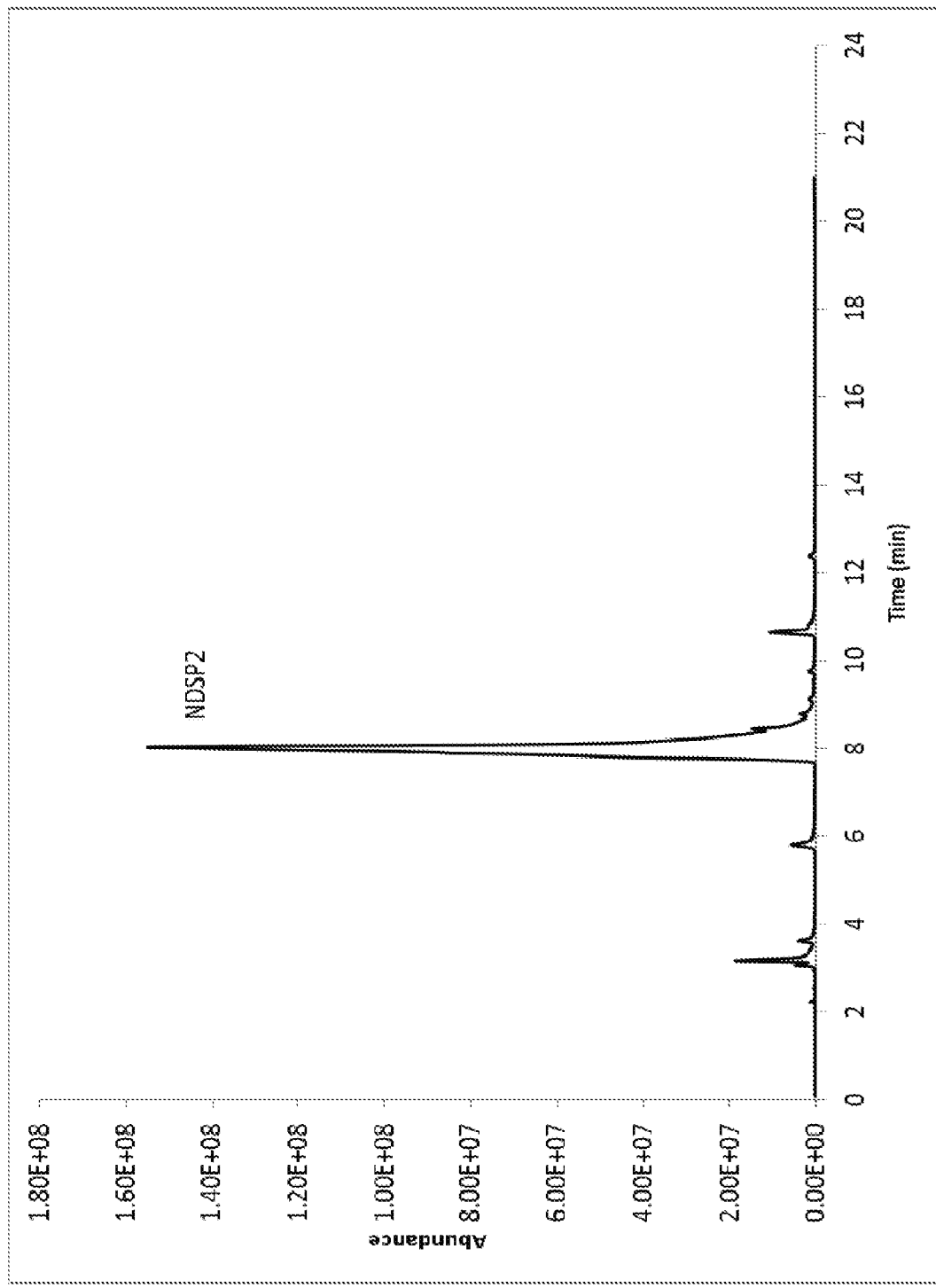
FIG. 3 is a GCMS chromatogram of the final product of the NDSP2 and NDSP3 mixture produced by the halogen-free synthesis route after the 1$^{st}$ fraction of Fractional distillation.
Figure 4:
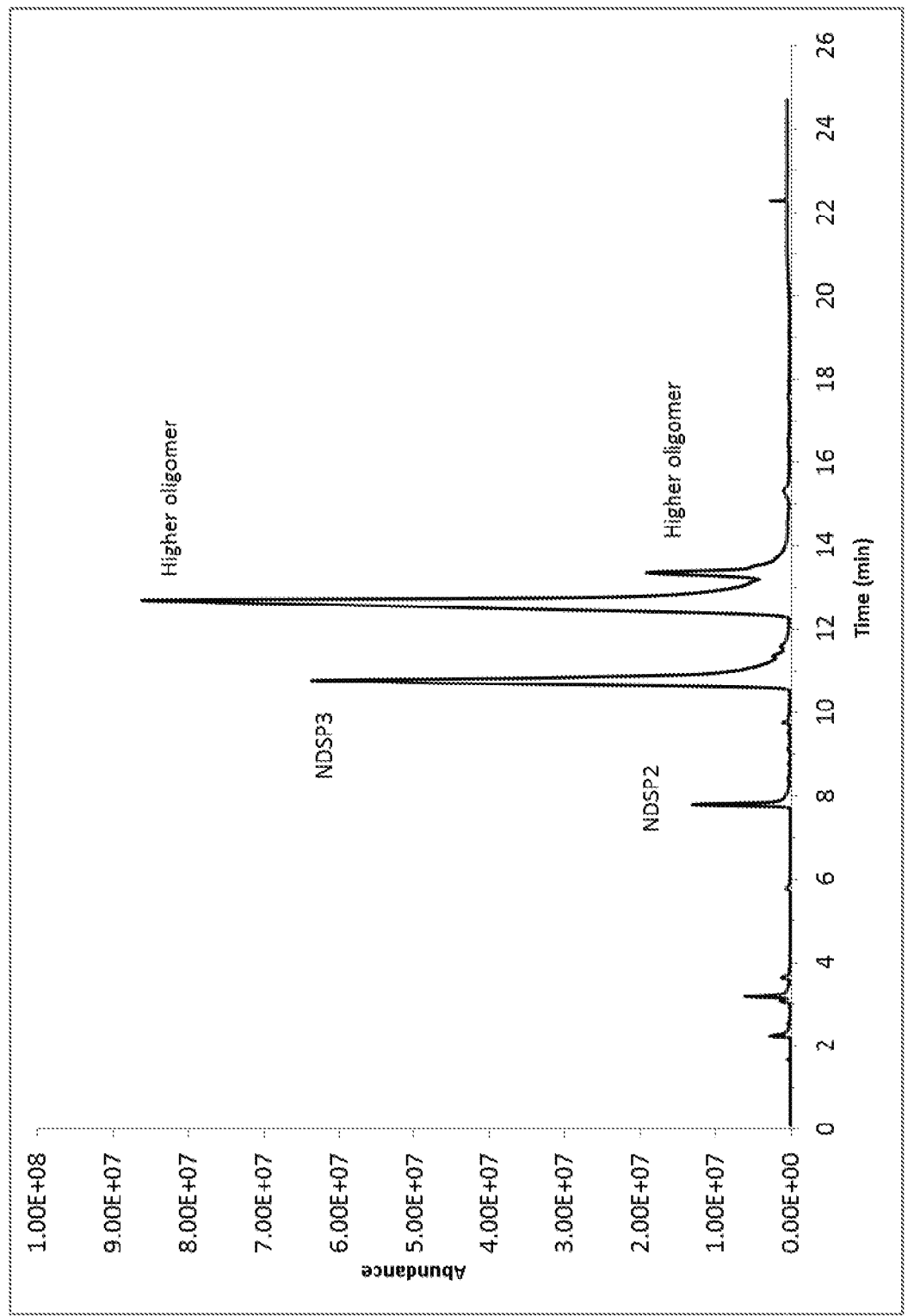
FIG. 4 is a GCMS chromatogram of the mixture of NDSP3 and HNDSP2 produced by the halogen-free synthesis route after the 2$^{nd}$ fraction of Fractional distillation.

The mixture was subject to a vacuum Fractional Distillation. The $1^{st}$ fraction (42° C./153 mtorr) comprised $HN(DSP)_2$(2.05 g, 6%) measured by GCMS. FIG. 3 is a GCMS spectrum of the the $1^{st}$ fraction, showing a $HN(DSP)_2$ and $N(DSP)_3$ mixture. The $2^{nd}$ fraction comprised a 14:1 mixture of $N(DSP)_3$ and $HN(DSP)_2$ together with a higher boiling component (1.48 g) measured by GCMS. FIG. 4 is a GCMS spectrum $2^{nd}$ fraction, showing the mixture of $N(DSP)_3$ and $HN(DSP)_2$.

Example 3

Halogen Free Route Syntheses of NDSP Oligomers [—NH—SiH$_2$—CH$_2$—SiH$_2$—]$_n$ ([—NH-DSP-]$_n$) and [—N(SiH$_2$—CH$_2$—SiH$_3$)—SiH$_2$—CH$_2$—SiH$_2$—]$_n$ ([—N(DSP)-DSP-]$_n$) (n=2 to 400)

$H_3Si$—$CH_2$—$SiH_3$+$NH_3$→HNDSP2→[—NH-DSP-]$_n$ $H_3Si$—$CH_2$—$SiH_3$+$NH_3$→NDSP3→[—N(DSP)-DSP-]$_n$

Synthesis of NDSP oligomer was catalyzed by Platinum on Carbon and performed in a pressure reactor by the reaction between disilapropane and ammonia. The reaction is the same as these systheses of HNDSP2 and NDSP3, which is also a halogen free route. Referring to Example 2, when the reagents in Example 2 were overcooked, colorless viscous oil was left in the distillation pot (7.5 g) after removal of HNDSP2 and NDSP3 from the products by the vacuum Fractional Distillation.

Figure 5:
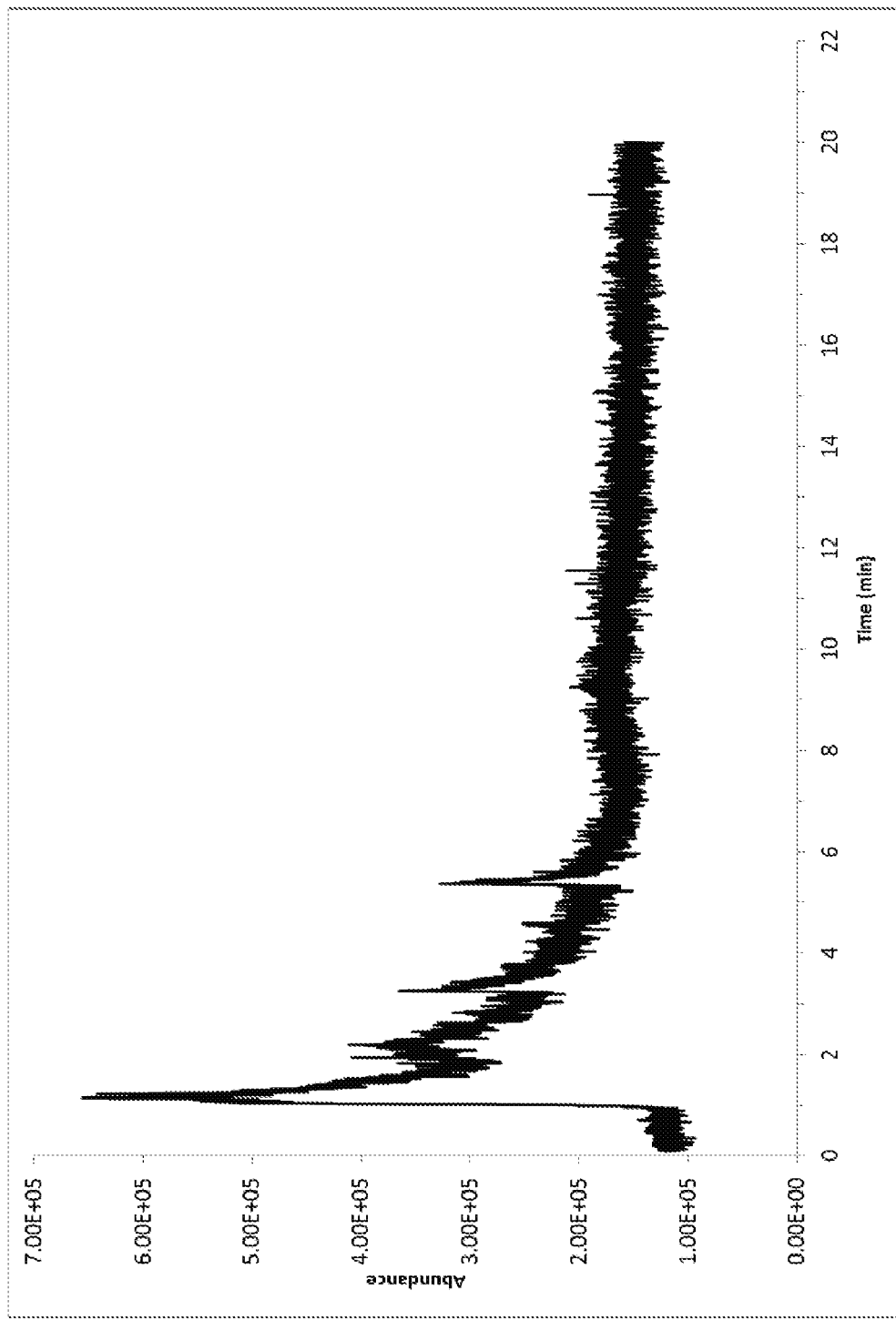
FIG. 5 is a GCMS chromatogram of the colorless viscous oil after removal of HNDSP2 and NDSP3 produced by the halogen-free synthesis route.

FIG. 5 is a GPC spectrum of the colorless viscous oil after removal of HNDSP2 and NDSP3 produced by halogen free route. This viscous oil was analyzed by gel permeation chromatography (GPC) and, as shown in FIG. 5, a distribution ranging from 26,000 to 500 Daltons was evident, showing the major components have high molecular weight oligomers or polymers which are linear or branched oligomer [—NH-DSP-]$_n$ or [—N(DSP)-DSP-]$_n$ formed by DSP. The calculated molecular weight averages and polydispersity index for the oiligomer are shown in Table 2.

TABLE 2 calculated molecular weight averages and polydispersity index of the oilgomer

| Sample ID | | Mn (Daltons) | Mw (Daltons) | Mz (Daltons) | PDI (Mw/Mn) |
|---|---|---|---|---|---|
| SK-586-89-3 | Colorless oil | 1,440 | 2,230 | 3,670 | 1.5 |
| SK586-96-1 | Colorless oil in THF | 8,340 | 95,700 | 1,190,000 | 11.5 |

Example 4

Selective Synthesis of HNDSP2

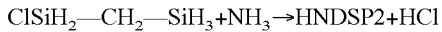
ClSiH$_2$—CH$_2$—SiH$_3$+NH$_3$→HNDSP2+HCl

Figure 6A:
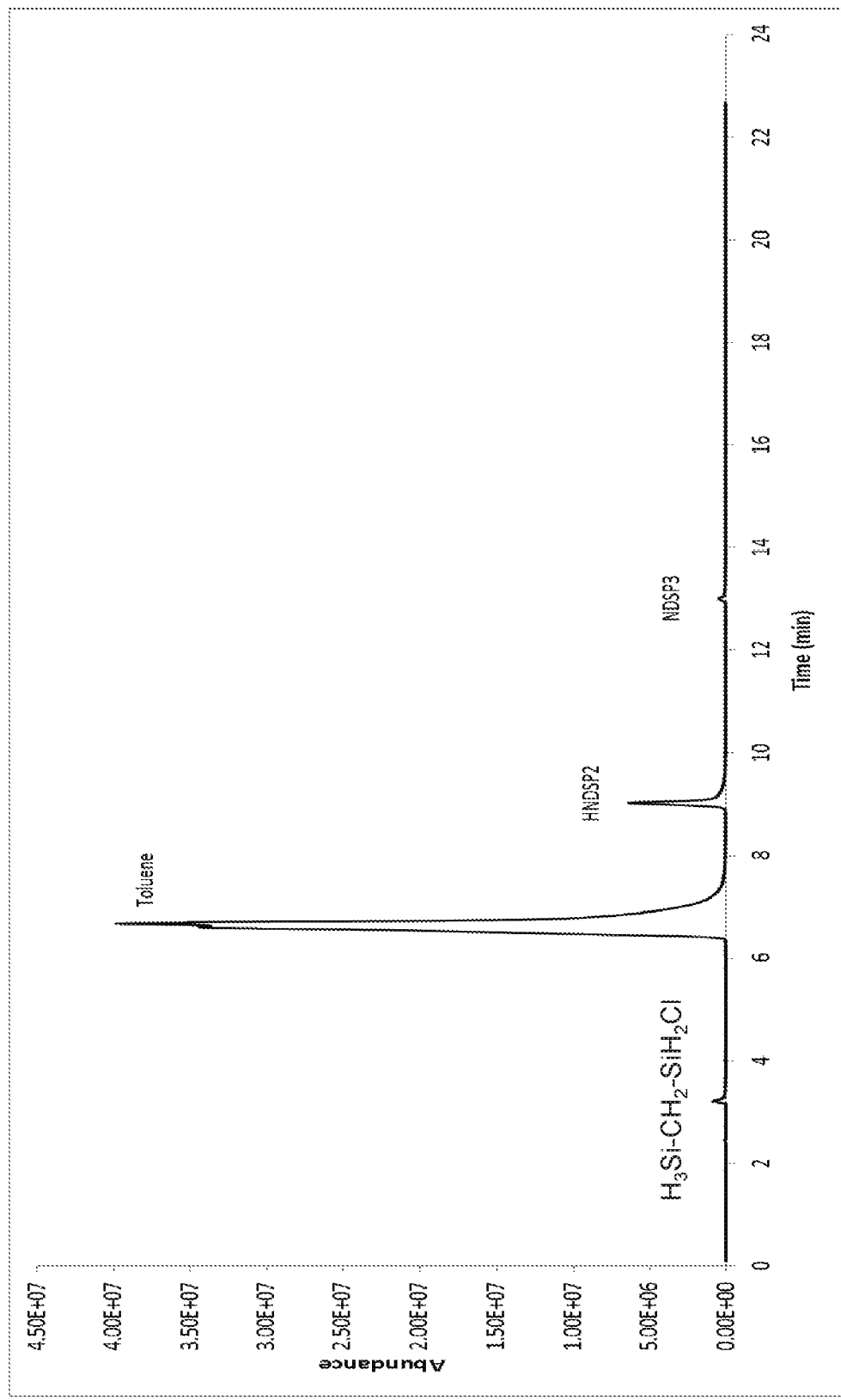
FIG. 6 $a$ and $b$ are GCMS chromatogram of the final product of NDSP2 selectively produced by the halogen involved synthesis route, taken with the final product after 16 hours at room temperature (FIG. 6$a$) and after 8 weeks at room temperature (FIG. 6$b$)
Figure 6B:
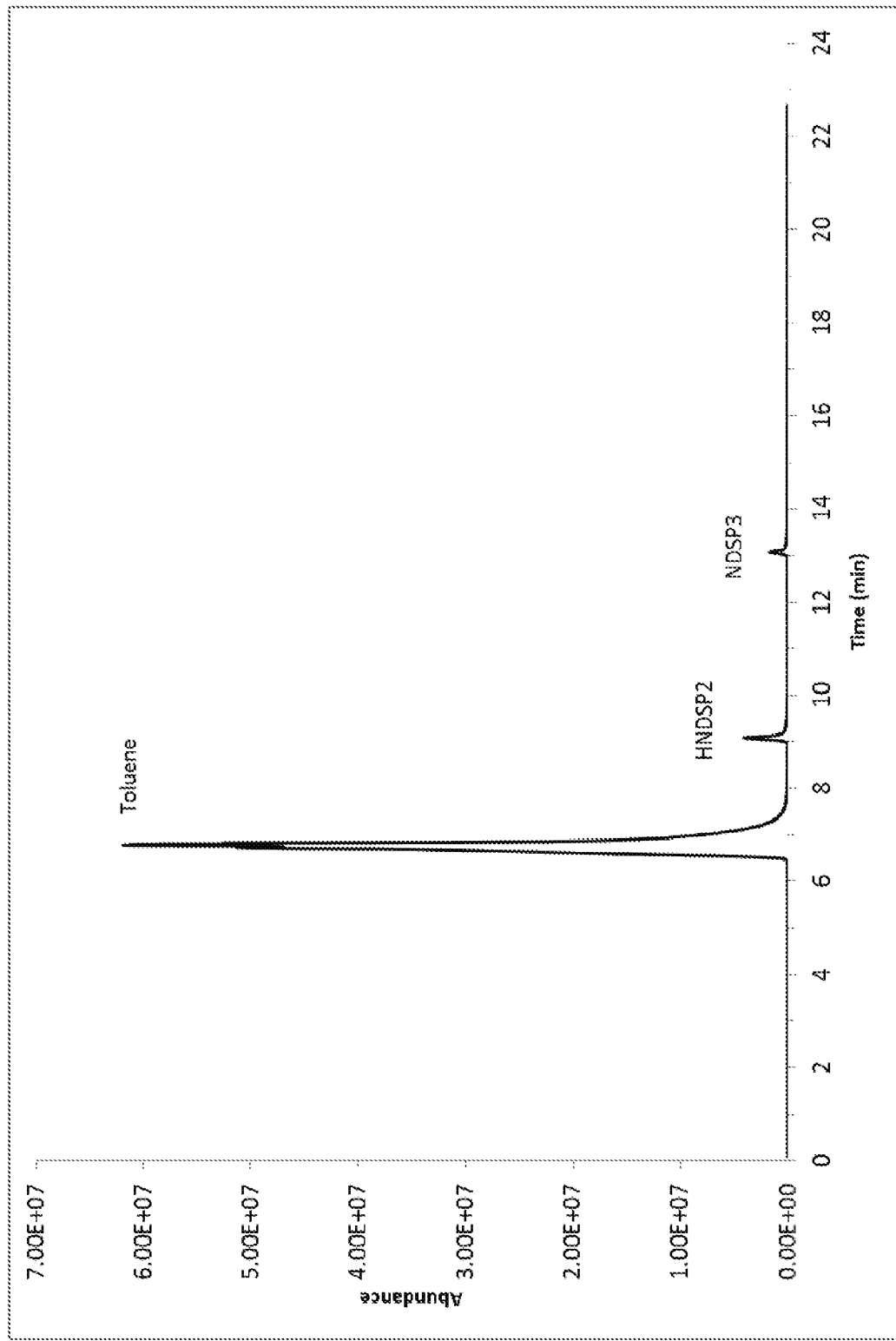

After purging with N$_2$, a two liter 3-neck flask is charged with a non-polar solvent, which was anhydrous toluene in this process. Chlorosilylmethylsilane (DSP-Cl) (53.6 g, 0.48 mol) was added to the flask by dripping into the flask. NH$_3$ (11 g, 0.65 mol) at +5° C. was slowly added by bubbling into the mixture in the flask. After the required amount of NH$_3$ was added, the mixture was warmed to room temperature and stirred for 16 hours. Formation of white solids in a clear liquid was observed. The reaction mixture was then transferred via cannula to a schlenk filter funnel equipped with an air-free filter frit. The filtrate solid was washed with anhydrous toluene for 4 times. FIG. 6a is a GC spectrum of the product after stirring for 16 hours (overnight or ON) at room temperature. FIG. 6b is GC spectrum of the final product after 8 weeks at room temperature. In the figures, CATO represents the reactant DSP-Cl and NDSP3 represents a possible by-product. As shown in FIG. 6a, the final product contains almost 100% HNDSP2 comparing to NDSP3. As shown in FIG. 6b, very little NDSP3 was produced after 8 weeks. Thus, this synthesis method provides the method to selectively produce HNDSP2 without by-product NDSP3.

Example 5

Selective Synthesis of NDSP3

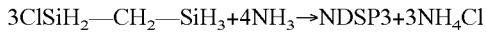
3ClSiH$_2$—CH$_2$—SiH$_3$+4NH$_3$→NDSP3+3NH$_4$Cl

Figure 7:
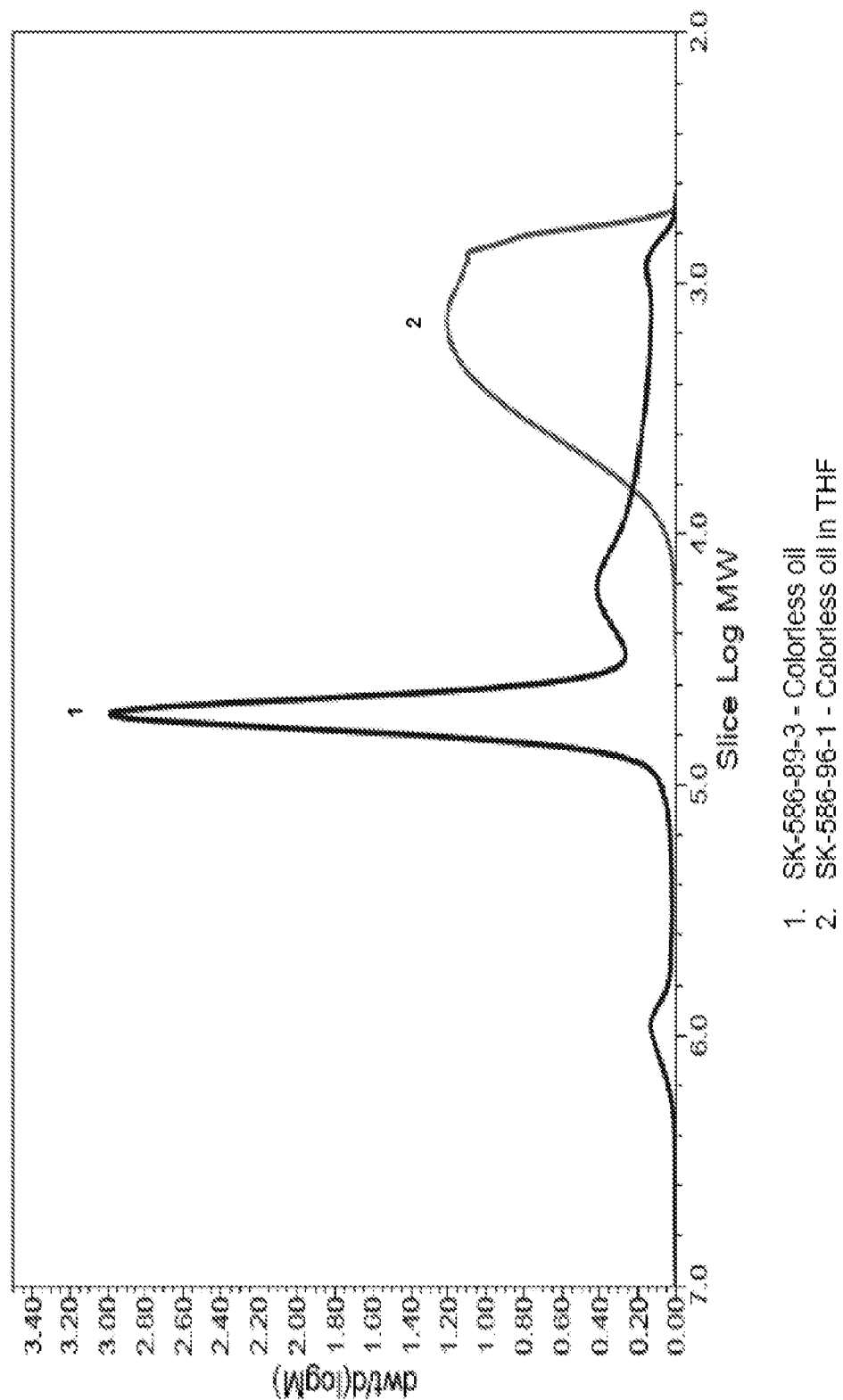
FIG. 7 is a Gel Permation Chromatographic graph showing the molecular weight versus the polydispersity of the molecular weight distribution.

Replacing non-polar solvent toluene with a polar solvent, such as THF, in Example 4, NDSP3 was selectively produced without by-product HNDSP2. (FIG. 7)

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

We claim:

1. A Si-containing film forming composition comprising a linear or branched oligomer or polymer containing a unit having the formula:

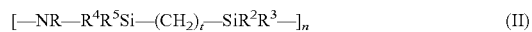
[—NR—R$^4$R$^5$Si—(CH$_2$)$_t$—SiR$^2$R$^3$—]$_n$     (II)

wherein t=1 to 4; n=2 to 400;

R$^2$, R$^3$, R$^4$, and R$^5$ are independently H, a C$_1$ to C$_6$ hydrocarbon, or an alkylamino group having the formula NR"$_2$ and each R" is independently H, a C$_1$-C$_6$ hydrocarbon, a C$_6$-C$_{12}$ aryl, or NR"$_2$ forms a cyclic amine group, and provided that at least one of $R^2$, $R^3$, $R^4$, and $R^5$ is H; and R is H; a $C_1$-$C_6$ hydrocarbon; a silyl group having the formula $Si_xR'_{2x+1}$, with x=1 to 4 and each R' is independently H, a $C_1$-$C_6$ hydrocarbon group, or an alkylamino group having the formula $NR''_2$ and each R" is independently H, a $C_1$-$C_6$ group, a $C_6$-$C_{12}$ aryl, or $NR''_2$ forms a cyclic amine group; or a $R^{1'}R^{2'}Si(CH_2)_bSi R^{3'}R^{4'}R^{5'}$ group, with b=1 to 2 and $R^{1'}$, $R^{2'}$, $R^{3'}$, $R^{4'}$, and $R^{5'}$ are independently a H, a $C_1$-$C_6$ hydrocarbon, a $C_6$-$C_{12}$ aryl, or an alkylamino group having the formula $NR''_2$ and each R" is independently H, a $C_1$-$C_6$ group, a $C_6$-$C_{12}$ aryl, or $NR''_2$ forms a cyclic amine group; and provided that at least one of $R^{1'}$, $R^{2'}$, $R^{3'}$, $R^{4'}$, and $R^{5'}$ is H; and further wherein the oligomer or polymer has a molecular weight of 500 to 1,000,000 daltons.

2. The Si-containing film forming composition of claim 1, wherein the linear or branched oligomer or polymer contains a unit having the formula $[-NH-SiH_2-(CH_2)_t-SiH_2-]_n$, with t=1-2.

3. The Si-containing film forming composition of claim 1, wherein the linear or branched oligomer or polymer contains a unit having a formula selected from the group consisting of:
$[-N(SiH_3)-SiH_2-(CH_2)_t-SiH_2-]_n$,
$[-N(Si_2H_5)-SiH_2-(CH_2)_t-SiH_2-]_n$,
$[-N(Si_3H_7)-SiH_2-(CH_2)_t-SiH_2-]_n$, and
$[-N(Si_4H_9)-SiH_2-(CH_2)_t-SiH_2-]_n$, with t=1-2.

4. The Si-containing film forming composition of claim 1, wherein the linear or branched oligomer or polymer contains a unit having a formula selected from the group consisting of
$[-N(Si(Me)_3)-SiH_2-(CH_2)_t-SiH_2-]_n$,
$[-N(Si(Et)_3)-SiH_2-(CH_2)_t-SiH_2-]_n$,
$[-N(Si(iPr)_3)-SiH_2-(CH_2)_t-SiH_2-]_n$,
$[-N(Si(nPr)_3)-SiH_2-(CH_2)_t-SiH_2-]_n$,
$[-N(Si(Bu)_3)-SiH_2-(CH_2)_t-SiH_2-]_n$,
$[-N(Si(iBu)_3)-SiH_2-(CH_2)_t-SiH_2-]_n$,
$[-N(Si(tBu)_3)-SiH_2-(CH_2)_t-SiH_2-]_n$,
$[-N(Si(amyl)_3)-SiH_2-(CH_2)_t-SiH_2-]_n$,
$[-N(Si(hexyl)_3)-SiH_2-(CH_2)_t-SiH_2-]_n$,
$[-N(SiH(Me)_2)-SiH_2-(CH_2)_t-SiH_2-]_n$,
$[-N(SiH(Et)_2)-SiH_2-(CH_2)_t-SiH_2-]_n$,
$[-N(SiH(iPr)_2)-SiH_2-(CH_2)_t-SiH_2-]_n$,
$[-N(SiH(nPr)_2)-SiH_2-(CH_2)_t-SiH_2-]_n$,
$[-N(SiH(Bu)_2)-SiH_2-(CH_2)_t-SiH_2-]_n$,
$[-N(SiH(iBu)_2)-SiH_2-(CH_2)_t-SiH_2-]_n$,
$[-N(SiH(tBu)_2)-SiH_2-(CH_2)t-SiH_2-]_n$,
$[-N(SiH(amyl)_2)-SiH_2-(CH_2)_t-SiH_2-]_n$,
$[-N(SiH(hexyl)_2)-SiH_2-(CH_2)_t-SiH_2-]_n$,
$[-N(SiH_2(Me))-SiH_2-(CH_2)_t-SiH_2-]_n$,
$[-N(SiH_2(Et))-SiH_2-(CH_2)_t-SiH_2-]_n$,
$[-N(SiH_2(iPr))-SiH_2-(CH_2)_t-SiH_2-]_n$,
$[-N(SiH_2(nPr))-SiH_2-(CH_2)_t-SiH_2-]_n$,
$[-N(SiH_2(nBu))-SiH_2-(CH_2)_t-SiH_2-]_n$,
$[-N(SiH_2(iBu))-SiH_2-(CH_2)_t-SiH_2-]_n$,
$[-N(SiH_2(tBu))-SiH_2-(CH_2)_t-SiH_2-]_n$,
$[-N(SiH_2(amyl))-SiH_2-(CH_2)_t-SiH_2-]_n$, and
$[-N(SiH_2(hexyl))-SiH_2-(CH_2)_t-SiH_2-]_n$, with t=1-2.

5. The Si-containing film forming composition of claim 1, wherein the linear or branched oligomer or polymer contains a unit having a formula selected from the group consisting of
$[-N(SiH_2-CH_2-SiH_3)-SiH_2-(CH_2)_t-SiH_2-]_n$,
$[-N(SiMe_2-CH_2-CH_2-SiMe_3)-SiH_2-(CH_2)_t-SiH_2-]_n$,
$[-N(SiEt_2-CH_2-SiEt_3)-SiH_2-(CH_2)_t-SiH_2-]_n$, and
$[-N(SiEt_2-CH_2-CH_2-SiEt_3)-SiH_2-(CH_2)_t-SiH_2-]_n$, with t=1-2.

6. The Si-containing film forming composition of claim 1, wherein the linear or branched oligomer or polymer contains a unit having a formula selected from the group consisting of
$[-N(Me)-SiH_2-(CH_2)_t-SiH_2-]_n$,
$[-N(Et)-SiH_2-(CH_2)_t-SiH_2-]_n$,
$[-N(iPr)-SiH_2-(CH_2)_t-SiH_2-]_n$,
$[-N(nPr)-SiH_2-(CH_2)_t-SiH_2-]_n$,
$[-N(Bu)-SiH_2-(CH_2)_t-SiH_2-]_n$,
$[-N(iBu)-SiH_2-(CH_2)_t-SiH_2-]_n$,
$[-N(tBu)-SiH_2-(CH_2)_t-SiH_2-]_n$,
$[-N(amyl)-SiH_2-(CH_2)_t-SiH_2-]_n$, and
$[-N(hexyl)-SiH_2-(CH_2)_t-SiH_2-]_n$, with t=1-2.

7. The Si-containing film forming composition of claim 1, wherein the linear or branched oligomer or polymer contains a unit having a formula selected from the group consisting of
$[-N(SiH_2NMe_2)-SiH_2-(CH_2)_t-SiH_2-]_n$,
$[-N(SiH_2NEt_2)-SiH_2-(CH_2)_t-SiH_2-]_n$,
$[-N(SiH_2NiPr_2)-SiH_2-(CH_2)_t-SiH_2-]_n$,
$[-N(SiH_2NnPr_2)-SiH_2-(CH_2)_t-SiH_2-]_n$,
$[-N(SiH_2NMeEt)-SiH_2-(CH_2)_t-SiH_2-]_n$,
$[-N(SiH(NMe_2)_2)-SiH_2-(CH_2)_t-SiH_2-]_n$, and
$[-N(SiH(NEt_2)_2)-SiH_2-(CH_2)_t-SiH_2-]_n$, with t=1-2.

8. The Si-containing film forming composition of claim 1, wherein the oligomer or polymer has a molecular weight of 1,000 to 100,000 daltons.

9. The Si-containing film forming composition of claim 1, wherein the oligomer or polymer has a molecular weight of 3,000 to 50,000 daltons.

10. The Si-containing film forming composition of claim 1, wherein the linear or branched oligomer or polymer contains a unit having a formula selected from the group consisting of
$[-NH-SiH_2-(CH_2)_t-SiH(CH=CH_2)-]_n$,
$[-NH-SiH_2-(CH_2)_t-SiH(CH_2-CH=CH_2)-]_n$,
$[-NH-SiH_2-(CH_2)_t-SiH(NH_2)-]_n$,
$[-NH-SiH_2-(CH_2)_t-SiH(NMe_2)-]_n$,
$[-NH-SiH_2-(CH_2)_t-SiH(NMeEt)-]_n$,
$[-NH-SiH_2-(CH_2)_t-SiH(NEt_2)-]_n$,
$[-NH-SiH_2-(CH_2)_t-SiH(NnPr_2)-]_n$,
$[-NH-SiH_2-(CH_2)_t-SiH(NiPr_2)-]_n$,
$[-NH-SiH_2-(CH_2)_t-SiH(NnBu_2)-]_n$,
$[-NH-SiH_2-(CH_2)_t-SiH(NiBu_2)-]_n$,
$[-NH-SiH_2-(CH_2)_t-SiH(NtBu_2)-]_n$,
$[-NH-SiH_2-(CH_2)_t-SiH(NAmyl_2)-]_n$,
$[-NH-SiH_2-(CH_2)_t-SiH(Ncyclopentyl_2)-]_n$,
$[-NH-SiH_2-(CH_2)_t-SiH(Nhexyl_2)-]_n$,
$[-NH-SiH_2-(CH_2)_t-SiH(Ncyclohexyl_2)-]_n$,
$[-NH-SiH_2-(CH_2)_t-SiH(NMeH)-]_n$,
$[-NH-SiH_2-(CH_2)_t-SiH(NEtH)-]_n$,
$[-NH-SiH_2-(CH_2)_t-SiH(NnPrH)-]_n$,
$[-NH-SiH_2-(CH_2)_t-SiH(NiPrH)-]_n$,
$[-NH-SiH_2-(CH_2)_t-SiH(NnBuH)-]_n$,
$[-NH-SiH_2-(CH_2)_t-SiH(NiBuH)-]_n$,
$[-NH-SiH_2-(CH_2)_t-SiH(NtBuH)-]_n$, and
$[-NH-SiH_2-(CH_2)_t-SiH(NAmylH)-]_n$.

11. The Si-containing film forming composition of claim 1, wherein the linear or branched oligomer or polymer contains a unit having a formula selected from the group

[—NH—SiH$_2$—(CH$_2$)$_t$—Si(CH=CH$_2$)$_2$—]$_n$,
[—NH—SiH$_2$—(CH$_2$)$_t$—Si(CH$_2$—CH=CH$_2$)$_2$—]$_n$,
[—NH—SiH$_2$—(CH$_2$)$_t$—Si(NH$_2$)$_2$—]$_n$,
[—NH—SiH$_2$—(CH$_2$)$_t$—Si(NMe$_2$)$_2$-]$_n$,
[—NH—SiH$_2$—(CH$_2$)$_t$—Si(NMeEt)$_2$-]$_n$,
[—NH—SiH$_2$—(CH$_2$)$_t$—Si(NEt$_2$)$_2$-]$_n$,
[—NH—SiH$_2$—(CH$_2$)$_t$—Si(NnPr$_2$)$_2$-]$_n$,
[—NH—SiH$_2$—(CH$_2$)$_t$—Si(NiPr$_2$)$_2$-]$_n$,
[—NH—SiH$_2$—(CH$_2$)$_t$—Si(NnBu$_2$)$_2$-]$_n$,
[—NH—SiH$_2$—(CH$_2$)$_t$—Si(NiBu$_2$)$_2$-]$_n$,
[—NH—SiH$_2$—(CH$_2$)$_t$—Si(NtBu$_2$)$_2$-]$_n$,
[—NH—SiH$_2$—(CH$_2$)$_t$—Si(NAmyl$_2$)$_2$-]$_n$,
[—NH—SiH$_2$—(CH$_2$)$_t$—Si(Ncyclopentyl$_2$)$_2$-]$_n$,
[—NH—SiH$_2$—(CH$_2$)$_t$—Si(Si(Nhexyl$_2$)$_2$-]$_n$,
[—NH—SiH$_2$—(CH$_2$)$_t$—Si(Ncyclohexyl$_2$)$_2$-]$_n$,
[—NH—SiH$_2$—(CH$_2$)$_t$—Si(NMeH)$_2$—]$_n$,
[—NH—SiH$_2$—(CH$_2$)$_t$—Si(NEtH)$_2$—]$_n$,
[—NH—SiH$_2$—(CH$_2$)$_t$—Si(NnPrH)$_2$—]$_n$,
[—NH—SiH$_2$—(CH$_2$)$_t$—Si(NiPrH)$_2$—]$_n$,
[—NH—SiH$_2$—(CH$_2$)$_t$—Si(NnBuH)$_2$—]$_n$,
[—NH—SiH$_2$—(CH$_2$)$_t$—Si(NiBuH)$_2$—]$_n$,
[—NH—SiH$_2$—(CH$_2$)$_t$—Si(NtBuH)$_2$—]$_n$, and
[—NH—SiH$_2$—(CH$_2$)$_t$—Si(NAmylH)$_2$—]$_n$.

12. The Si-containing film forming composition of claim 1, wherein the linear or branched oligomer or polymer contains a unit having a formula selected from the group consisting of
[—NH—SiH(CH=CH$_2$)—(CH$_2$)$_t$—SiH(CH=CH$_2$)—]$_n$,
[—NH—SiH(CH$_2$—CH=CH$_2$)—(CH$_2$)$_t$—SiH(CH$_2$—CH=CH$_2$)—]$_n$,
[—NH—SiH(NH$_2$)—(CH$_2$)$_t$—SiH(NH$_2$)—]$_n$,
[—NH—SiH(NMe$_2$)-(CH$_2$)$_t$—SiH(NMe$_2$)-]$_n$,
[—NH—SiH(NMeEt)-(CH$_2$)$_t$—SiH(NMeEt)-]$_n$,
[—NH—SiH(NEt$_2$)-(CH$_2$)$_t$—SiH(NEt$_2$)-]$_n$,
[—NH—SiH(NnPr$_2$)-(CH$_2$)$_t$—SiH(NnPr$_2$)-]$_n$,
[—NH—SiH(NiPr$_2$)-(CH$_2$)$_t$—SiH(NiPr$_2$)-]$_n$,
[—NH—SiH(NnBu$_2$)-(CH$_2$)$_t$—SiH(NnBu$_2$)-]$_n$,
[—NH—SiH(NiBu$_2$)-(CH$_2$)$_t$—SiH(NiBu$_2$)-]$_n$,
[—NH—SiH(NtBu$_2$)-(CH$_2$)$_t$—SiH(NtBu$_2$)-]$_n$,
[—NH—SiH(NAmyl$_2$)-(CH$_2$)$_t$—SiH(NAmyl$_2$)-]$_n$,
[—NH—SiH(Ncyclopentyl$_2$)-(CH$_2$)$_t$—SiH(Ncyclopentyl$_2$)-]$_n$,
[—NH—SiH(Nhexyl$_2$)-(CH$_2$)$_t$—SiH(Nhexyl$_2$)-]$_n$,
[—NH—SiH(Ncyclohexyl$_2$)-(CH$_2$)$_t$—SiH(Ncyclohexyl$_2$)-]$_n$,
[—NH—SiH(NMeH)—(CH$_2$)$_t$—SiH(NMeH)—]$_n$,
[—NH—SiH(NEtH)—(CH$_2$)$_t$—SiH(NEtH)—]$_n$,
[—NH—SiH(NnPrH)—(CH$_2$)$_t$—SiH(NnPrH)—]$_n$,
[—NH—SiH(NiPrH)—(CH$_2$)$_t$—SiH(NiPrH)—]$_n$,
[—NH—SiH(NnBuH)—(CH$_2$)$_t$—SiH(NnBuH)—]$_n$,
[—NH—SiH(NiBuH)—(CH$_2$)$_t$—SiH(NiBuH)—]$_n$,
[—NH—SiH(NtBuH)—(CH$_2$)$_t$—SiH(NtBuH)—]$_n$, and
[—NH—SiH(NAmylH)—(CH$_2$)$_t$—SiH(NAmylH)—]$_n$.

13. A method of forming a Si-containing film on a substrate, the method comprising forming a solution comprising the Si-containing film forming composition of claim 1; and contacting the solution with the substrate via a spin coating, spray coating, dip coating, or slit coating technique to form the Si-containing film.

14. The method of claim 13, wherein the linear or branched oligomer or polymer contains a unit having the formula [—NH—SiH$_2$—(CH$_2$)$_t$—SiH$_2$—]$_n$, with t=1-2.

15. The method of claim 13, wherein the linear or branched oligomer or polymer contains a unit having a formula selected from the group consisting of:
[—N(SiH$_3$)—SiH$_2$—(CH$_2$)$_t$—SiH$_2$—]$_n$,
[—N(Si$_2$H$_5$)—SiH$_2$—(CH$_2$)$_t$—SiH$_2$—]$_n$,
[—N(Si$_3$H$_7$)—SiH$_2$—(CH$_2$)$_t$—SiH$_2$—]$_n$, and
[—N(Si$_4$H$_9$)—SiH$_2$—(CH$_2$)$_t$—SiH$_2$—]$_n$, with t=1-2.

16. The method of claim 13, wherein the linear or branched oligomer or polymer contains a unit having a formula selected from the group consisting of
[—N(Si(Me)$_3$)-SiH$_2$—(CH$_2$)$_t$—SiH$_2$—]$_n$,
[—N(Si(Et)$_3$)-SiH$_2$—(CH$_2$)$_t$—SiH$_2$—]$_n$,
[—N(Si(iPr)$_3$)-SiH$_2$—(CH$_2$)$_t$—SiH$_2$—]$_n$,
[—N(Si(nPr)$_3$)-SiH$_2$—(CH$_2$)$_t$—SiH$_2$—]$_n$,
[—N(Si(nBu)$_3$)-SiH$_2$—(CH$_2$)$_t$—SiH$_2$—]$_n$,
[—N(Si(iBu)$_3$)-SiH$_2$—(CH$_2$)$_t$—SiH$_2$—]$_n$,
[—N(Si(tBu)$_3$)-SiH$_2$—(CH$_2$)$_t$—SiH$_2$—]$_n$,
[—N(Si(amyl)$_3$)-SiH$_2$—(CH$_2$)$_t$—SiH$_2$—]$_n$,
[—N(Si(hexyl)$_3$)-SiH$_2$—(CH$_2$)$_t$—SiH$_2$—]$_n$,
[—N(SiH(Me)$_2$)-SiH$_2$—(CH$_2$)$_t$—SiH$_2$—]$_n$,
[—N(SiH(Et)$_2$)-SiH$_2$—(CH$_2$)$_t$—SiH$_2$—]$_n$,
[—N(SiH(iPr)$_2$)-SiH$_2$—(CH$_2$)$_t$—SiH$_2$—]$_n$,
[—N(SiH(nPr)$_2$)-SiH$_2$—(CH$_2$)$_t$—SiH$_2$—]$_n$,
[—N(SiH(nBu)$_2$)-SiH$_2$—(CH$_2$)$_t$—SiH$_2$—]$_n$,
[—N(SiH(iBu)$_2$)-SiH$_2$—(CH$_2$)$_t$—SiH$_2$—]$_n$,
[—N(SiH(tBu)$_2$)-SiH$_2$—(CH$_2$)$_t$—SiH$_2$—]$_n$,
[—N(SiH(amyl)$_2$)-SiH$_2$—(CH$_2$)$_t$—SiH$_2$—]$_n$,
[—N(SiH(hexyl)$_2$)-SiH$_2$—(CH$_2$)$_t$—SiH$_2$—]$_n$,
[—N(SiH$_2$(Me))-SiH$_2$—(CH$_2$)$_t$—SiH$_2$—]$_n$,
[—N(SiH$_2$(Et))-SiH$_2$—(CH$_2$)$_t$—SiH$_2$—]$_n$,
[—N(SiH$_2$(iPr))-SiH$_2$—(CH$_2$)$_t$—SiH$_2$—]$_n$,
[—N(SiH$_2$(nPr))-SiH$_2$—(CH$_2$)$_t$—SiH$_2$—]$_n$,
[—N(SiH$_2$(nBu))-SiH$_2$—(CH$_2$)$_t$—SiH$_2$—]$_n$,
[—N(SiH$_2$(iBu))-SiH$_2$—(CH$_2$)$_t$—SiH$_2$—]$_n$,
[—N(SiH$_2$(tBu))-SiH$_2$—(CH$_2$)$_t$—SiH$_2$—]$_n$,
[—N(SiH$_2$(amyl))-SiH$_2$—(CH$_2$)$_t$—SiH$_2$—]$_n$, and
[—N(SiH$_2$(hexyl))-SiH$_2$—(CH$_2$)$_t$—SiH$_2$—]$_n$, with t=1-2.

17. The method of claim 13, wherein the linear or branched oligomer or polymer contains a unit having a formula selected from the group consisting of
[—N(SiH$_2$—CH$_2$—SiH$_3$)—SiH$_2$—(CH$_2$)$_t$—SiH$_2$—]$_n$,
[—N(SiMe$_2$—CH$_2$—CH$_2$—SiMe$_3$)—SiH$_2$—(CH$_2$)$_t$—SiH$_2$—]$_n$,
[—N(SiEt$_2$—CH$_2$—SiEt$_3$)—SiH$_2$—(CH$_2$)$_t$—SiH$_2$—]$_n$, and
[—N(SiEt$_2$—CH$_2$—CH$_2$—SiEt$_3$)—SiH$_2$—(CH$_2$)$_t$—SiH$_2$—]$_n$, with t=1-2.

18. The method of claim 13, wherein the linear or branched oligomer or polymer contains a unit having a formula selected from the group consisting of
[—N(Me)-SiH$_2$—(CH$_2$)$_t$—SiH$_2$—]$_n$,
[—N(Et)-SiH$_2$—(CH$_2$)$_t$—SiH$_2$—]$_n$,
[—N(iPr)-SiH$_2$—(CH$_2$)$_t$—SiH$_2$—]$_n$,
[—N(nPr)-SiH$_2$—(CH$_2$)$_t$—SiH$_2$—]$_n$,
[—N(nBu)-SiH$_2$—(CH$_2$)$_t$—SiH$_2$—]$_n$,
[—N(iBu)-SiH$_2$—(CH$_2$)$_t$—SiH$_2$—]$_n$,
[—N(tBu)-SiH$_2$—(CH$_2$)$_t$—SiH$_2$—]$_n$,
[—N(amyl)-SiH$_2$—(CH$_2$)$_t$—SiH$_2$—]$_n$, and
[—N(hexyl)-SiH$_2$—(CH$_2$)$_t$—SiH$_2$—]$_n$, with t=1-2.

19. The method of claim 13, wherein the linear or branched oligomer or polymer contains a unit having a formula selected from the group consisting of
[—N(SiH$_2$NMe$_2$)-SiH$_2$—(CH$_2$)$_t$—SiH$_2$—]$_n$,
[—N(SiH$_2$NEt$_2$)-SiH$_2$—(CH$_2$)$_t$—SiH$_2$—]$_n$,
[—N(SiH$_2$NiPr$_2$)-SiH$_2$—(CH$_2$)$_t$—SiH$_2$—]$_n$,
[—N(SiH$_2$NnPr$_2$)-SiH$_2$—(CH$_2$)$_t$—SiH$_2$—]$_n$,
[—N(SiH$_2$NMeEt)-SiH$_2$—(CH$_2$)$_t$—SiH$_2$—]$_n$,
[—N(SiH(NMe$_2$)$_2$)-SiH$_2$—(CH$_2$)$_t$—SiH$_2$—]$_n$, and
[—N(SiH(NEt$_2$)$_2$)-SiH$_2$—(CH$_2$)$_t$—SiH$_2$—]$_n$, with t=1-2.

20. The method of forming a Si-containing film on a substrate of claim 13, wherein the oligomer or polymer has a molecular weight of 1,000 to 100,000 daltons.

21. The method of forming a Si-containing film on a substrate of claim 13, wherein the oligomer or polymer has a molecular weight of 3,000 to 50,000 daltons.

22. The method of claim 13, wherein the linear or branched oligomer or polymer contains a unit having a formula selected from the group consisting of

[—NH—SiH$_2$—(CH$_2$)$_t$—SiH(CH=CH$_2$)—]$_n$,
[—NH—SiH$_2$—(CH$_2$)$_t$—SiH(CH$_2$—CH=CH$_2$)—]$_n$,
[—NH—SiH$_2$—(CH$_2$)$_t$—SiH(NH$_2$)—]$_n$,
[—NH—SiH$_2$—(CH$_2$)$_t$—SiH(NMe$_2$)-]$_n$,
[—NH—SiH$_2$—(CH$_2$)$_t$—SiH(NMeEt)-]$_n$,
[—NH—SiH$_2$—(CH$_2$)$_t$—SiH(NEt$_2$)-]$_n$,
[—NH—SiH$_2$—(CH$_2$)$_t$—SiH(NnPr$_2$)-]$_n$,
[—NH—SiH$_2$—(CH$_2$)$_t$—SiH(NiPr$_2$)-]$_n$,
[—NH—SiH$_2$—(CH$_2$)$_t$—SiH(NnBu$_2$)-]$_n$,
[—NH—SiH$_2$—(CH$_2$)$_t$—SiH(NiBu$_2$)-]$_n$,
[—NH—SiH$_2$—(CH$_2$)$_t$—SiH(NtBu$_2$)-]$_n$,
[—NH—SiH$_2$—(CH$_2$)$_t$—SiH(NAmyl$_2$)-]$_n$,
[—NH—SiH$_2$—(CH$_2$)$_t$—SiH(N-cyclopentyl$_2$)-]$_n$,
[—NH—SiH$_2$—(CH$_2$)$_t$—SiH(Nhexyl$_2$)-]$_n$,
[—NH—SiH$_2$—(CH$_2$)$_t$—SiH(N-cyclohexyl$_2$)-]$_n$,
[—NH—SiH$_2$—(CH$_2$)$_t$—SiH(NMeH)—]$_n$,
[—NH—SiH$_2$—(CH$_2$)$_t$—SiH(NEtH)—]$_n$,
[—NH—SiH$_2$—(CH$_2$)$_t$—SiH(NnPrH)—]$_n$,
[—NH—SiH$_2$—(CH$_2$)$_t$—SiH(NiPrH)—]$_n$,
[—NH—SiH$_2$—(CH$_2$)$_t$—SiH(NnBuH)—]$_n$,
[—NH—SiH$_2$—(CH$_2$)$_t$—SiH(NiBuH)—]$_n$,
[—NH—SiH$_2$—(CH$_2$)$_t$—SiH(NtBuH)—]$_n$, and
[—NH—SiH$_2$—(CH$_2$)$_t$—SiH(NAmylH)—]$_n$.

23. The method of claim 13, wherein the linear or branched oligomer or polymer contains a unit having a formula selected from the group consisting of

[—NH—SiH$_2$—(CH$_2$)$_t$—Si(CH=CH$_2$)$_2$—]$_n$,
[—NH—SiH$_2$—(CH$_2$)$_t$—Si(CH$_2$—CH=CH$_2$)$_2$—]$_n$,
[—NH—SiH$_2$—(CH$_2$)$_t$—Si(NH$_2$)$_2$—]$_n$,
[—NH—SiH$_2$—(CH$_2$)$_t$—Si(NMe$_2$)$_2$-]$_n$,
[—NH—SiH$_2$—(CH$_2$)$_t$—Si(NMeEt)$_2$-]$_n$,
[—NH—SiH$_2$—(CH$_2$)$_t$—Si(NEt$_2$)$_2$-]$_n$,
[—NH—SiH$_2$—(CH$_2$)$_t$—Si(NnPr$_2$)$_2$-]$_n$,
[—NH—SiH$_2$—(CH$_2$)$_t$—Si(NiPr$_2$)$_2$-]$_n$,
[—NH—SiH$_2$—(CH$_2$)$_t$—Si(NnBu$_2$)$_2$-]$_n$,
[—NH—SiH$_2$—(CH$_2$)$_t$—Si(NiBu$_2$)$_2$-]$_n$,
[—NH—SiH$_2$—(CH$_2$)$_t$—Si(NtBu$_2$)$_2$-]$_n$,
[—NH—SiH$_2$—(CH$_2$)$_t$—Si(NAmyl$_2$)$_2$-]$_n$,
[—NH—SiH$_2$—(CH$_2$)$_t$—Si(Ncyclopentyl$_2$)$_2$-]$_n$,
[—NH—SiH$_2$—(CH$_2$)$_t$—Si(Nhexyl$_2$)$_2$-]$_n$,
[—NH—SiH$_2$—(CH$_2$)$_t$—Si(Ncyclohexyl$_2$)$_2$-]$_n$,
[—NH—SiH$_2$—(CH$_2$)$_t$—Si(NMeH)$_2$—]$_n$,
[—NH—SiH$_2$—(CH$_2$)$_t$—Si(NEtH)$_2$—]$_n$,
[—NH—SiH$_2$—(CH$_2$)$_t$—Si(NnPrH)$_2$—]$_n$,
[—NH—SiH$_2$—(CH$_2$)$_t$—Si(NiPrH)$_2$—]$_n$,
[—NH—SiH$_2$—(CH$_2$)$_t$—Si(NnBuH)$_2$—]$_n$,
[—NH—SiH$_2$—(CH$_2$)$_t$—Si(NiBuH)$_2$—]$_n$,
[—NH—SiH$_2$—(CH$_2$)$_t$—Si(NtBuH)$_2$—]$_n$, and
[—NH—SiH$_2$—(CH$_2$)$_t$—Si(NAmyl$_2$)$_2$-]$_n$.

24. The method of claim 13, wherein the linear or branched oligomer or polymer contains a unit having a formula selected from the group consisting of

[—NH—SiH(CH=CH$_2$)—(CH$_2$)$_t$—SiH(CH=CH$_2$)—]$_n$,
[—NH—SiH(CH$_2$—CH=CH$_2$)—(CH$_2$)$_t$—SiH(CH$_2$—CH=CH$_2$)—]$_n$,
[—NH—SiH(NH$_2$)—(CH$_2$)$_t$—SiH(NH$_2$)—]$_n$,
[—NH—SiH(NMe$_2$)-(CH$_2$)$_t$—SiH(NMe$_2$)-]$_n$,
[—NH—SiH(NMeEt)-(CH$_2$)$_t$—SiH(NMeEt)-]$_n$,
[—NH—SiH(NEt$_2$)-(CH$_2$)$_t$—SiH(NEt$_2$)-]$_n$,
[—NH—SiH(NnPr$_2$)-(CH$_2$)$_t$—SiH(NnPr$_2$)-]$_n$,
[—NH—SiH(NiPr$_2$)-(CH$_2$)$_t$—SiH(NiPr$_2$)-]$_n$,
[—NH—SiH(NnBu$_2$)-(CH$_2$)$_t$—SiH(NnBu$_2$)-]$_n$,
[—NH—SiH(NiBu$_2$)-(CH$_2$)$_t$—SiH(NiBu$_2$)-]$_n$,
[—NH—SiH(NtBu$_2$)-(CH$_2$)$_t$—SiH(NtBu$_2$)-]$_n$,
[—NH—SiH(NAmyl$_2$)-(CH$_2$)$_t$—SiH(NAmyl$_2$)-]$_n$,
[—NH—SiH(Ncyclopentyl$_2$)-(CH$_2$)$_t$—SiH(Ncyclopentyl$_2$)-]$_n$,
[—NH—SiH(Nhexyl$_2$)-(CH$_2$)$_t$—SiH(Nhexyl$_2$)-]$_n$,
[—NH—SiH(Ncyclohexyl$_2$)-(CH$_2$)$_t$—SiH(Ncyclohexyl$_2$)-]$_n$,
[—NH—SiH(NMeH)—(CH$_2$)$_t$—SiH(NMeH)—]$_n$,
[—NH—SiH(NEtH)—(CH$_2$)$_t$—SiH(NEtH)—]$_n$,
[—NH—SiH(NnPrH)—(CH$_2$)$_t$—SiH(NnPrH)—]$_n$,
[—NH—SiH(NiPrH)—(CH$_2$)$_t$—SiH(NiPrH)—]$_n$,
[—NH—SiH(NnBuH)—(CH$_2$)$_t$—SiH(NnBuH)—]$_n$,
[—NH—SiH(NiBuH)—(CH$_2$)$_t$—SiH(NiBuH)—]$_n$,
[—NH—SiH(NtBuH)—(CH$_2$)$_t$—SiH(NtBuH)—]$_n$, and
[—NH—SiH(NAmylH)—(CH$_2$)$_t$—SiH(NAmylH)—]$_n$.

* * * * *